US006965752B2

(12) United States Patent
Allen et al.

(10) Patent No.: US 6,965,752 B2
(45) Date of Patent: *Nov. 15, 2005

(54) ON-LINE EDUCATIONAL SYSTEM HAVING AN ELECTRONIC NOTEBOOK FEATURE

(75) Inventors: Vance Allen, Denver, CO (US); Jon M. Dobrin, Denver, CO (US)

(73) Assignee: eCollege.com, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/645,456

(22) Filed: Aug. 19, 2003

(65) Prior Publication Data

US 2004/0048234 A1 Mar. 11, 2004

Related U.S. Application Data

(60) Division of application No. 09/630,161, filed on Jul. 31, 2000, now abandoned, which is a continuation-in-part of application No. 09/384,458, filed on Aug. 27, 1999, now Pat. No. 6,470,171.

(51) Int. Cl.[7] .................................................. G09B 7/00
(52) U.S. Cl. ...................... 434/362; 434/350; 434/365; 434/353
(58) Field of Search ................................ 434/362, 350, 434/365, 353, 323

(56) References Cited

U.S. PATENT DOCUMENTS

| | | |
|---|---|---|
| 4,170,832 A | 10/1979 | Zimmerman |
| 4,820,167 A | 4/1989 | Nobles et al. |
| 5,008,853 A | 4/1991 | Bly et al. |
| 5,267,865 A | 12/1993 | Lee et al. |
| 5,310,349 A | 5/1994 | Daniels et al. |
| 5,387,104 A | 2/1995 | Corder |
| 5,395,243 A | 3/1995 | Lubin et al. |
| 5,398,302 A | 3/1995 | Thrift |
| 5,479,574 A | 12/1995 | Glier et al. |
| 5,618,182 A | 4/1997 | Thomas |
| 5,706,450 A | 1/1998 | Shaiman et al. |
| 5,727,950 A | 3/1998 | Cook et al. |

(Continued)

OTHER PUBLICATIONS

Press Release, "Real Education Joins Microsoft Certified Solution Provider Program," (Dec. 10, 1997).
Press Release, "Real Education Awarded by U.S. Commerce Department's Advanced Technology Program," (Oct. 8, 1998).
Press Release, "Real Education Announces IMS Compatibility," (May 4, 1998).
Exhibit 1: Making/Student Sales Plan, Real Education, Inc. (Feb. 5, 1998).
Exhibit 2: Slides entitled "On–line Education Technology Solutions Briefing," www.realeducation.com (undated).
Exhibit 3: Document entitled "Real Education, Inc. Technical Information," Real Education, Inc. (undated).
Exhibit 4: Untitled document describing features of System 2.7, Real Eductaion, Inc. (undated).
Exhibit 5: Untitled document describing Real Education, Real Education, Inc. (undated).
Exhibit 6: Document entitled "How to Build and Maintain a Complete School on the Internet; 'An Opportunity for Continuing Education Providers to Establish an Entire School on the Internet,'"Real Information Systems, Inc. (undated).

*Primary Examiner*—Chanda L. Harris
(74) *Attorney, Agent, or Firm*—Snell & Wilmer LLP

(57) ABSTRACT

An on-line educational notebook for selectively providing access to submitted on-line content is disclosed. The notebook allows authorized users to add, edit, and delete various text, audio, video, graphics, or multimedia content items. A student may also enter course notes in the on-line notebook and selectively share certain items with an instructor for review, comment, or grading.

10 Claims, 66 Drawing Sheets

U.S. PATENT DOCUMENTS

| | | | |
|---|---|---|---|
| 5,730,604 A | 3/1998 | Jay et al. |
| 5,772,446 A | 6/1998 | Rosen |
| 5,779,486 A | 7/1998 | Ho et al. |
| 5,787,234 A | 7/1998 | Molloy |
| 5,788,508 A | 8/1998 | Lee et al. |
| 5,790,114 A | 8/1998 | Geaghan et al. |
| 5,794,006 A | 8/1998 | Sanderman |
| 5,810,605 A | 9/1998 | Siefert |
| 5,823,789 A | 10/1998 | Jay et al. |
| 5,829,983 A | 11/1998 | Koyama et al. |
| 5,833,468 A | 11/1998 | Guy et al. |
| 5,839,106 A | 11/1998 | Bellegarda |
| 5,947,747 A | 9/1999 | Walker et al. |
| 5,978,648 A | 11/1999 | George et al. |
| 5,987,302 A | 11/1999 | Driscoll et al. |
| 6,000,945 A | 12/1999 | Sanchez-Lazer et al. |
| 6,024,577 A | 2/2000 | Wadahama et al. |
| 6,029,043 A | 2/2000 | Ho et al. |
| 6,039,688 A | 3/2000 | Douglas et al. |
| 6,064,856 A | 5/2000 | Lee et al. |
| 6,091,930 A | 7/2000 | Mortimer et al. |
| 6,112,049 A | 8/2000 | Sonnenfeld |
| 6,135,776 A | 10/2000 | Erturk et al. |
| 6,146,148 A | 11/2000 | Stuppy |
| 6,149,438 A | 11/2000 | Richard et al. |
| 6,149,441 A | 11/2000 | Pelligrino et al. |
| 6,155,840 A | 12/2000 | Sallette |
| 6,157,808 A | 12/2000 | Hollingsworth |
| 6,162,060 A | 12/2000 | Richard et al. |
| 6,164,974 A | 12/2000 | Carlile et al. |
| 6,167,366 A | 12/2000 | Johnson |
| 6,190,178 B1 | 2/2001 | Oh |
| 6,198,904 B1 | 3/2001 | Rosen |
| 6,201,948 B1 | 3/2001 | Cook et al. |
| 6,213,780 B1 | 4/2001 | Ho et al. |
| 6,222,530 B1 | 4/2001 | Sequeira |
| 6,250,930 B1 | 6/2001 | Mintz |
| 6,261,103 B1 | 7/2001 | Stephens et al. |
| 6,266,683 B1 | 7/2001 | Yehuda et al. |
| 6,270,351 B1 | 8/2001 | Roper |
| 6,275,471 B1 | 8/2001 | Bushmitch et al. |
| 6,285,993 B1 | 9/2001 | Ferrell |
| 6,301,462 B1 | 10/2001 | Freeman et al. |
| 6,336,813 B1 | 1/2002 | Siefert |
| 6,347,333 B2 | 2/2002 | Eisendrath et al. |
| 6,347,943 B1 | 2/2002 | Fields et al. |
| 6,361,326 B1 | 3/2002 | Fontana et al. |
| 6,370,355 B1 | 4/2002 | Ceretta et al. |
| 6,397,036 B1 | 5/2002 | Thean et al. |
| 6,409,514 B1 | 6/2002 | Bull |
| 6,411,796 B1 | 6/2002 | Remschel |
| 6,438,353 B1 | 8/2002 | Casey-Cholakis et al. |
| 6,438,580 B1 | 8/2002 | Mears et al. |
| 6,470,171 B1 * | 10/2002 | Helmick et al. ............ 434/362 |
| 6,505,031 B1 | 1/2003 | Slider et al. |
| 6,507,726 B1 | 1/2003 | Atkinson et al. |
| 6,523,069 B1 | 2/2003 | Luczycki et al. |
| 6,564,380 B1 | 5/2003 | Murphy |
| 6,652,287 B1 | 11/2003 | Strub et al. |
| 6,654,749 B1 | 11/2003 | Nashed |
| 6,679,703 B2 | 1/2004 | Alling |
| 6,711,378 B2 | 3/2004 | Kashima |
| 2002/0004793 A1 | 1/2002 | Keith, Jr. |
| 2002/0051956 A1 | 5/2002 | Thomsen |
| 2002/0059342 A1 | 5/2002 | Gupta et al. |
| 2002/0087560 A1 | 7/2002 | Bardwell |
| 2002/0146676 A1 | 10/2002 | Reynolds |
| 2003/0044762 A1 | 3/2003 | Bergan et al. |
| 2003/0110215 A1 | 6/2003 | Joao |
| 2003/0207245 A1 | 11/2003 | Parker et al. |

* cited by examiner

500

| FIG.2A | FIG.2B | FIG.2C | FIG.2D | FIG.2E | FIG.2F |
|--------|--------|--------|--------|--------|--------|
| FIG.2G | FIG.2H | FIG.2I | FIG.2J | FIG.2K | FIG.2L |
| FIG.2M | FIG.2N | FIG.2O | FIG.2P | FIG.2Q | FIG.2R |

FIG.2

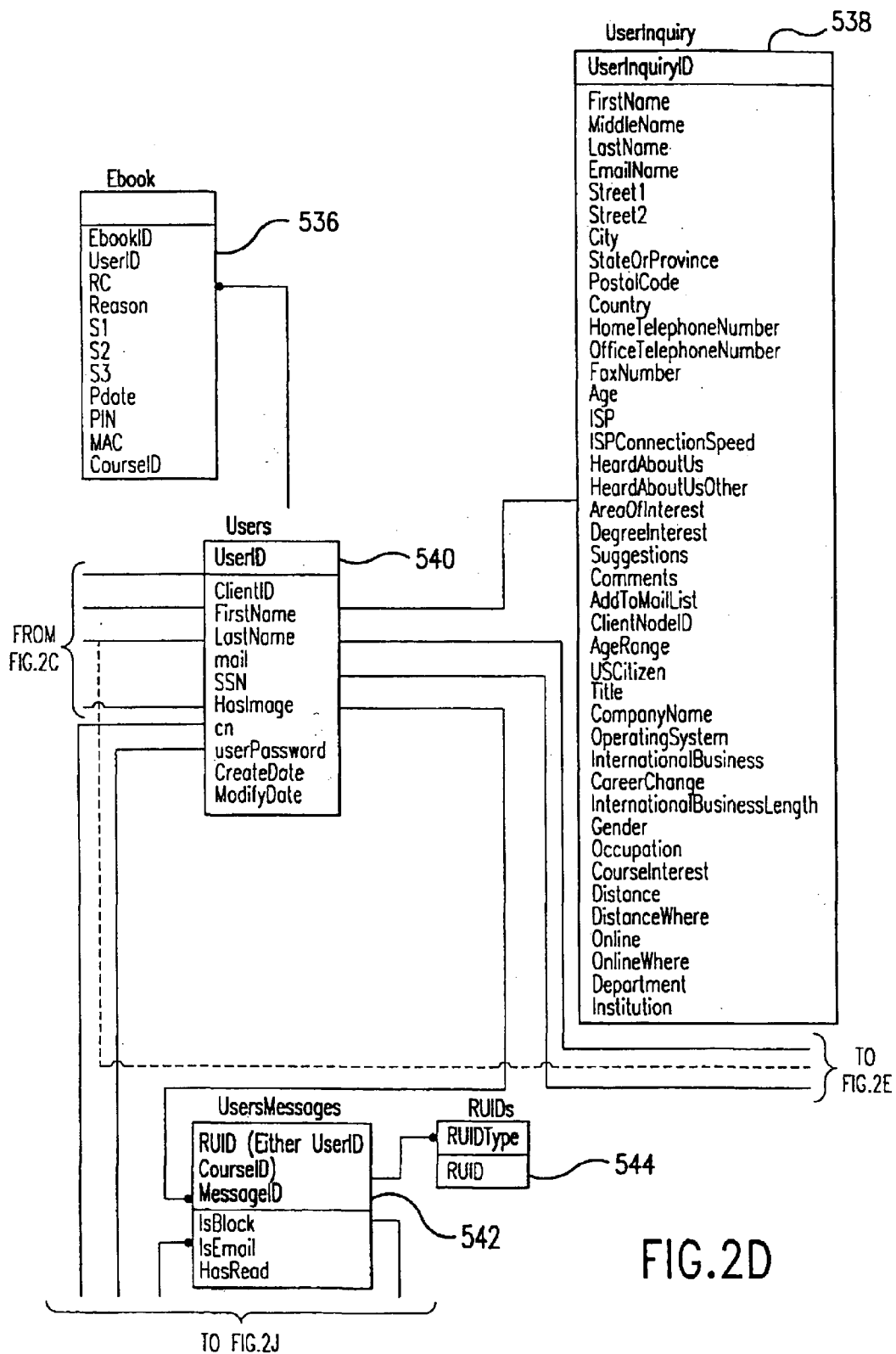

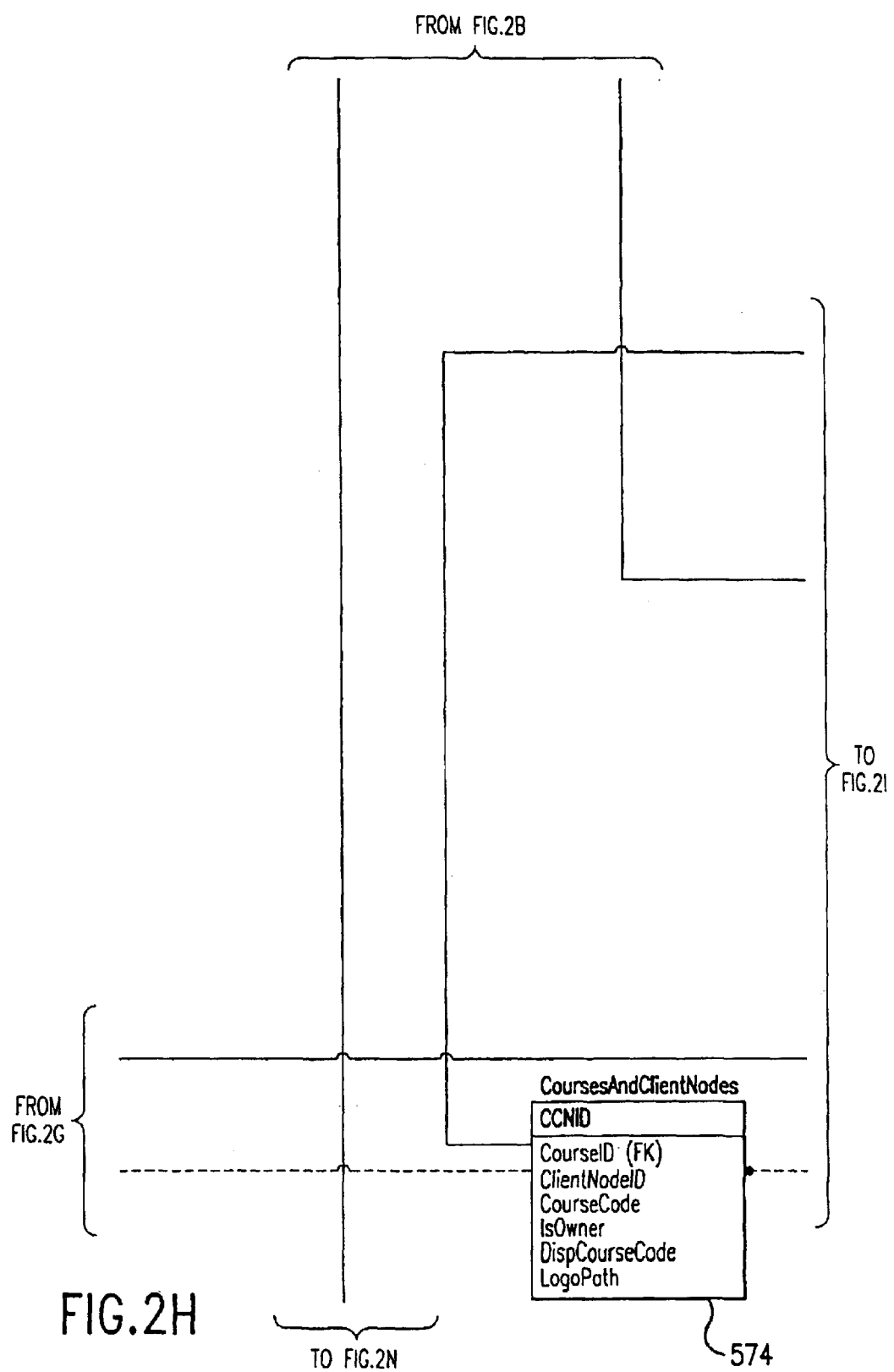

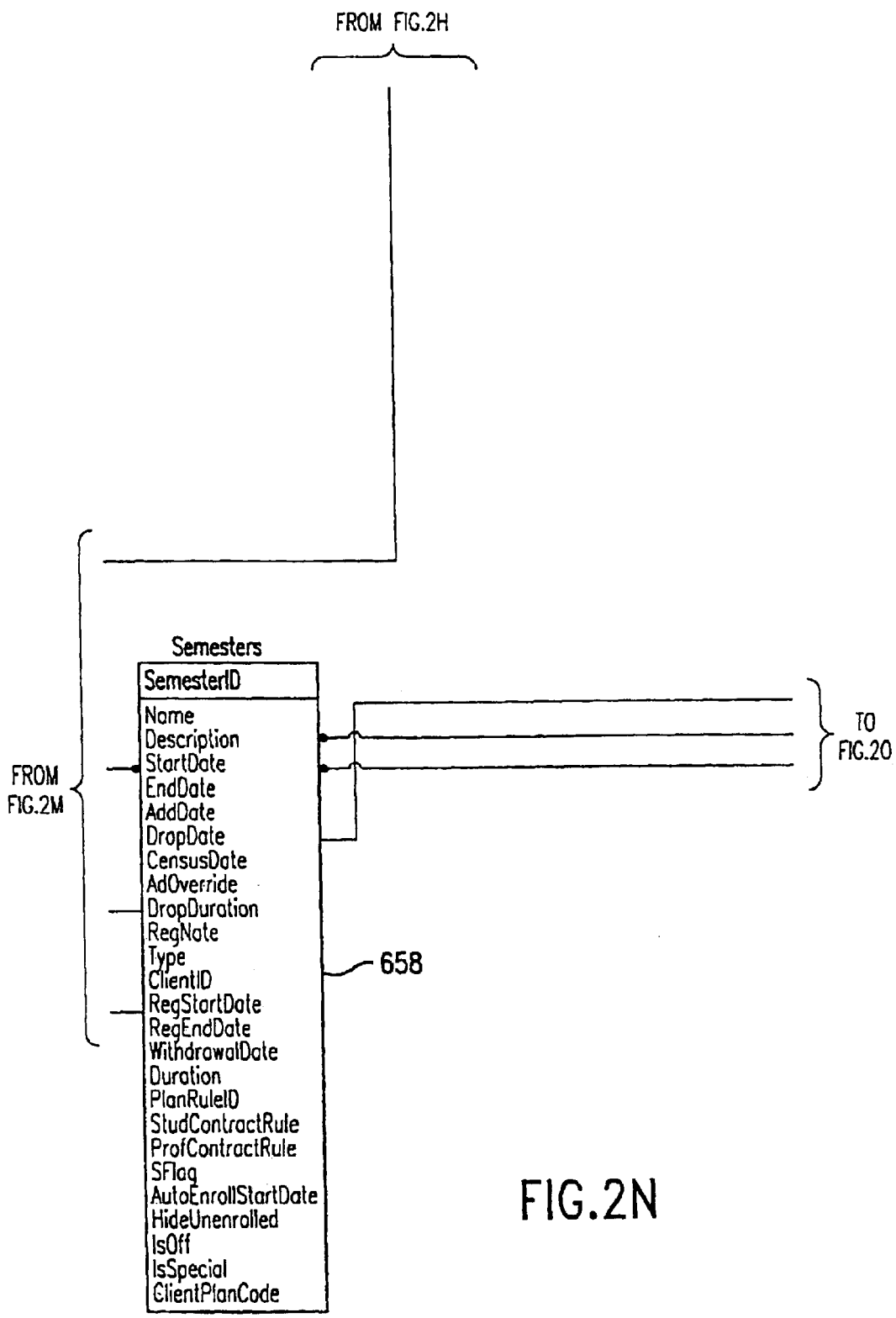

HOMEPAGES: Greg University / Sarah Allen / Administrative Pages / User Search / User Select / Enroll a User in Another Level Enroll a User in Another Enrollable Area — 1030

Sarah Allen is currently enrolled in the following area(s): — 1032

- Sales

Step 3: Select the new enrollable area(s)

Test
EdUSA
ID 1000
Quality Assurance
— 1034

Step 4: Select the user's role in the new area(s) — 1036

Step 5 (Optional): Move Sarah Allen into the selected node(s) only — 1038

☐ Remove Sarah Allen from the currently enrolled area(s) — 1040

Administrative Pages
8/18/99 9:44:13 AM Mountain Time eCollege 1054

HOMEPAGES: Greg University / Sarah Allen / Administrative Pages / User Search / User Select / User Reports User Reports: Brett Krichiver Enrollment Information | Registration History | Payment Information | Log | Full Detailed Report | Administrative Login

| School | Semester | Course | Status Date | Status | Comment |
|---|---|---|---|---|---|
| Greg University | | | 07/21/99 | GU Drop | SYSTEM Auto Enroll Basic Orientation |
| Greg University | | | 02/03/99 | GU Student | SYSTEM Auto Enroll Basic Orientation |
| Greg University | Special Courses | Orientation Course | 07/21/99 | GU Student | Auto Enroll in Orientation Course (from RS Admin Pages) |
| Sales* | N/A | N/A | 02/25/99 | GU Professor | Enrolled In GregU - Assigned Role by Real System Admin |
| Sales | Demonstration | CD101 | 02/25/99 | GU Student | |
| Sales | Demonstration | Sales | 02/03/99 | GU Professor | |

1056

* Denotes enrollable area status

Fig 3S

Course Reports

The course enrollment information and the current status of users in the course is listed below. To change a user's status in the course, select it from the 'Set New Status' option and click the 'Update' button at the bottom of the screen.

Quality Assurance Semester - Accredited Buyer Representative

| Max Enrollment | 25 | Max Waitlist | 25 | Current Pending | 0 |
| Current Enrollment | 2 | Current WaitList | 0 | | |

1060

| Name | Email Address | Current Status | Set New Status | Set Status Comment |
|---|---|---|---|---|
| Skudlarczyk-Angell, Chris | chrss@ecollege.com | GU Student | | |
| test, test | test | GU Student | | |

Administrative Pages
8/16/99 9:47:34 AM Mountain Time

HOMEPAGES: Greg University / Sarah Allen / Administrative Pages / University Reports University Reports Course Count per Area | User Count per Enrollable Area | Enrollment per Semester Course Count per Area — 1066

| Area | Courses |
|---|---|
| Greg University | 5 |
| RealEd | 1 |
| EdUSA | 8 |
| ID 1000 | 0 |
| Quality Assurance | 10 |
| Real Ed Internal Training | 89 |
| Sales | 126 |

Full Search Results

— 1148

Your search matched 55 items in this course. Results are sorted by course tool and course unit below:

| Document Sharing |
|---|
| FileName.ext - FirstName LastName<br>This is the best document I have ever read.<br>FileName2.ext - FirstName LastName<br>This the second best document that I have ever read. |
| Course Home |
| Announcements - Announcements Title<br>This the second best announcement for this class ever.<br>Announcements - Another Title<br>This is the best announcement for this class ever.<br>Course Introduction<br>This is the best course ever.<br>Syllabus - The Course Description<br>The course description.<br>Calendar - Custom Course Event Title<br>The purpose of this event is to see a new movie and come back and report on this movie in the class threaded discussion. |
| Unit 4 |
| Discussion<br>The thing that I think is most convincing is the fact that I have no idea what else to say. I mean I am really at a loss for words. I hope that I will think of something... |

| Course Search |
|---|
| Search For: [      ]<br>Search In: [-All-<br>Document Sharing<br>Journal<br>Webliography<br>Course Home<br>Unit 1]  (Use shift-click or ctrl-click to select more than one item)<br>[Search] |

FIG.4F

ON-LINE EDUCATIONAL SYSTEM HAVING AN ELECTRONIC NOTEBOOK FEATURE

REFERENCE TO RELATED APPLICATION

The present application is a division of U.S. patent application Ser. No. 09/630,161, filed Jul. 31, 2000, now abandoned, which is a continuation-in-part of U.S. patent application Ser. No. 09/384,458, now U.S. Pat. No. 6,470,171, filed Aug. 27, 1999, and entitled "On-Line Educational System," which is incorporated herein by reference as if fully set forth.

FIELD OF THE INVENTION

The present invention relates to a method and apparatus for providing an on-line educational system.

BACKGROUND OF THE INVENTION

The Internet has permitted users with web browsers to easily exchange information over the Internet. Educational materials, for example, may be distributed to users for taking an educational course on-line. Providing on-line educational courses requires various features in order to successfully execute the course. In order for the course to successfully replace or supplement in-classroom courses, users must be provided with various features so that the on-line educational course provides certain benefits over in-classroom teaching.

Accordingly, a need exists for various features for an on-line educational system.

SUMMARY OF THE INVENTION

A second apparatus consistent with the present invention provides an electronic notebook for users to selectively provide information to an instructor for use with an on-line educational system. The apparatus provides on-line content concerning educational materials for a particular educational course and an electronic syllabus for the educational course. An electronic notebook is provided for a particular one of the users permitting the particular user to enter information into the electronic notebook. The user can selectively identify permitted access to the electronic notebook by the instructor, and the instructor's access is restricted based upon the user's identification of permitted access.

BRIEF DESCRIPTION OF THE DRAWINGS

FIG. 1A is a flow chart of a home page method.
FIG. 1I is a flow chart of a webliography method.
FIG. 1O is a flow chart of a calendar method.
FIG. 1P is a flow chart of a search method.
FIGS. 3A–3X and 4A–4F are diagrams of screens permitting instructors, users, and others to interact with an on-line educational system.
FIG. 3A is a diagram of a home page screen for an instructor.
FIG. 3B is a diagram of a home page screen for a user.
FIG. 3E is a diagram of a gradebook screen for an instructor.
FIG. 3I is a diagram of a journal screen.
FIG. 3L is a diagram of a threaded discussion screen.
FIG. 3M is a diagram of a grading or exam screen.
FIG. 3O is a diagram of an enrollment status screen.
FIG. 3P is a diagram of a user status screen.
FIG. 3Q is a diagram of an enrollment screen.
FIG. 3S is a diagram of a user reports screen.
FIG. 3T is a diagram of a course reports screen.
FIG. 3U is a diagram of a university reports screen.
FIG. 3V is a diagram of a course manager screen.
FIG. 3X is a diagram of an add content screen for a course manager.
FIG. 4A is a diagram of an author view screen.
FIG. 4B is a diagram of a course view screen.
FIG. 4C is a diagram of a calendar screen.
FIG. 4D is a diagram of a search screen.
FIG. 4E is a diagram of a search results screen.
FIG. 4F is a diagram of a search results screen.

DETAILED DESCRIPTION

Overview

Figure 1:
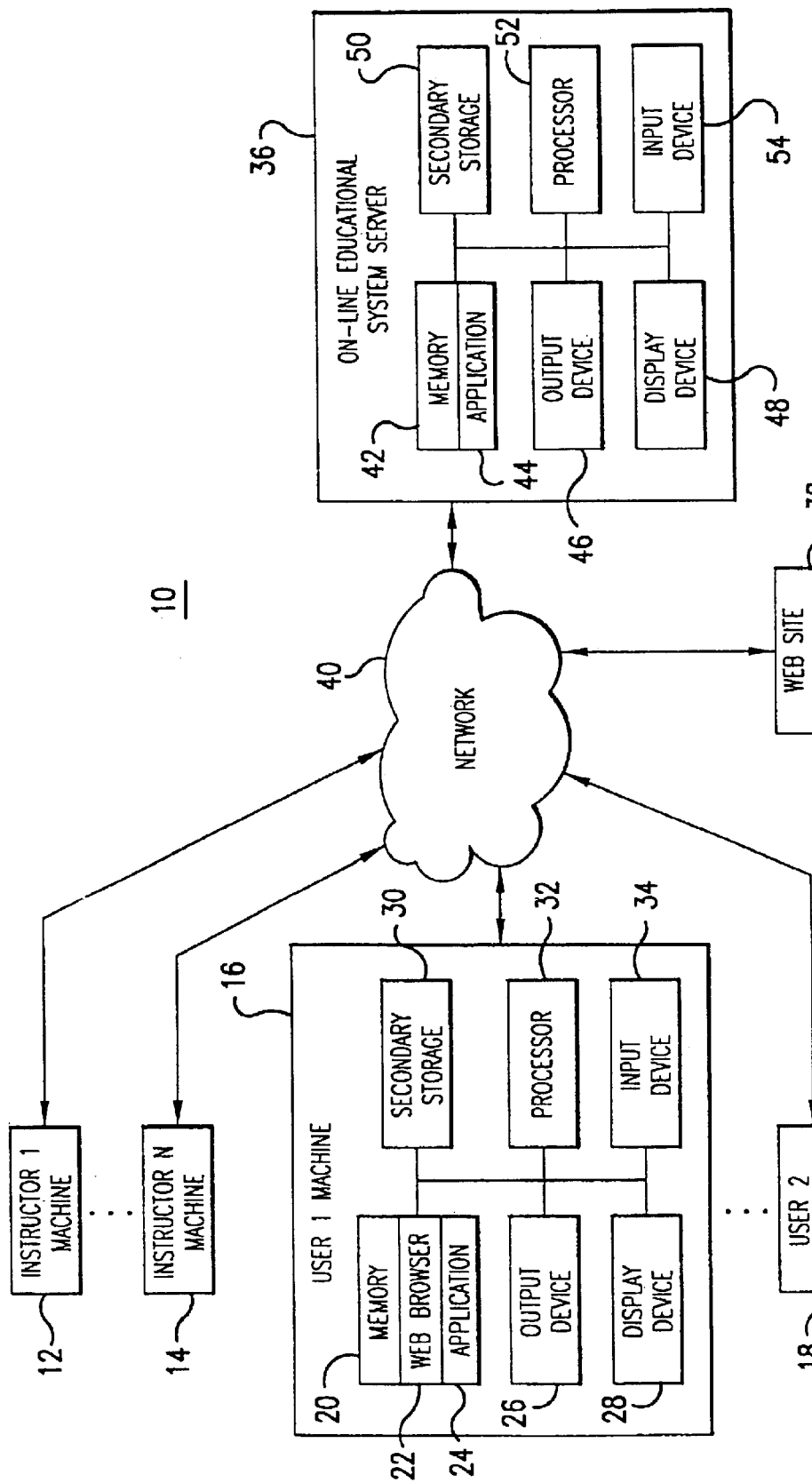
FIG. 1 is a block diagram of an on-line educational system.

An on-line educational system provides for participation in on-line educational courses. Instructors build an educational course using an application referred to as a course manager in order to generate an electronic syllabus. Examples of an electronic syllabus are provided below, and the term "electronic syllabus" refers to information electronically accessible and providing an indication of content for an on-line course or an indication of assignments for an on-line course.

The system posts the syllabus for the course on-line. Users participating in the course use web browsers or other applications on their computers to view the syllabus and participate in the on-line course. The users interact with the instructor and other users in the course, and they submit information on-line, such as completion of assignments. They also take exams on-line and receive grade information on-line for the exams or completion of the assignments.

The term "system" is used to refer to an on-line educational system, an example of which is described in the present specification. The term "database" is used to refer to a data structure for storing information for use by the system, and an example of such a data structure in described in the present specification. The term "user" refers to a person participating in an on-line course, and the term "instructor" refers to a person teaching or otherwise providing content or instruction for an on-line course. A person may be both a user and an instructor. The term "assignments" refers to work to be completed by a user for an on-line course, and examples of assignments are provided below. Assignments may include work to be completed by a user without requiring responsive information sent to an instructor, and they may also include work to be completed by a user requiring responsive information. Assignments may also include or use learning tools.

The on-line system removes geographical and time-based boundaries for educational courses. The users may log on to the system from any location having Internet or other network access in order to participate in the course. They may typically use the system at any time of the day in order to obtain assignments, complete the assignments, take exams on-line, and participate in on-line realtime and non-realtime discussions. Likewise, instructors may use the system from any location accessible to the Internet or other network, and at any time, in order to post assignments on-line, grade completion of assignments, and interact on-line with users in realtime or non-realtime.

The on-line educational system also increases options and tools for teaching courses and participating in the courses. Instructors may provide traditional lectures in the form of recorded video or audio information provided on-line to users, and may also provide traditional reading assignments by posting documents on-line for the users. In addition, they may provide many other types of teaching through computer-based tools. They may participate in on-line realtime discussions with users in an online chat room. They may interact with users in non-realtime discussions by posting topics for discussion and later posting comments on the discussion. By posting hypertext links, they may direct users to content on the Internet for research related to an educational course. Electronic journals permit users to enter information such as text related to the course, and an instructor can access the journal to review and comment on the information. Instructors and users can send e-mail messages to others in the course.

The use of multimedia content provides for additional teaching tools. Instead of viewing only static information, users may view multimedia content and potentially interact with it. Therefore, the terms "information," "message," "content," and "materials" may include a wide variety of types of information such as, for example, video, audio, graphics, text, animations, multimedia, computer simulations, slide shows, and images; it may also include combinations of such information.

The system also permits electronic administrative functions. Users through their computers can electronically enroll in courses, pay tuition, inquire about financial aid, obtain technical support, obtain transcripts, purchase text books, and visit an on-line library.

The system uses, for example, a relational database supporting screens through which users and instructors interact with the system. FIGS. 3A–3X and 4A–4F are screens illustrating how users and instructors may interact with the system, and these screens may be displayed on display devices associated with the users' and instructors' computers. The term "screen" refers to any visual element or combinations of visual elements for displaying information; examples include, but are not limited to, user interfaces on a display device or information displayed in web pages or in windows on a display device. The screens may be formatted, for example, as web pages in HyperText Markup Language (HTML), or in any other suitable form for presentation on a display device depending upon applications used by instructors and users to interact with the system.

The screens include various sections, as explained below, to provide information or to receive information or commands. The term "section" with respect to screens refers to a particular portion of a screen, possibly including the entire screen. Sections are selected, for example, to enter information or commands or to retrieve information or access other screens. The selection may occur, for example, by a using a cursor-control device to "click on" or "double click on" the section; alternatively, sections may be selected by entering a series of key strokes or in other ways such as through voice commands or use of a touch screen. In addition, although the screens shown in FIGS. 3A–3X and 4A–4F illustrate a particular arrangement and number of sections in each screen, other arrangements are possible and different numbers of sections in the screens may be used to accomplish the same or similar functions of displaying information and receiving information or commands. Also, the same section may be used for performing a number of functions, such as both displaying information and receiving a command.

Figure 1A:
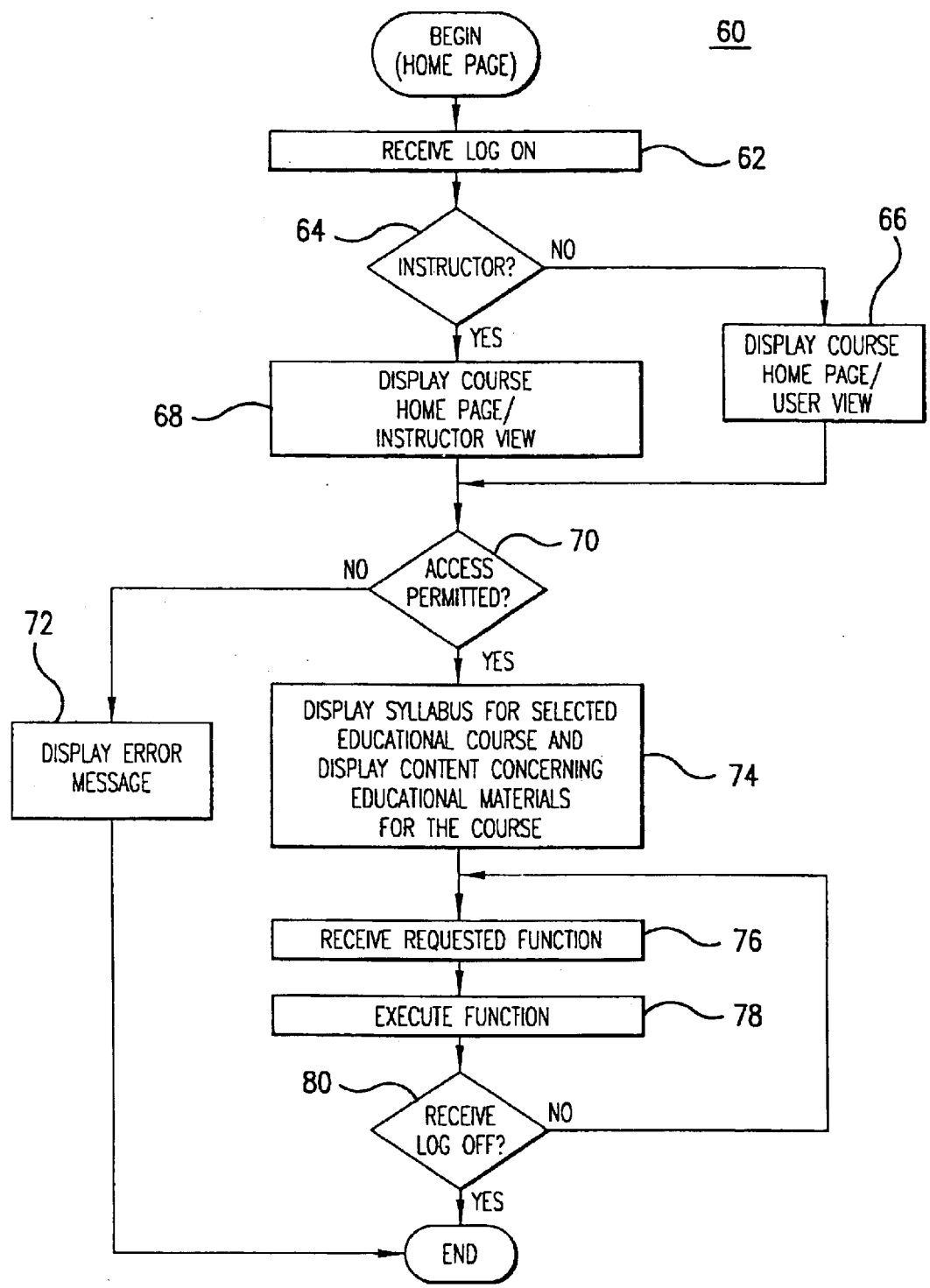
FIGS. 1A–1P are flow charts of various methods for executing functions in an on-line educational system.
Figure 1B:
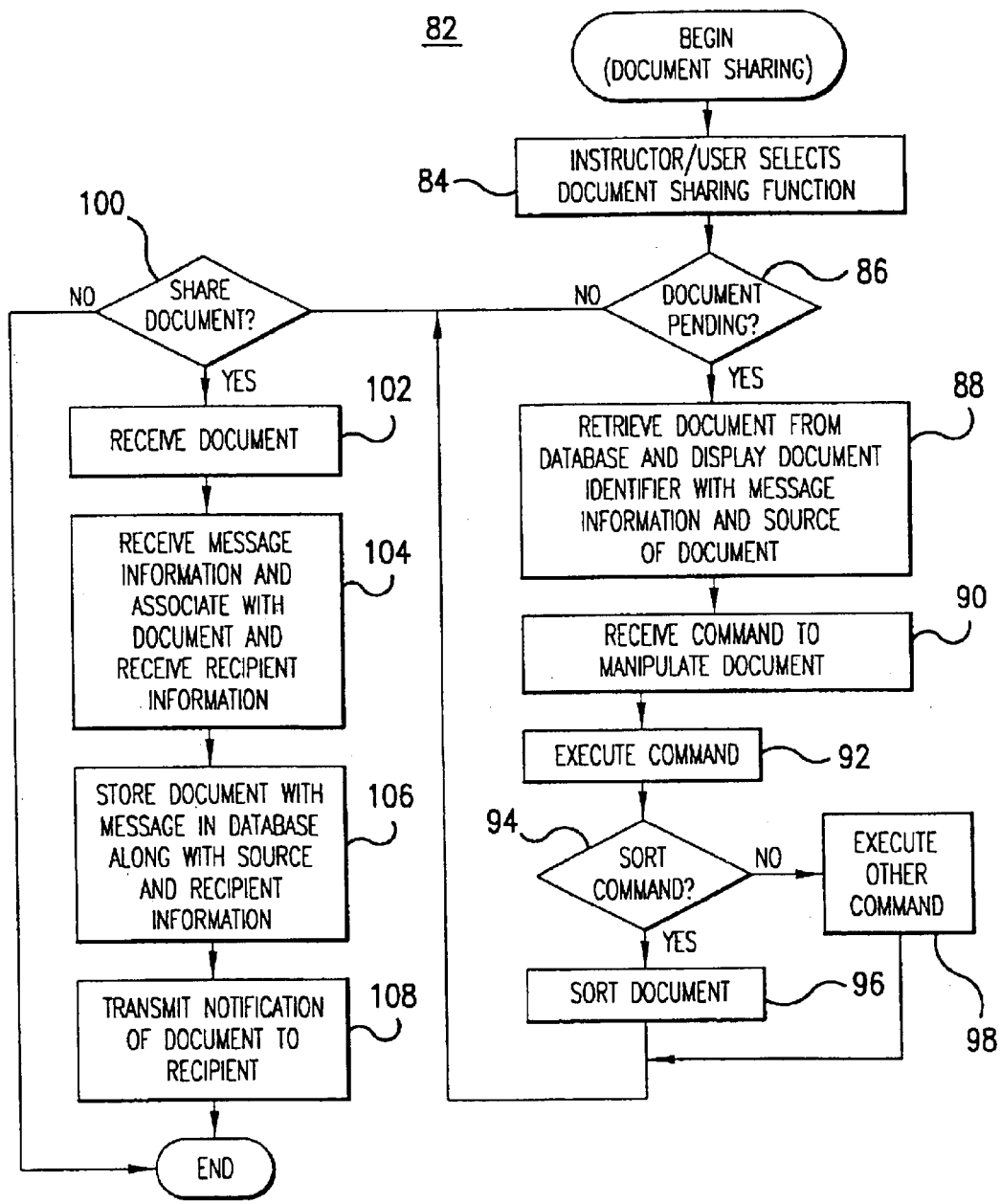
FIG. 1B is a flow chart of a document sharing method.
Figure 1C:
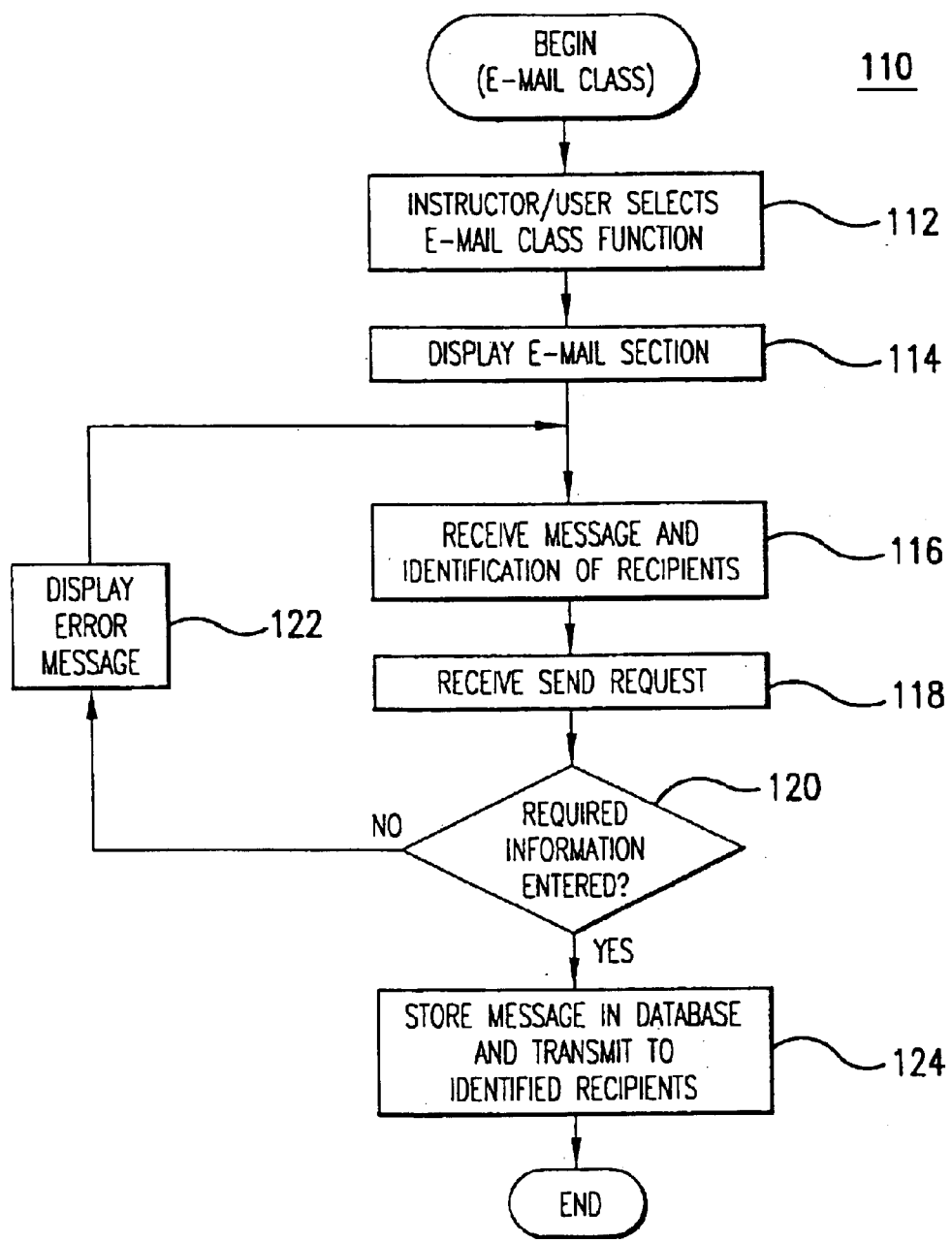
FIG. 1C is a flow chart of an e-mail class method.
Figure 1D:
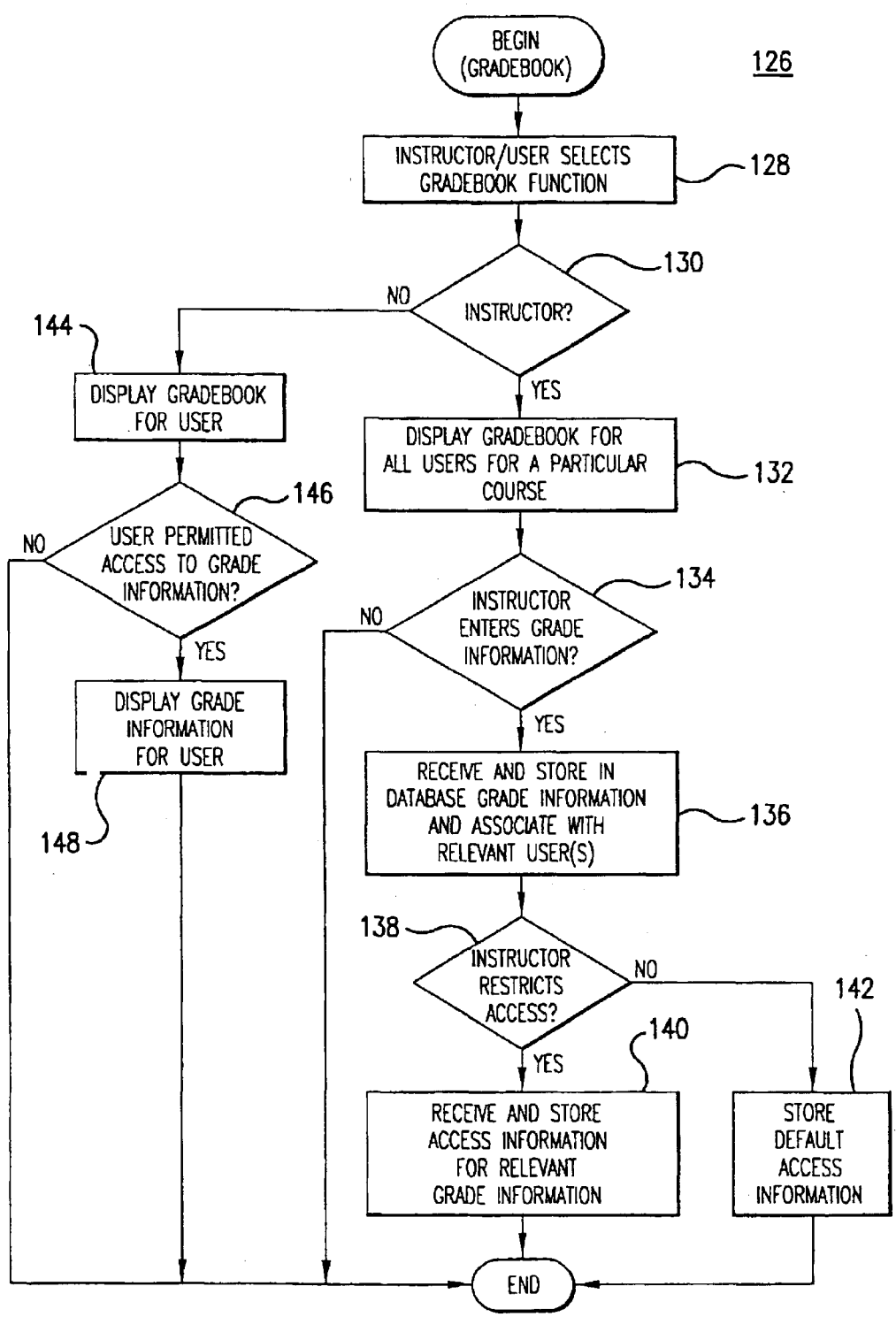
FIG. 1D is a flow chart of a gradebook method.
Figure 1E:
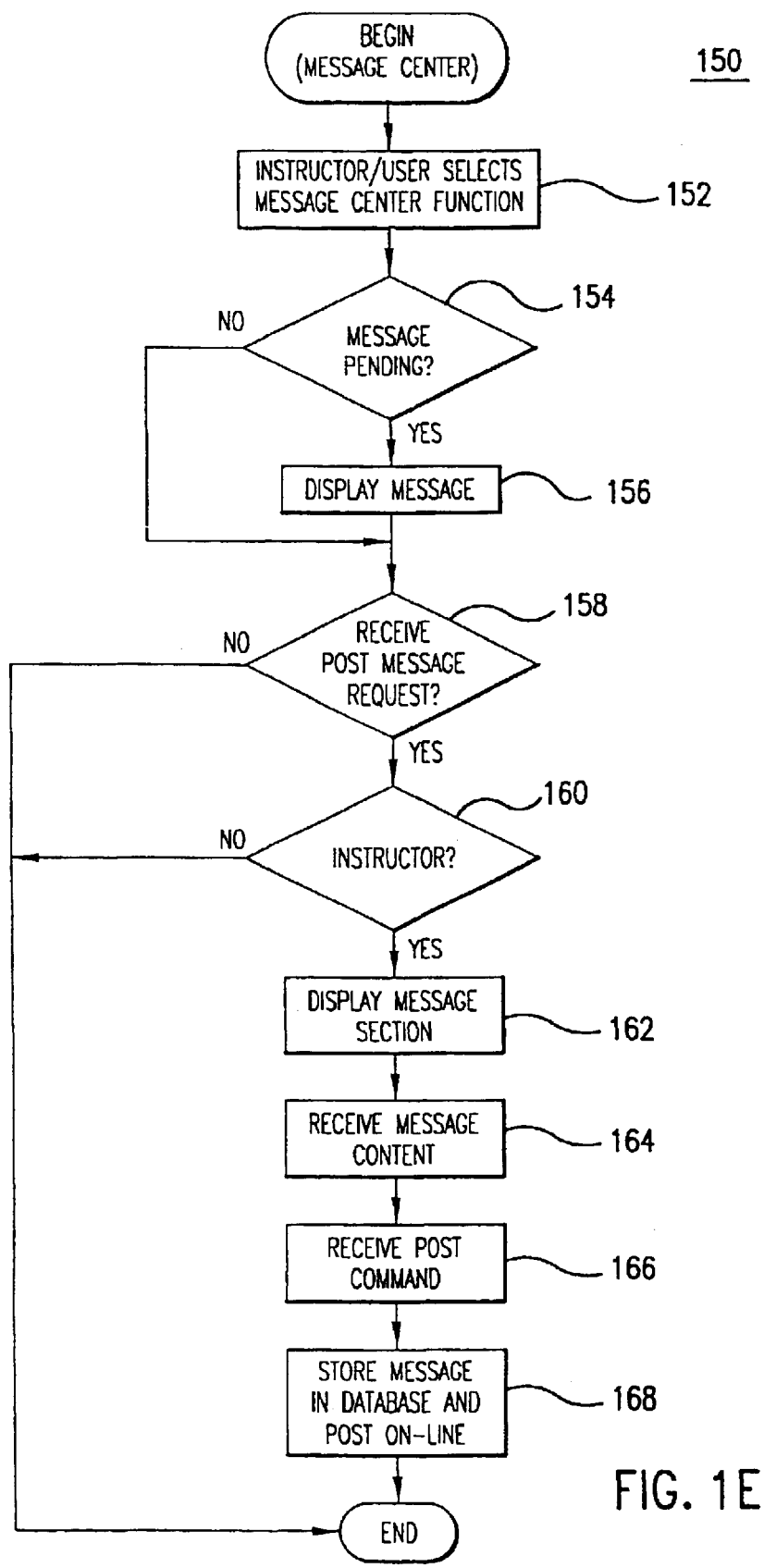
FIG. 1E is a flow chart of a message center method.
Figure 1F:
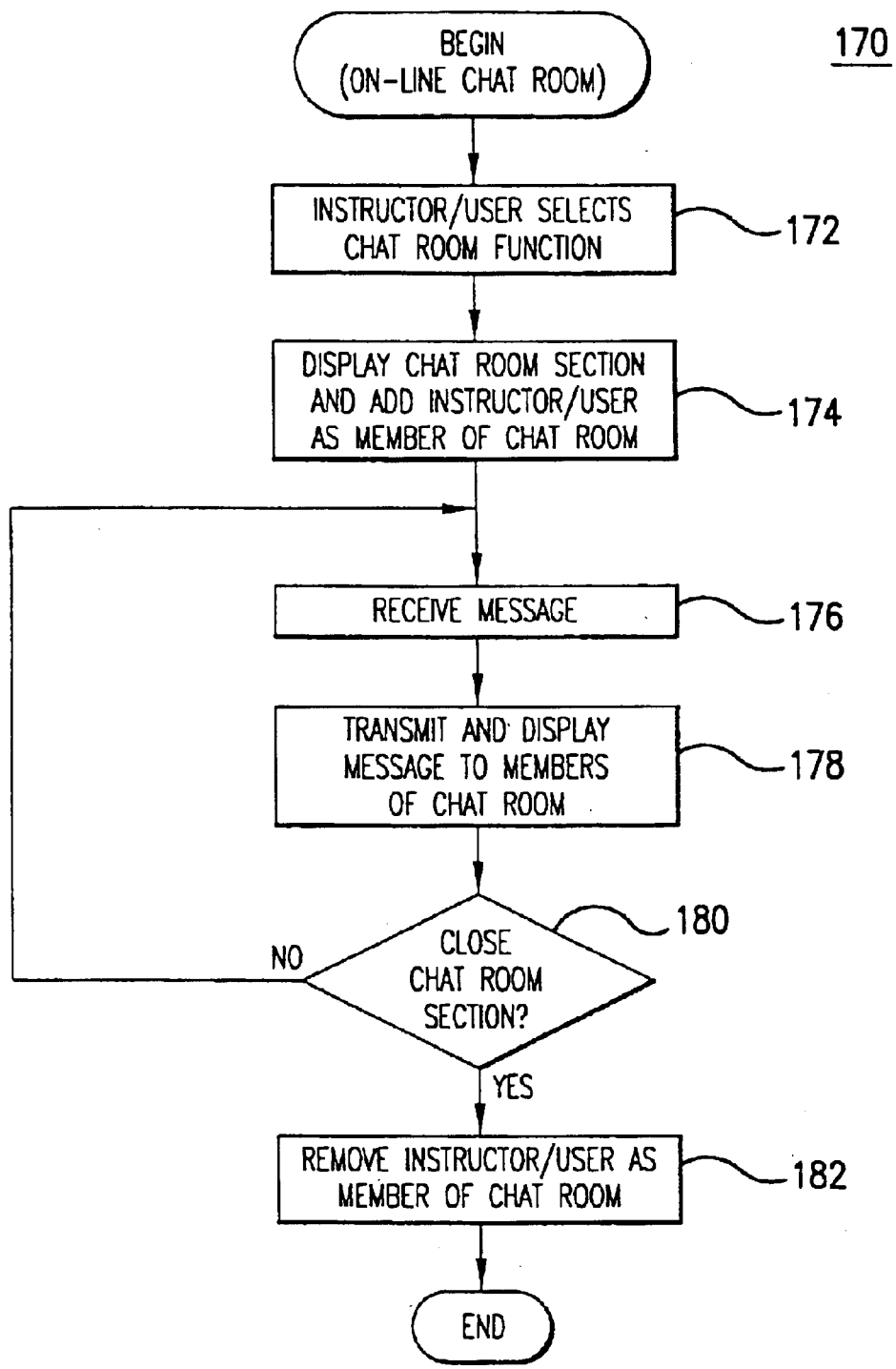
FIG. 1F is a flow chart of an on-line chat room method.
Figure 1G:
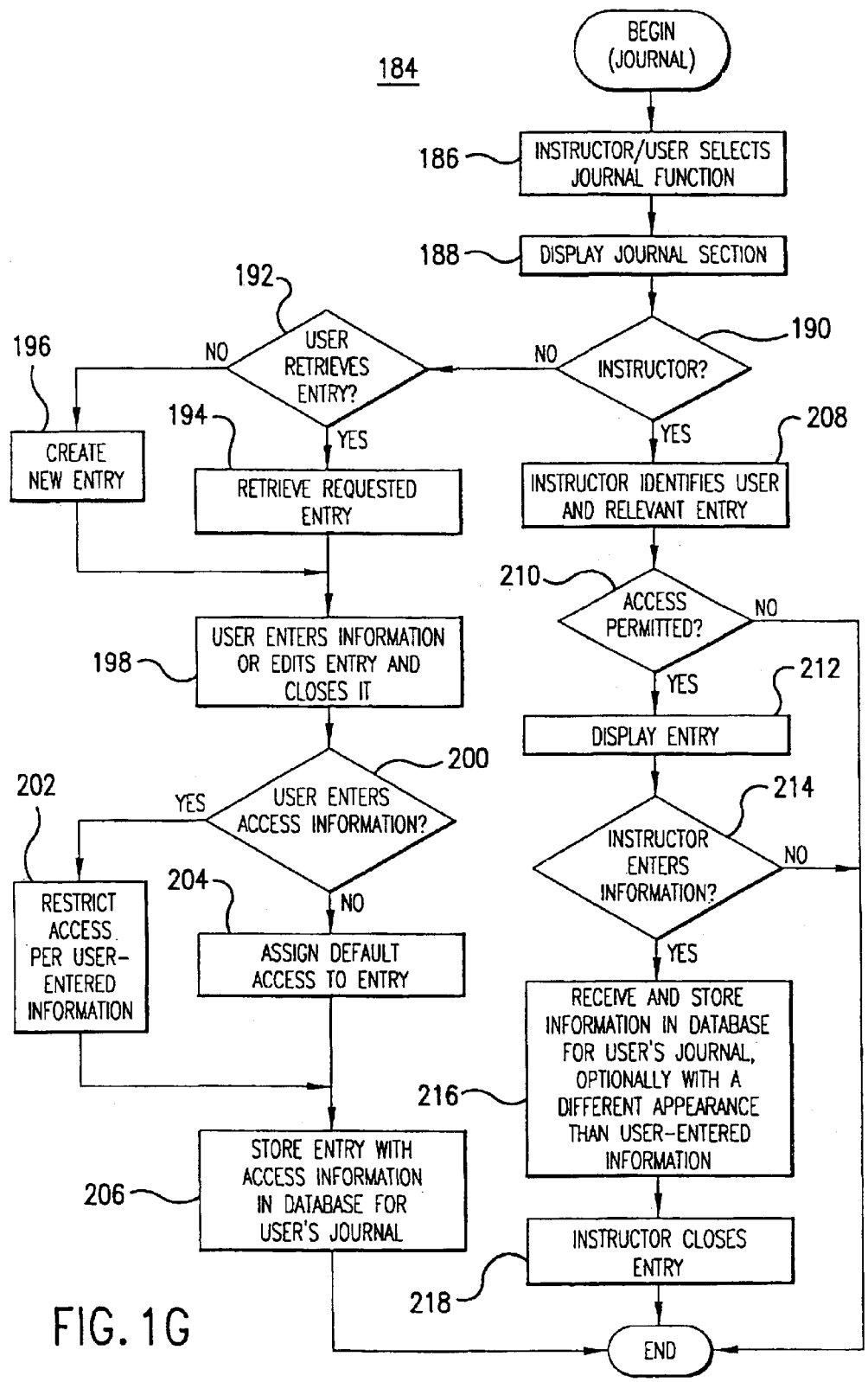
FIG. 1G is a flow chart of a journal method.
Figure 1H:
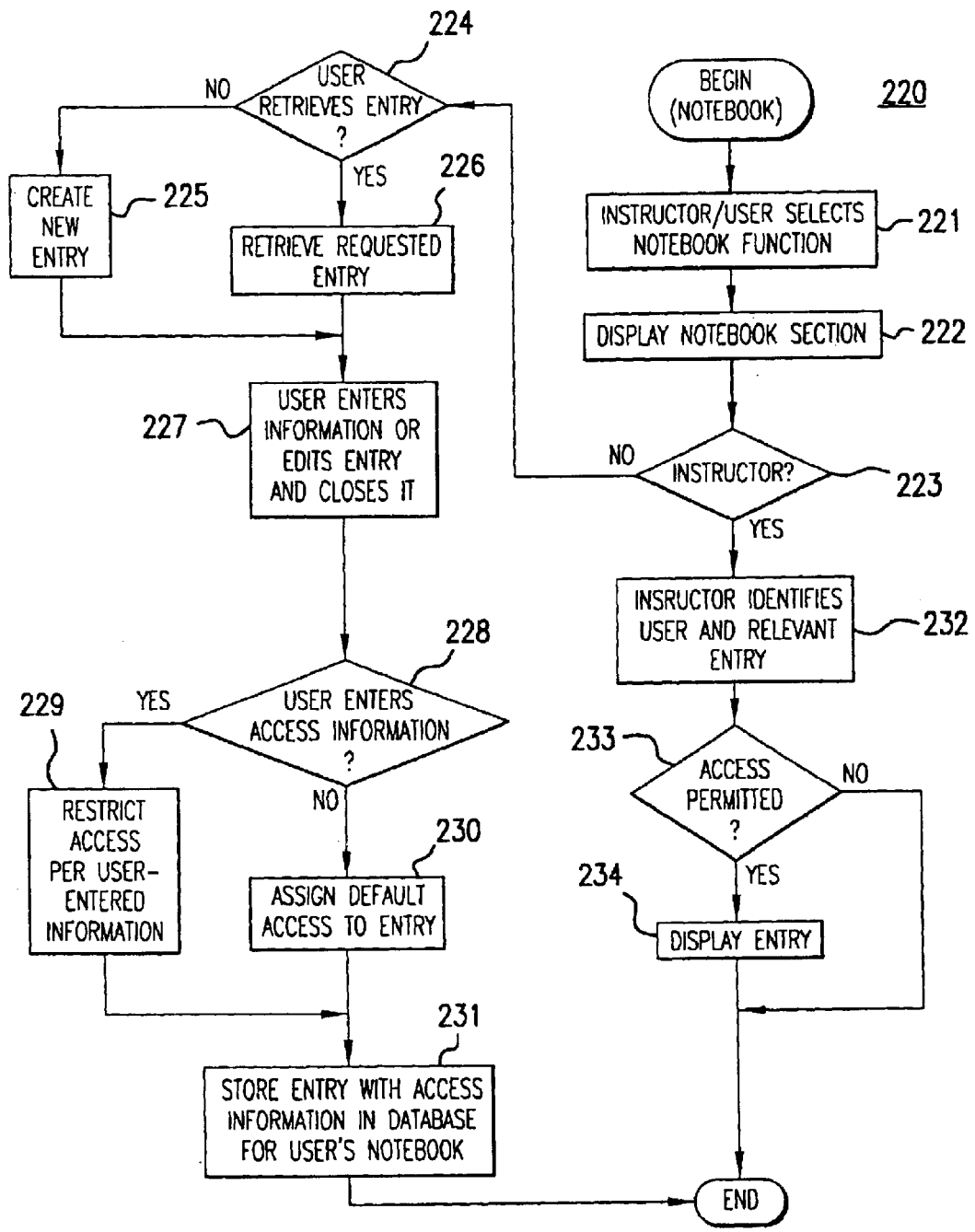
FIG. 1H is a flow chart of a notebook method.
Figure 11:
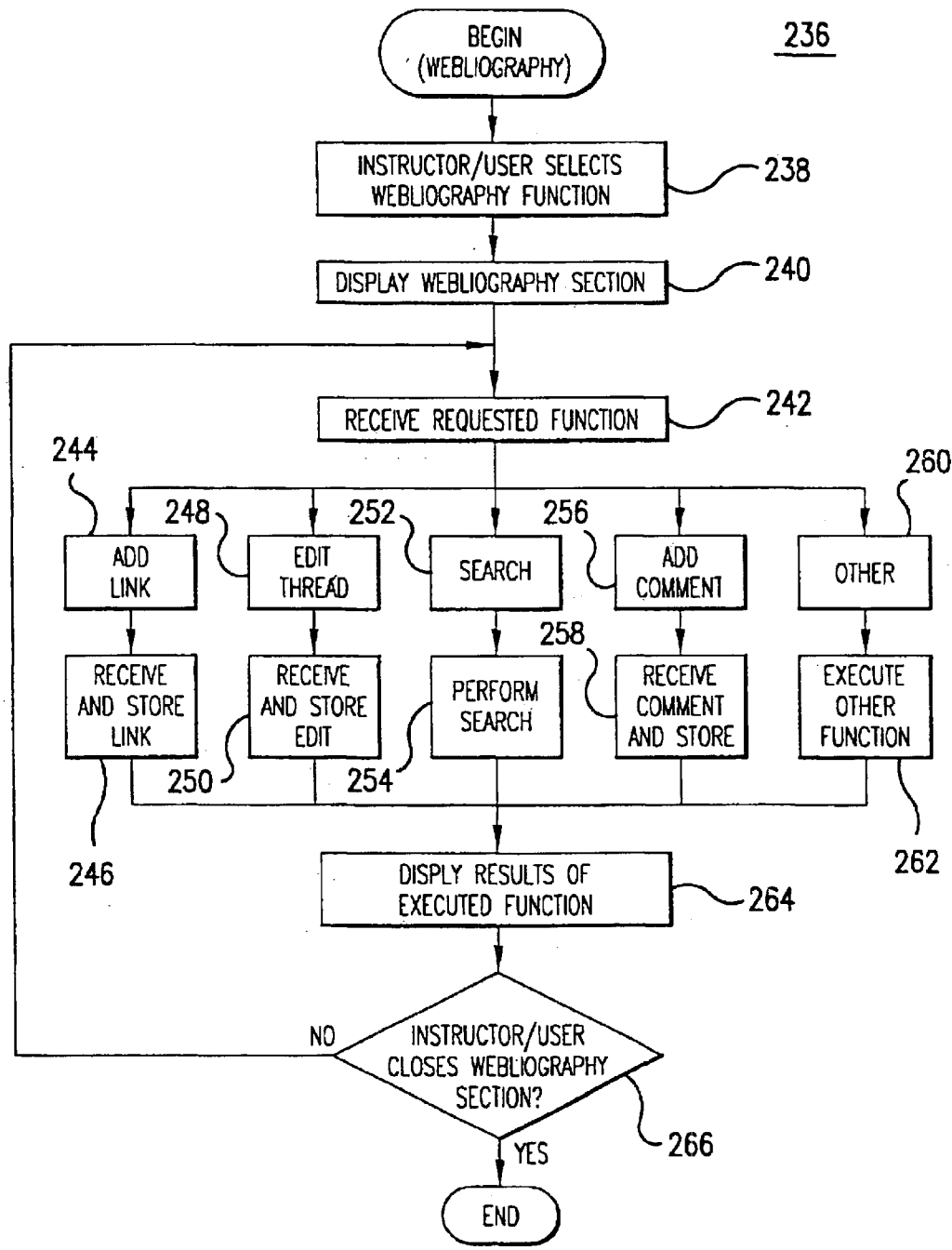
Figure 1J:
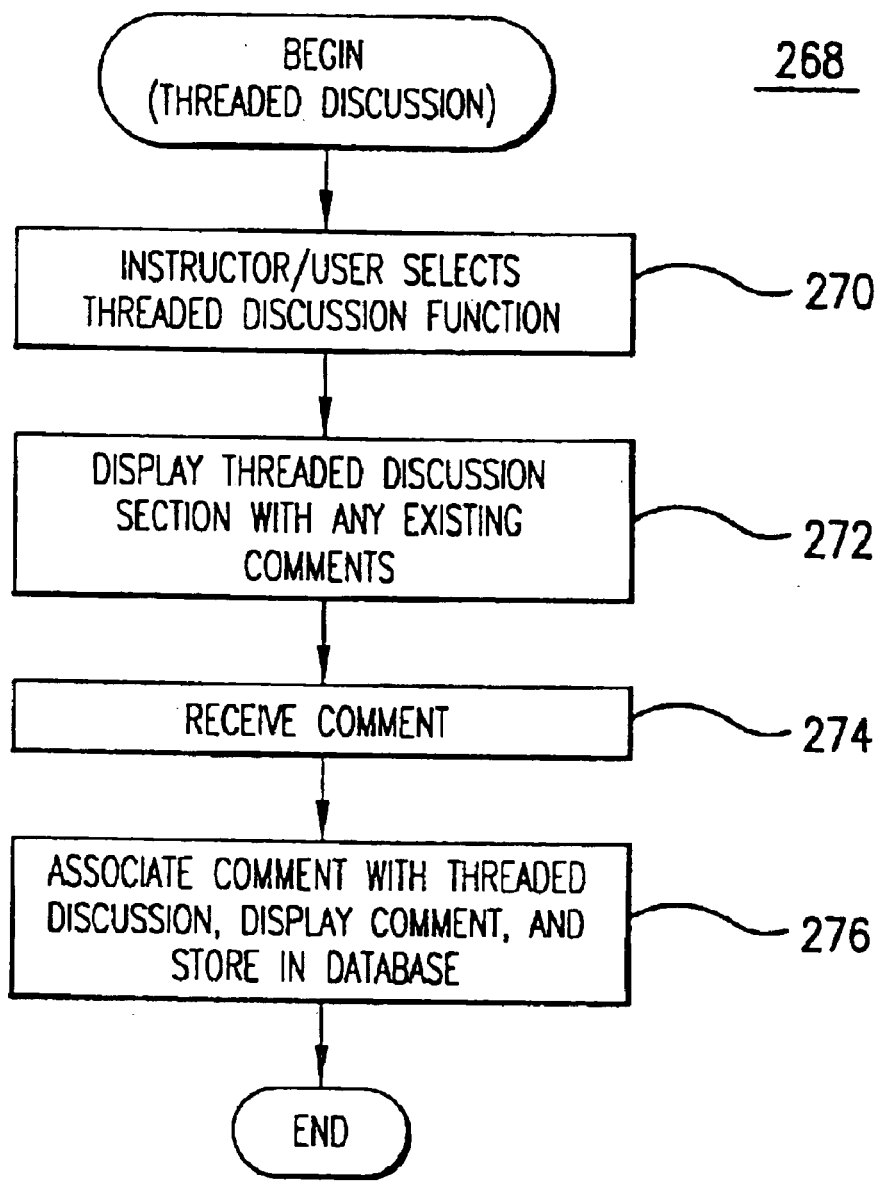
FIG. 1J is a flow chart of a threaded discussion method.
Figure 1K:
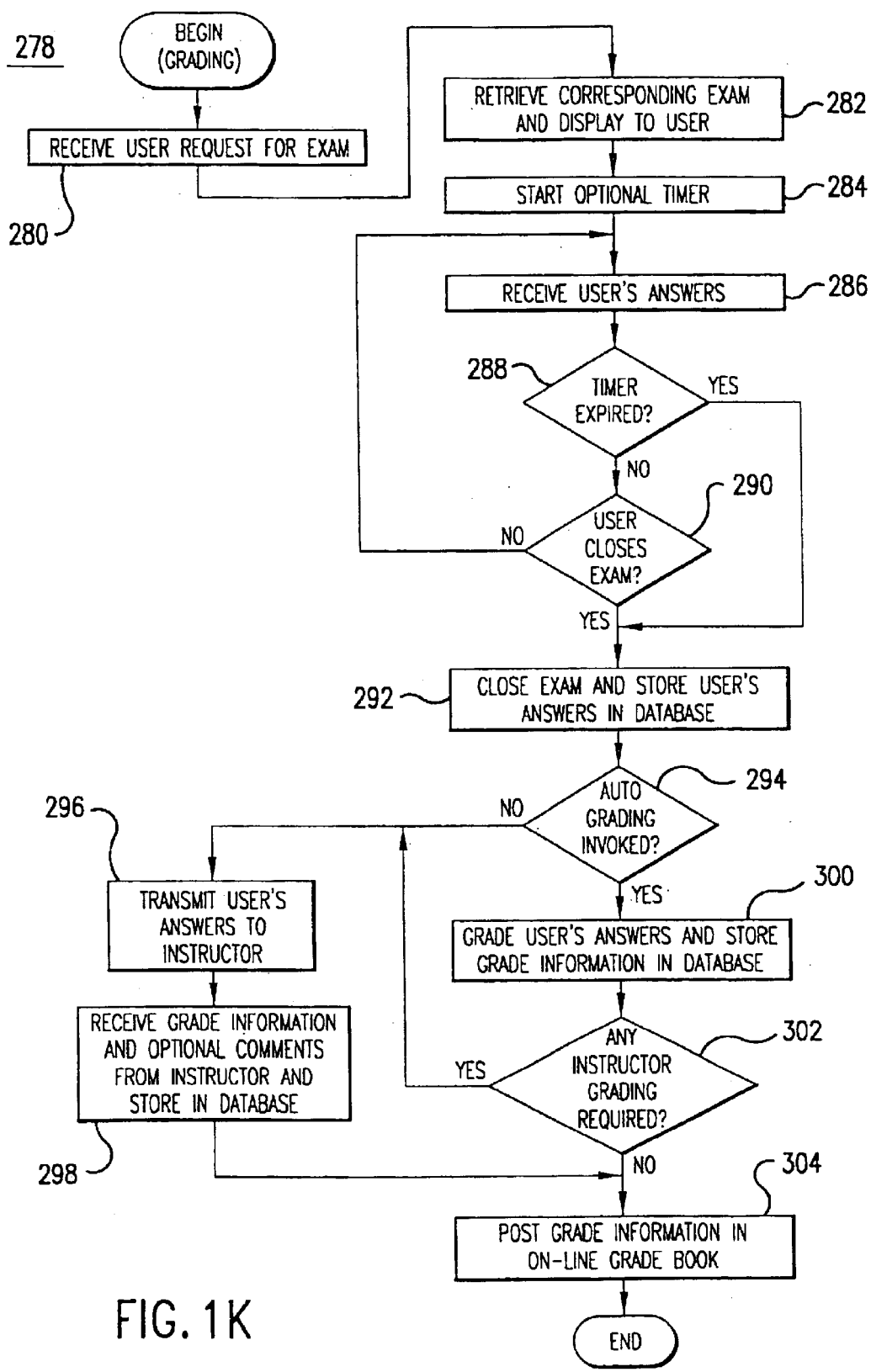
FIG. 1K is a flow chart of a grading method.
Figure 1L:
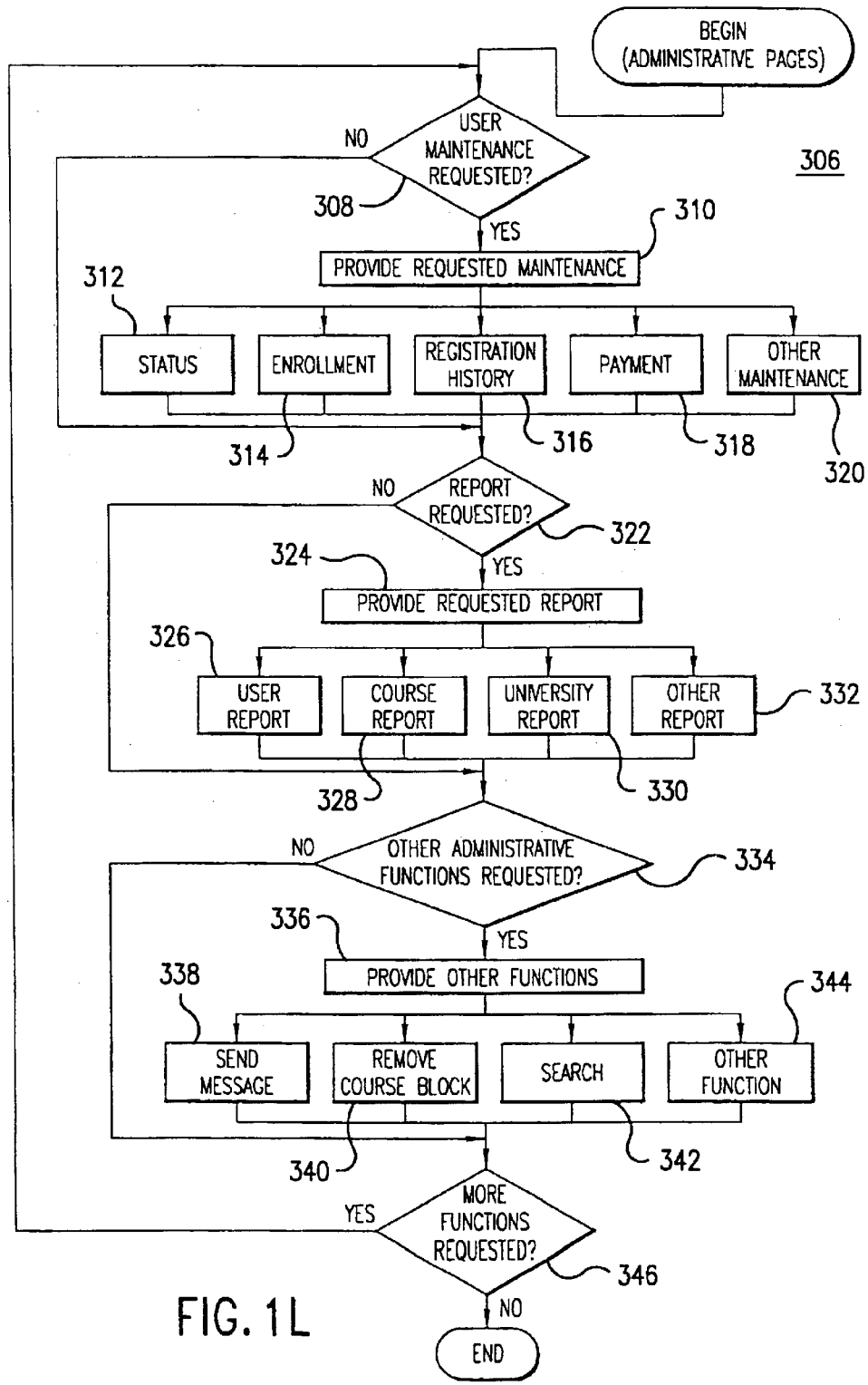
FIG. 1L is a flow chart of administrative pages method.
Figure 1M:
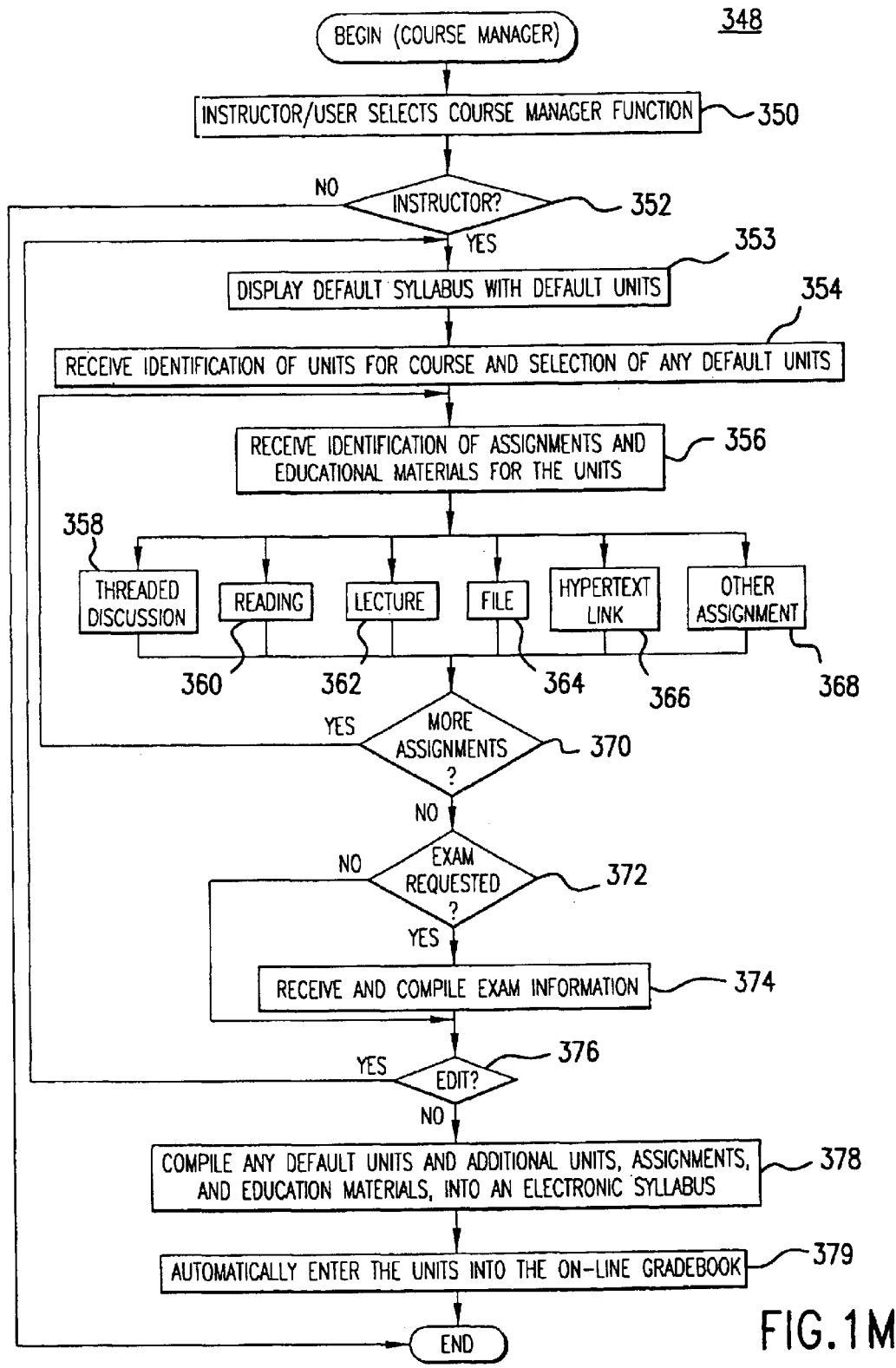
FIG. 1M is a flow chart of a course manager method.
Figure 1N:
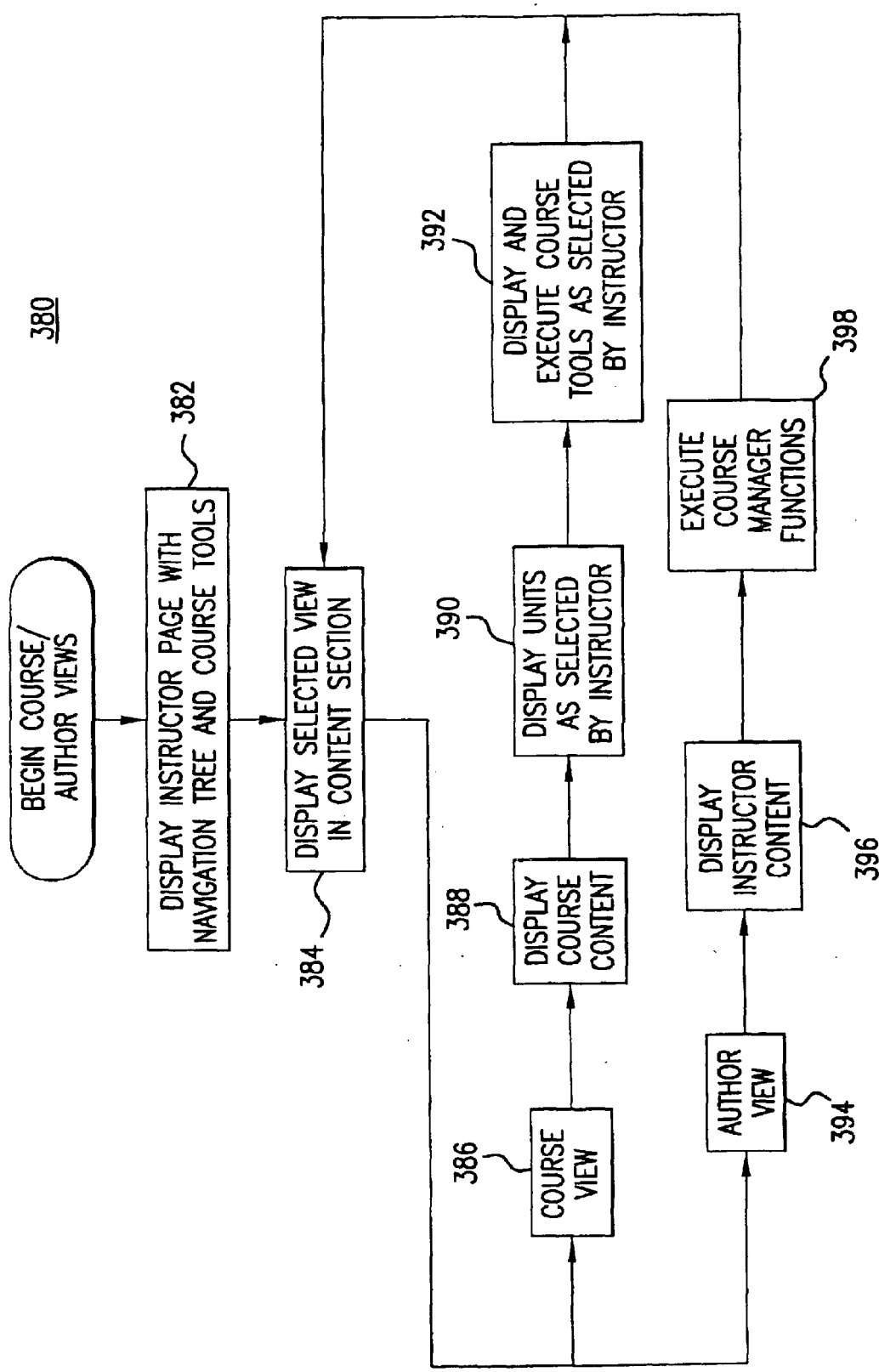
FIG. 1N is a flow chart of a course/author views method.
Figure 10:
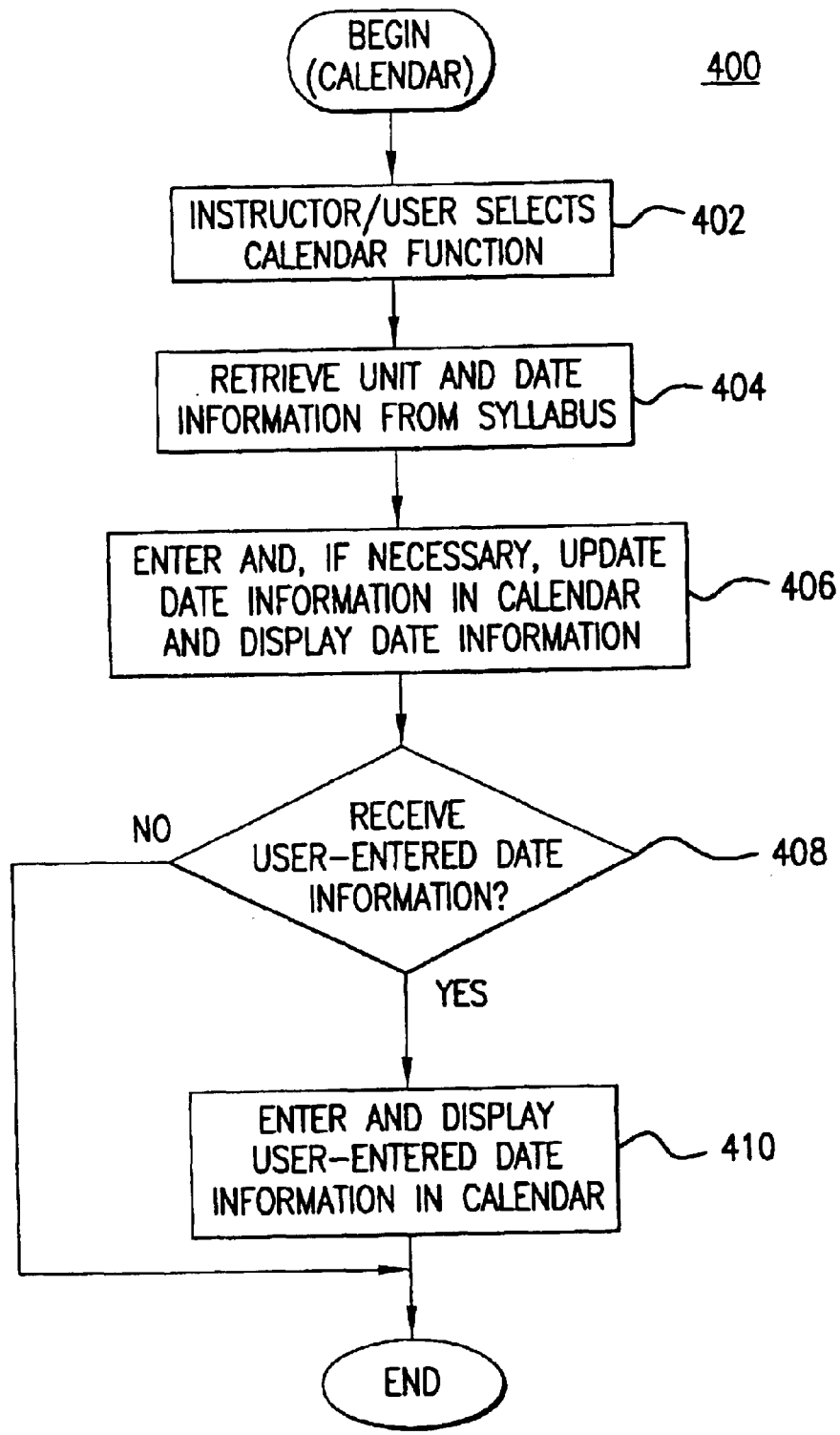
Figure 1P:
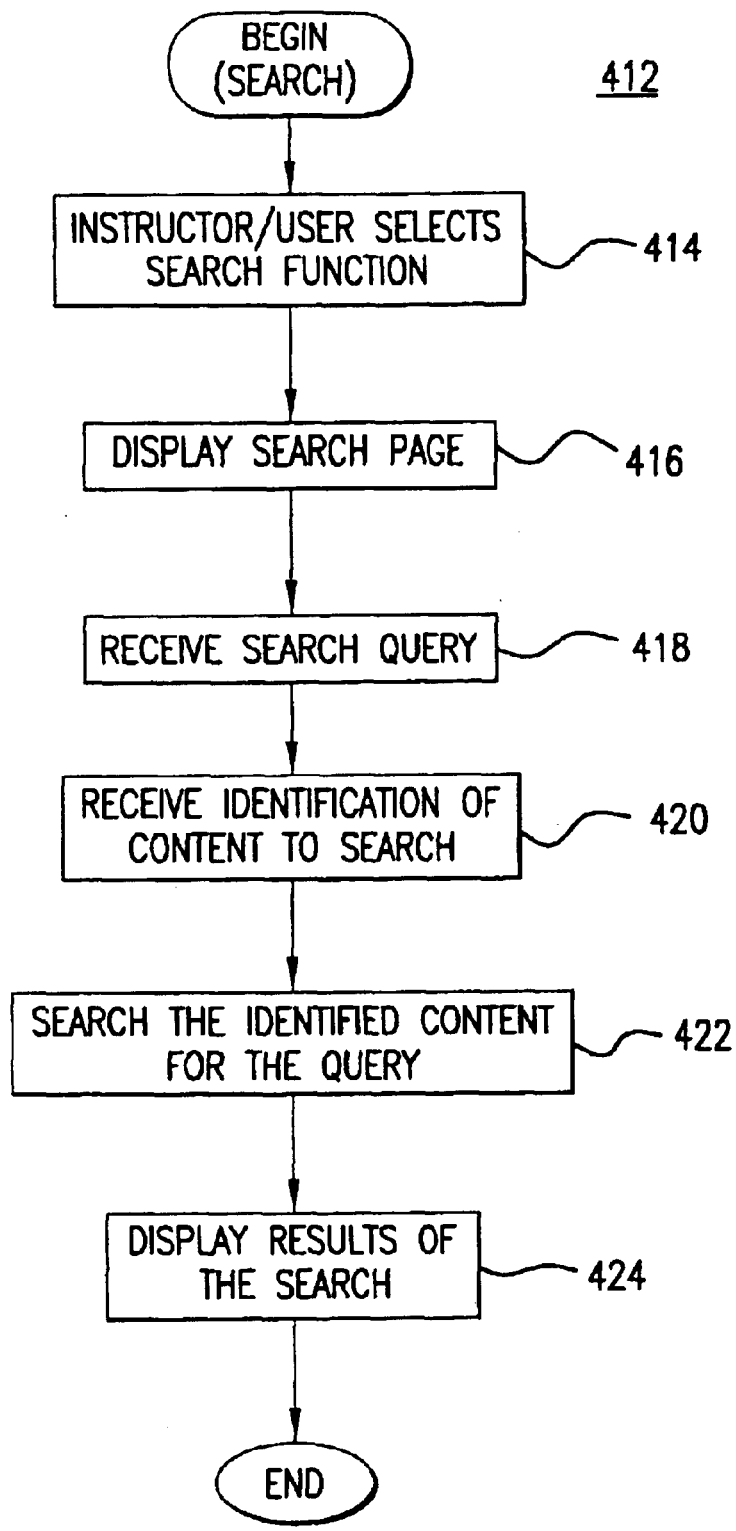
Figure 2A:
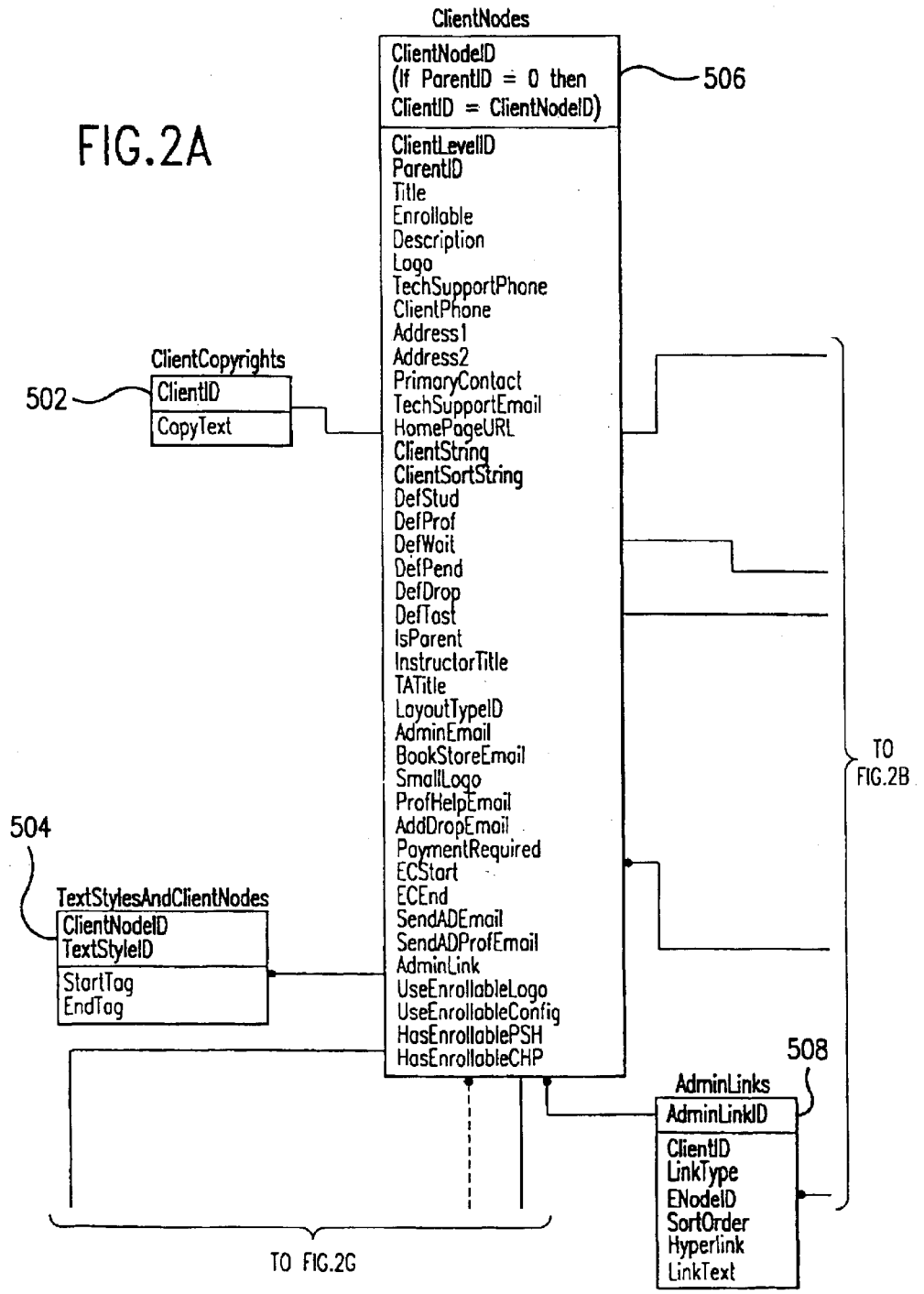
FIGS. 2A–2R are diagrams of a database map illustrating a relational database for an on-line educational system.
Figure 2B:
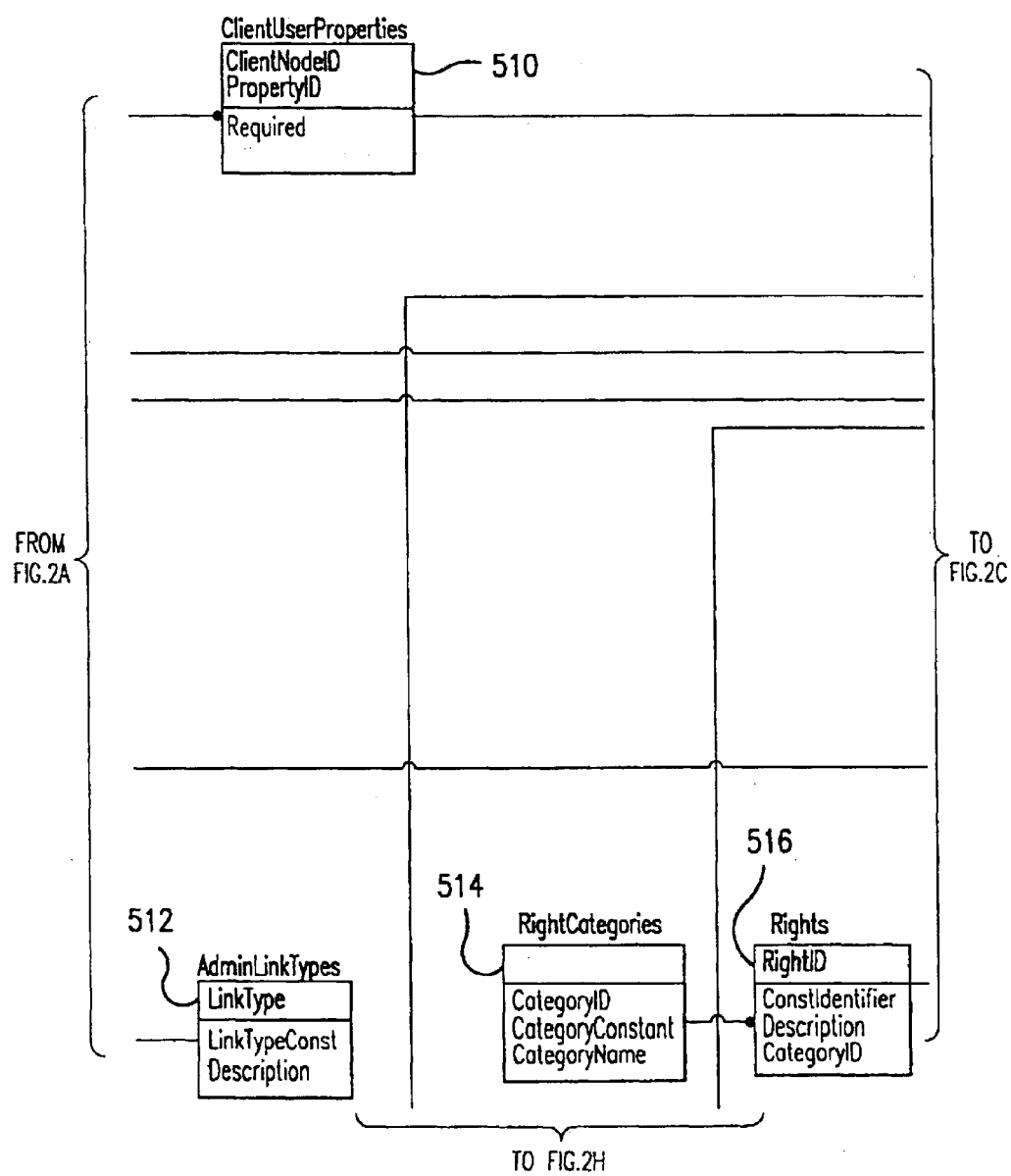
FIG. 2 is a diagram illustrating arrangement of FIGS. 2A–2R for a database map.
Figure 2C:
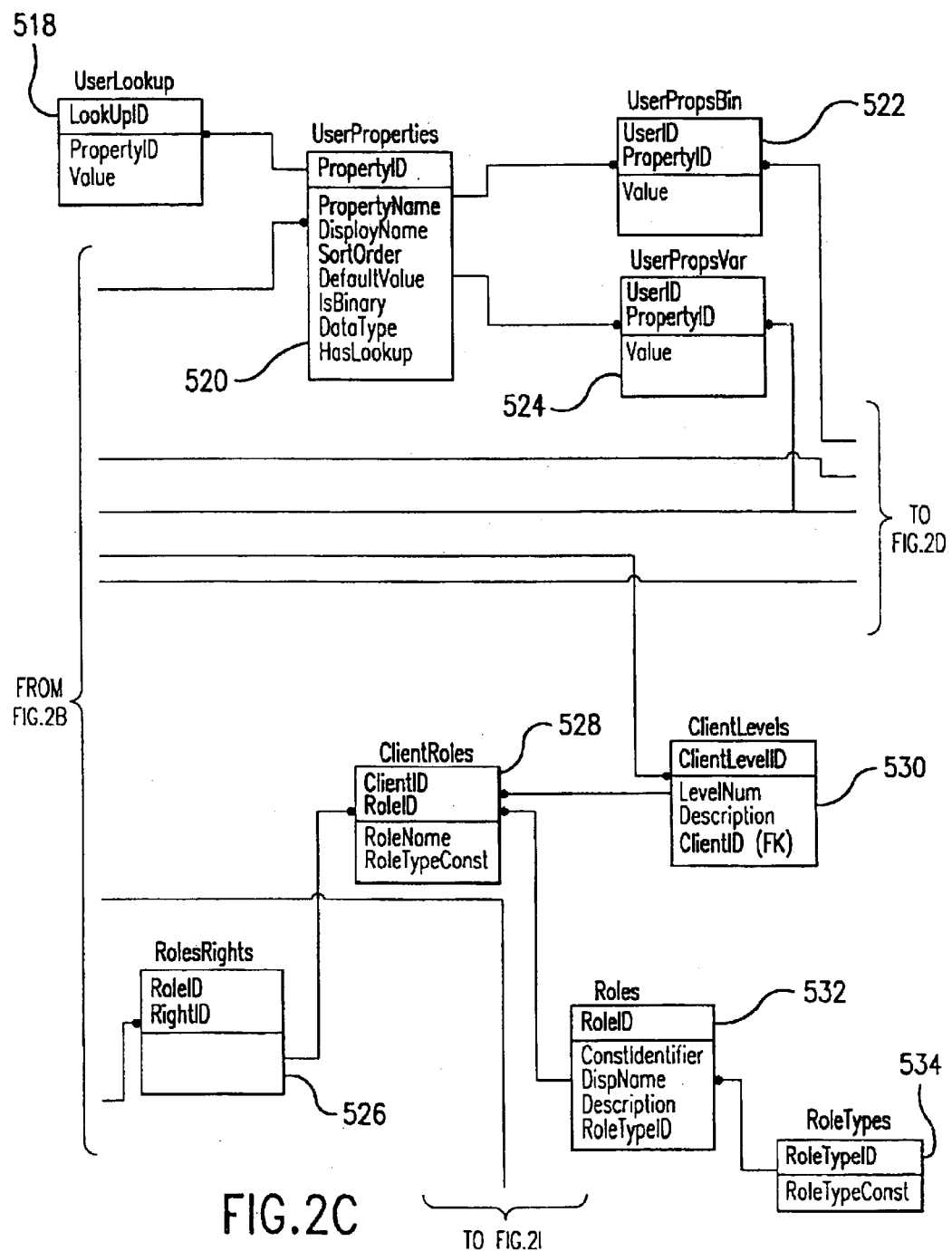
Figure 2E:
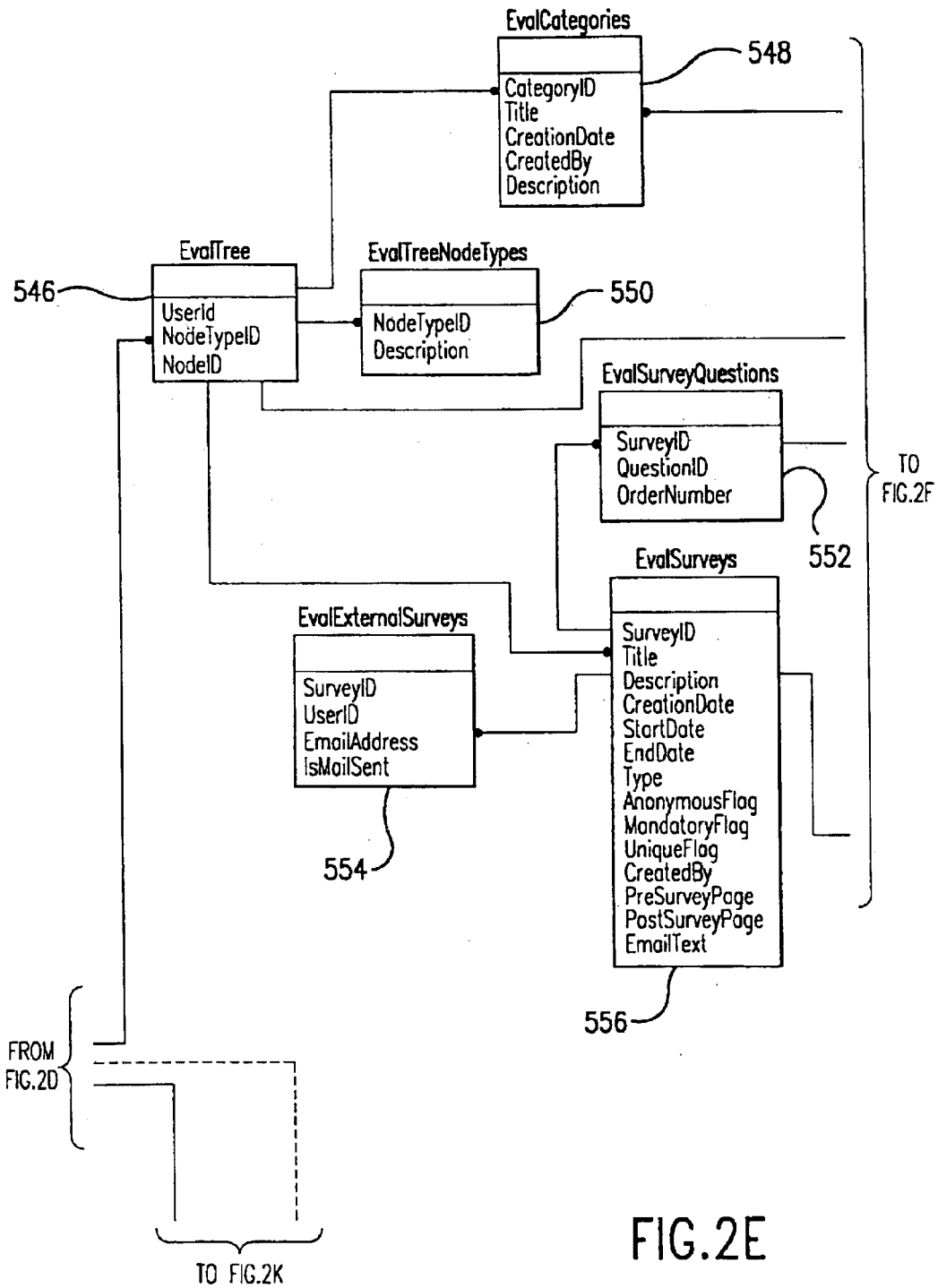
Figure 2F:
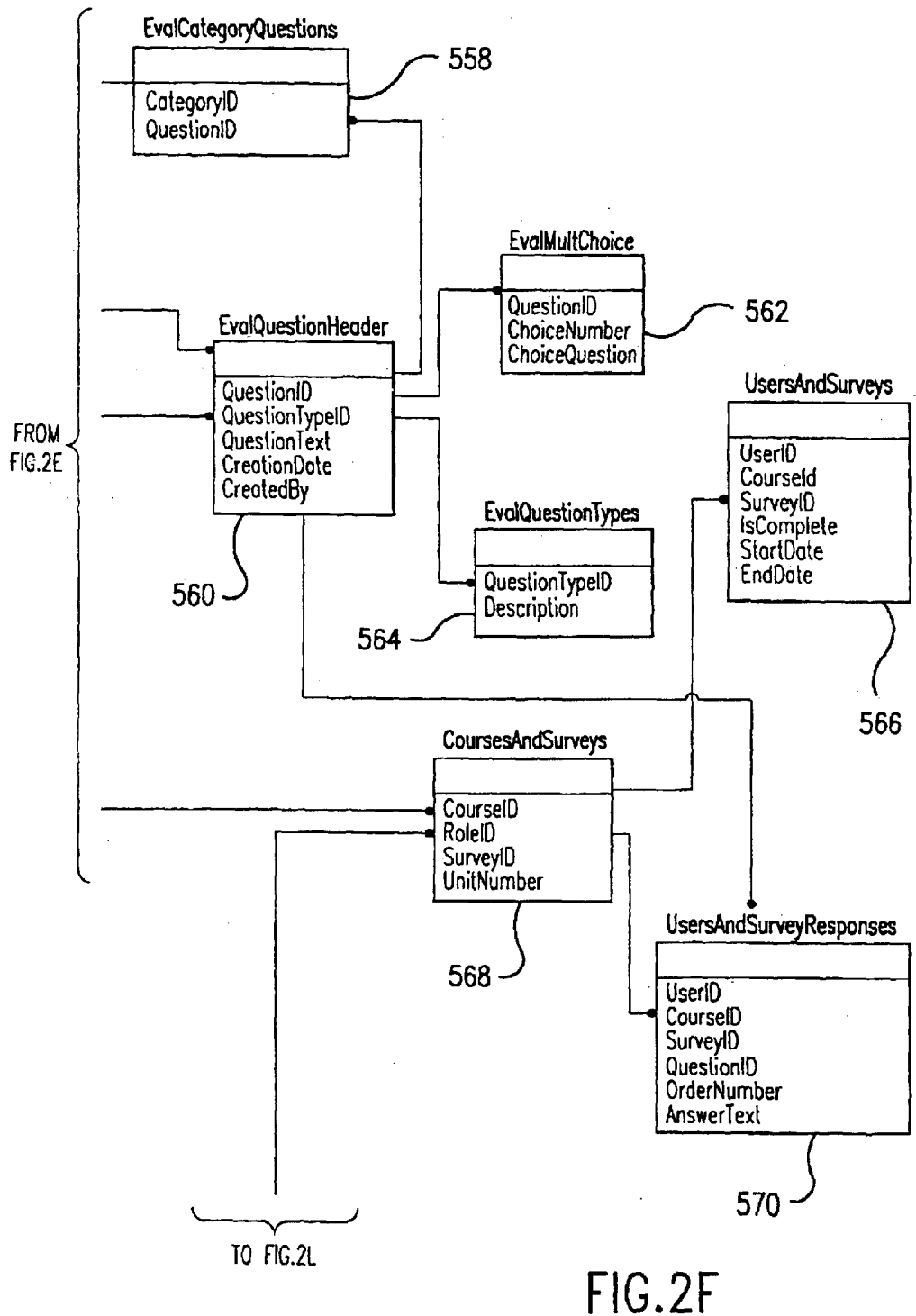
Figure 2G:
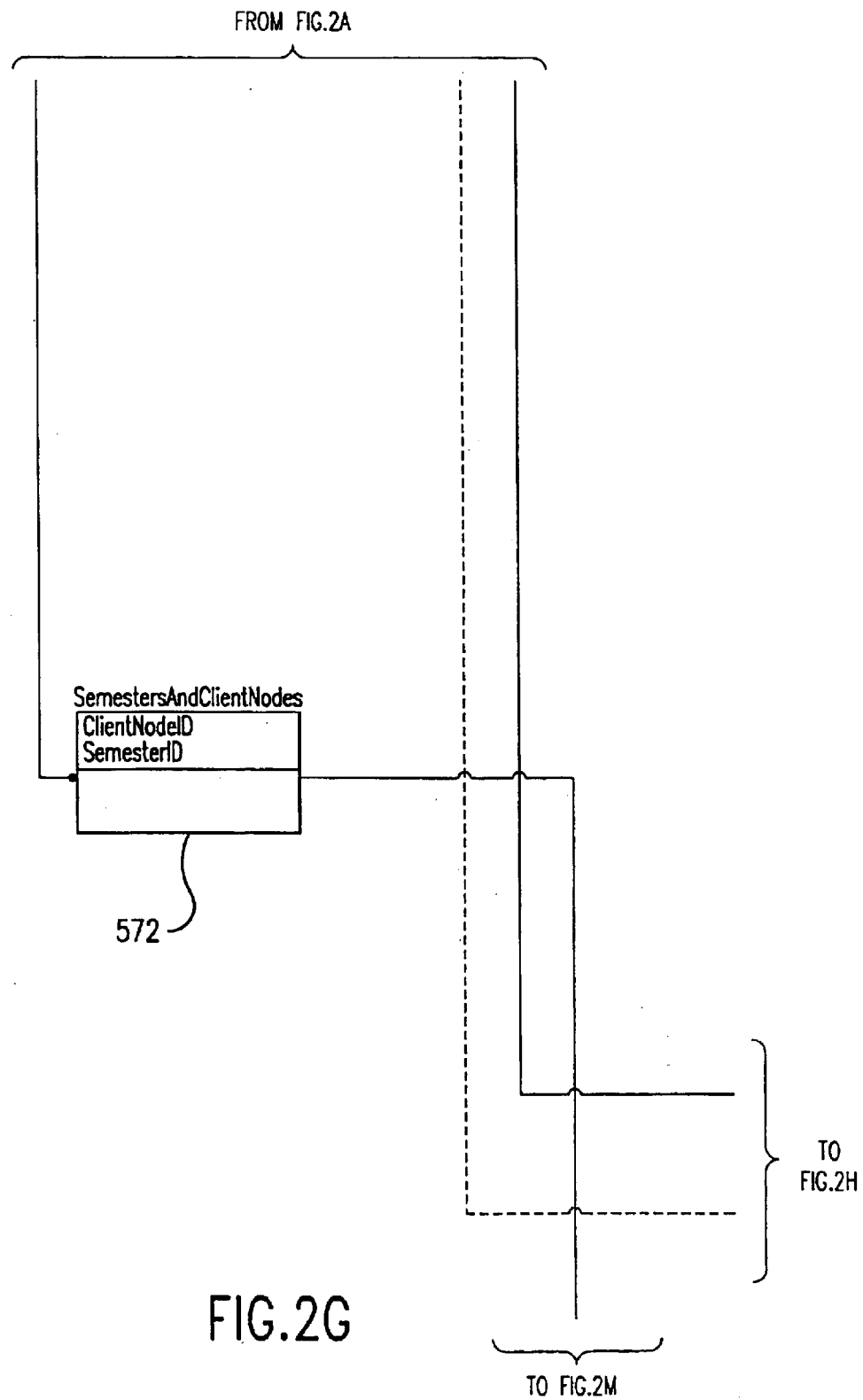
Figure 2I:
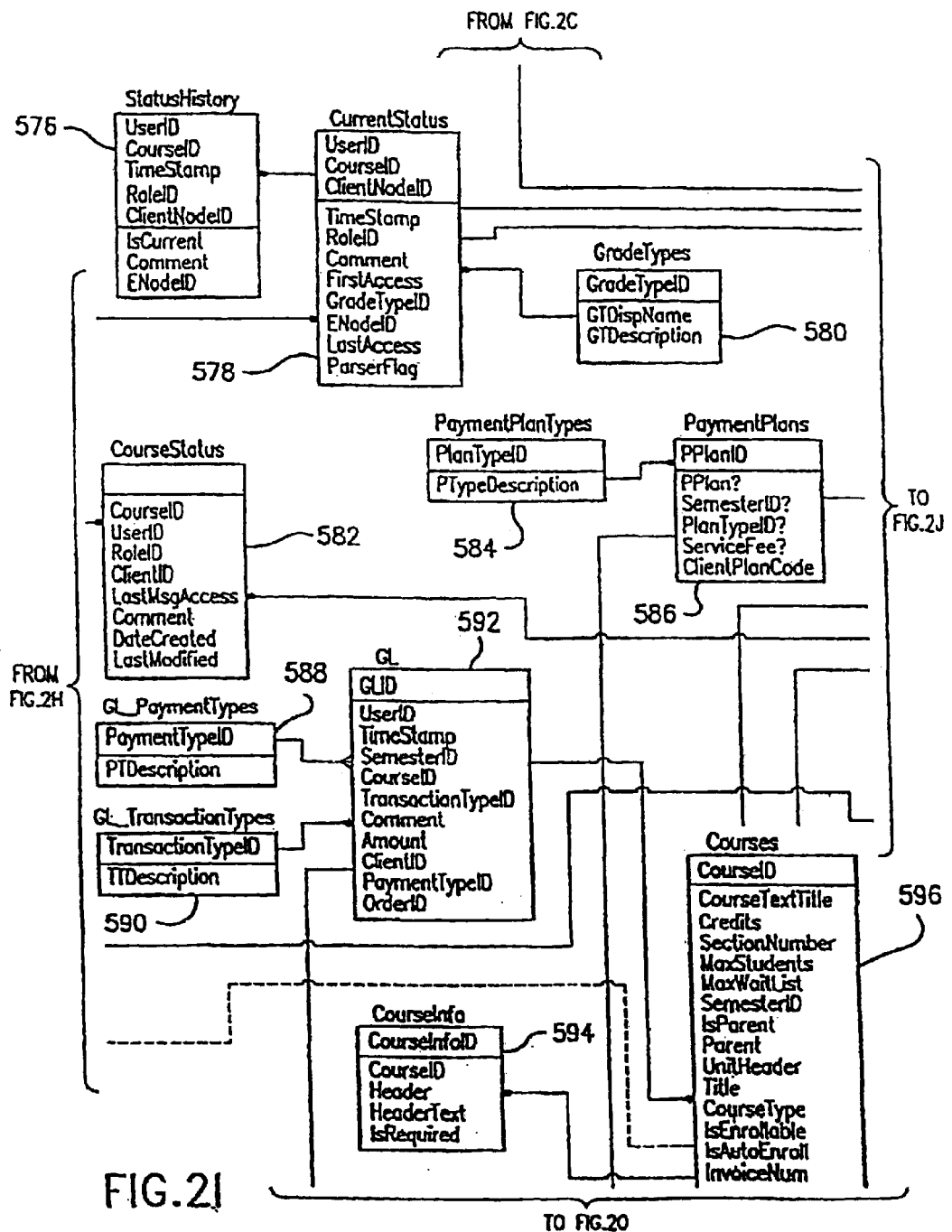
Figure 2J:
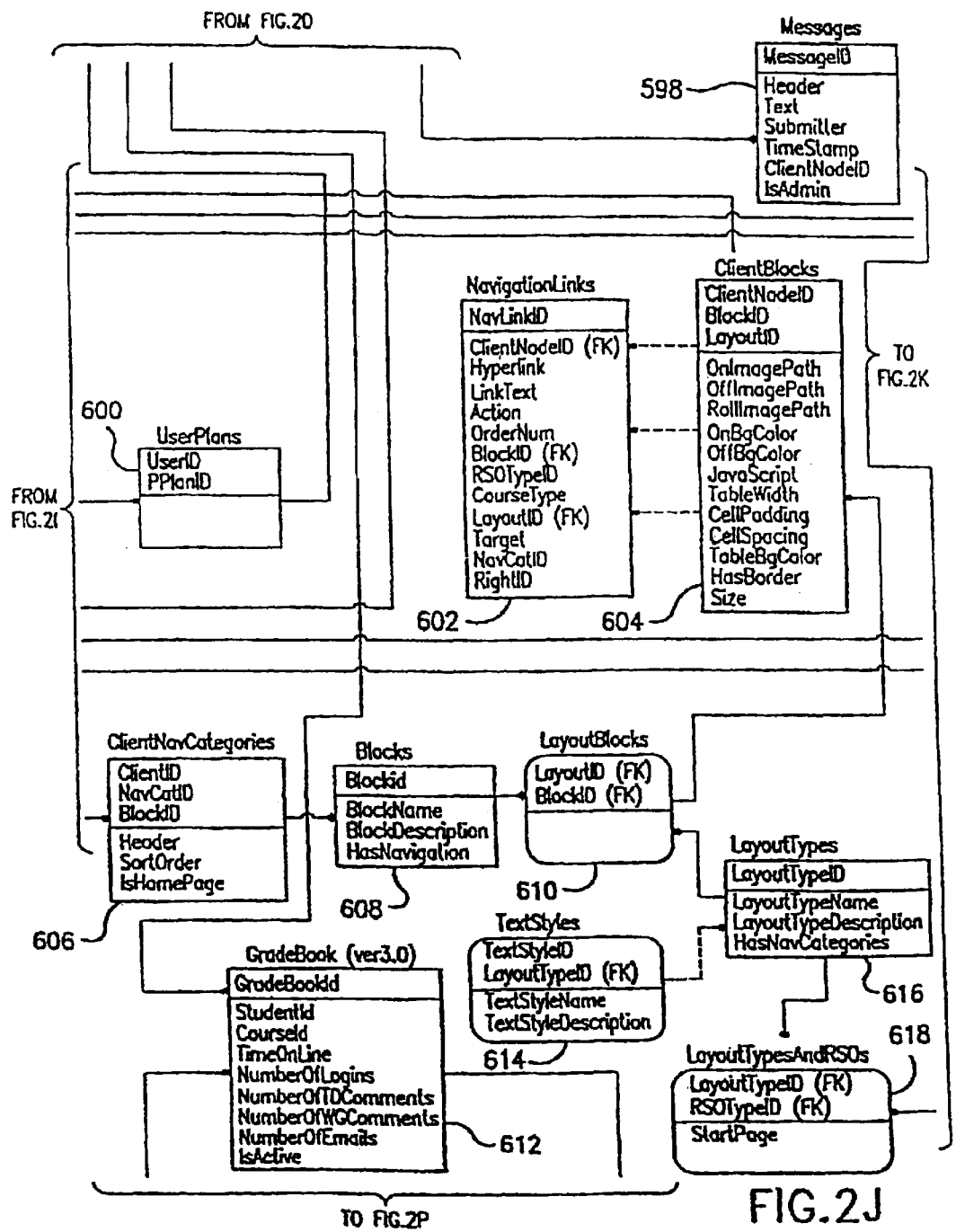
Figure 2K:
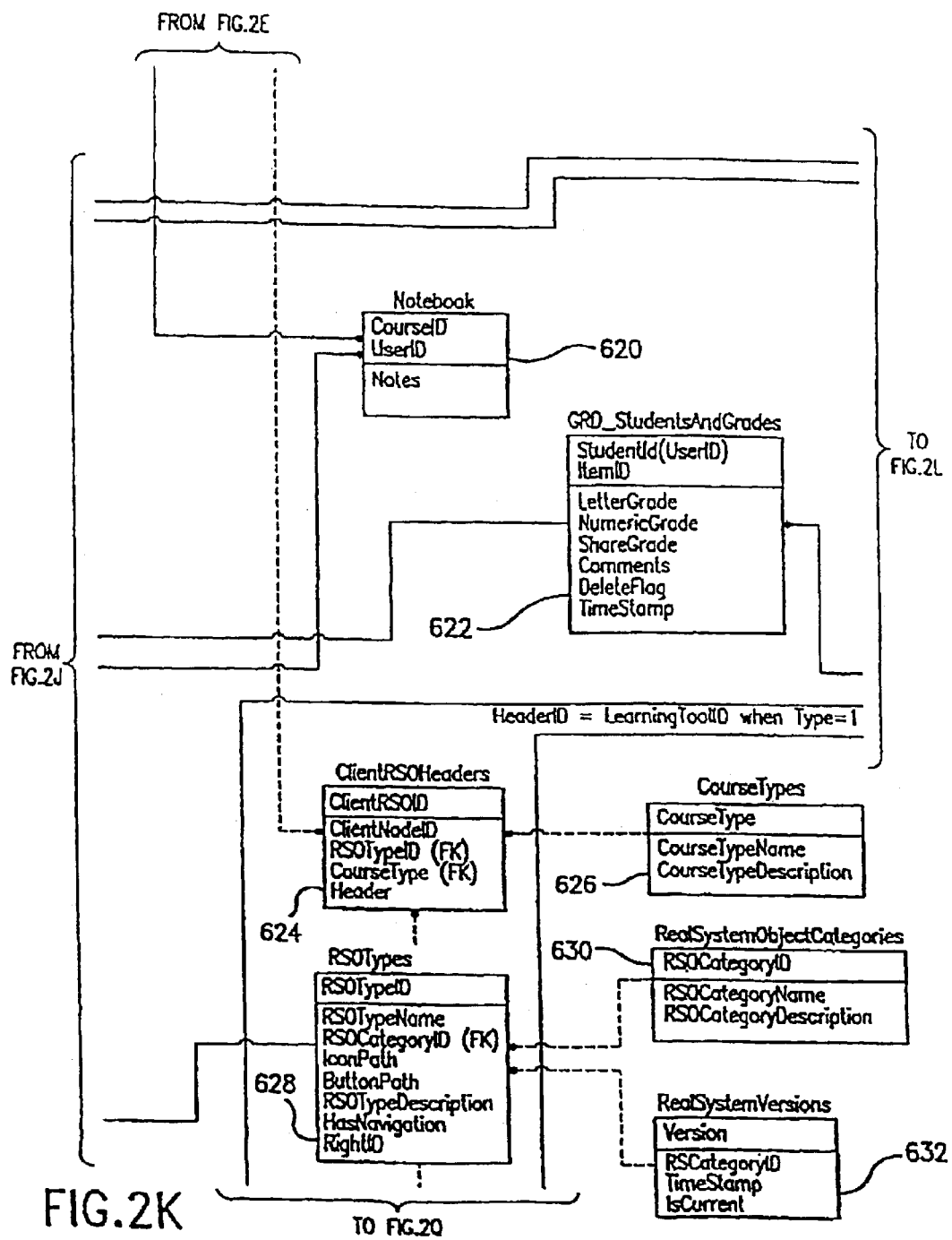
Figure 2L:
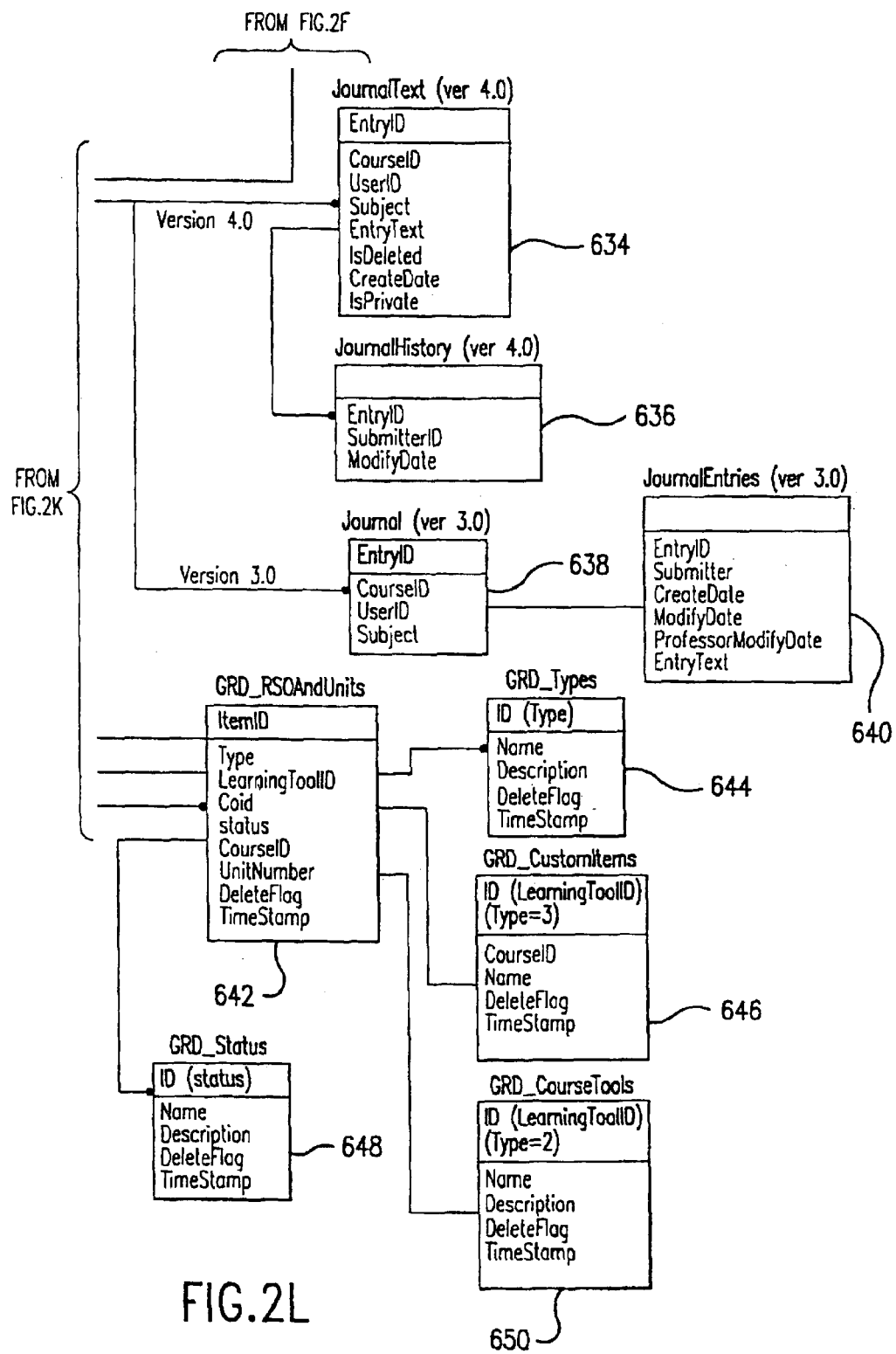
Figure 2M:
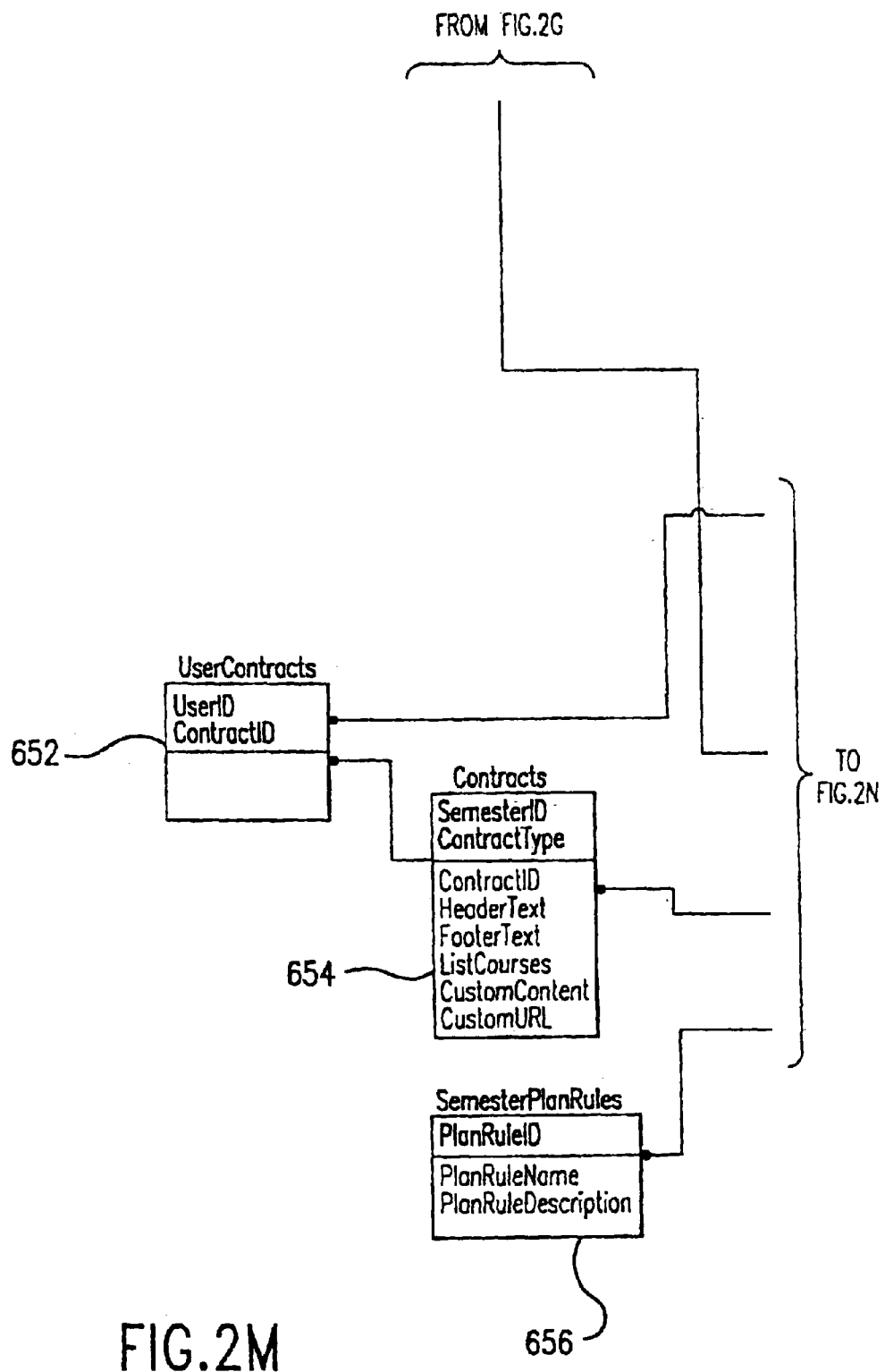
Figure 20:
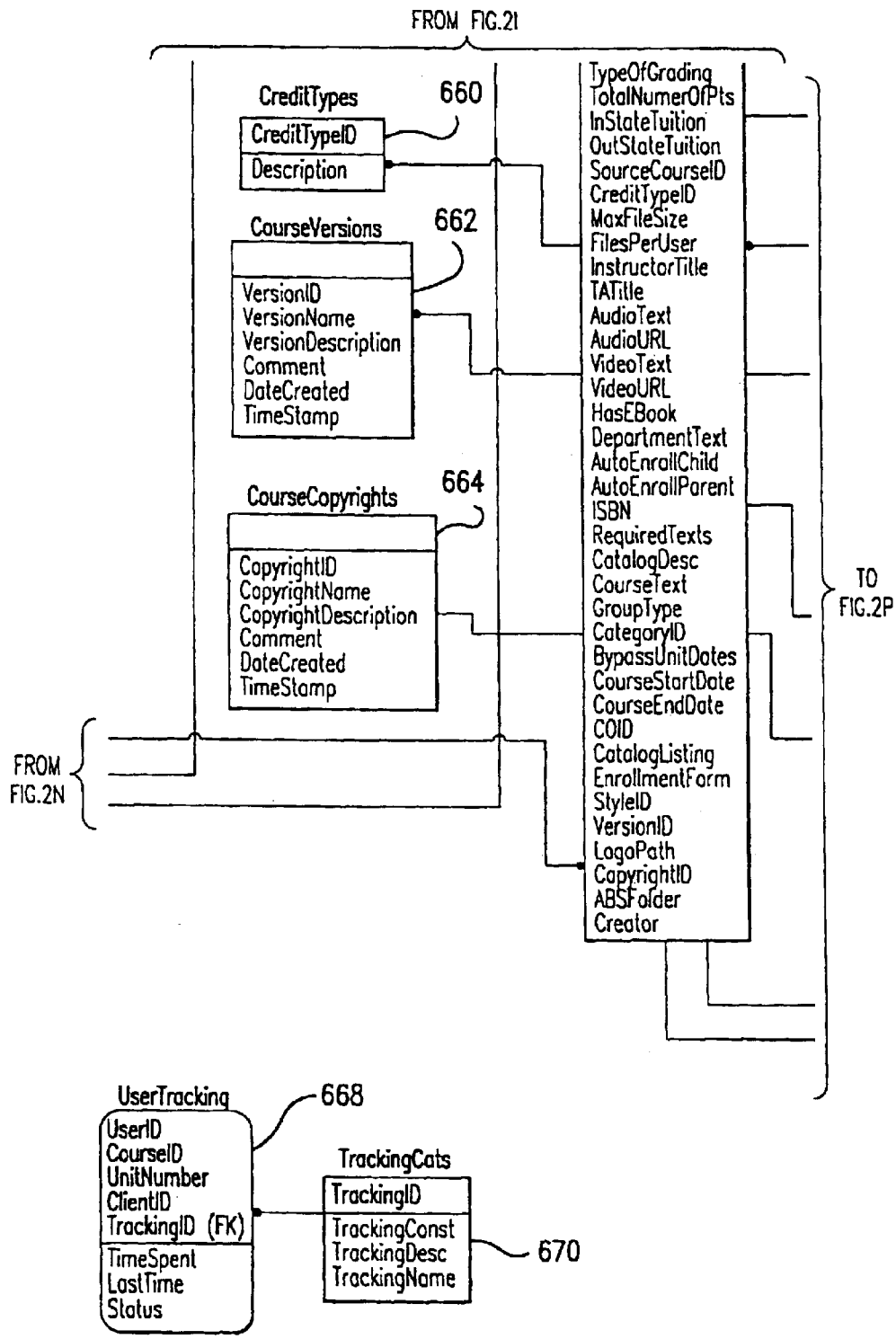
Figure 2P:
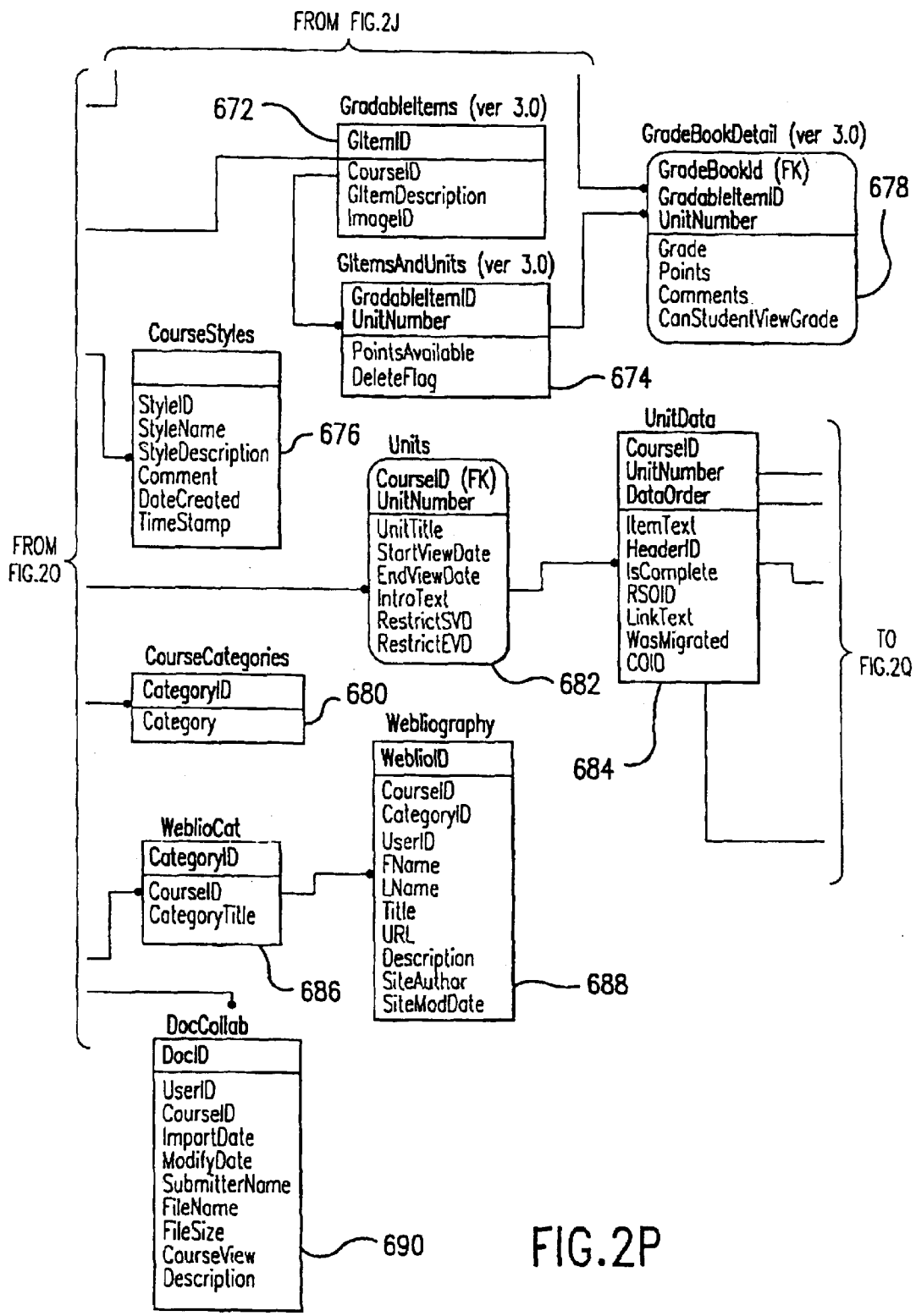
Figure 2Q:
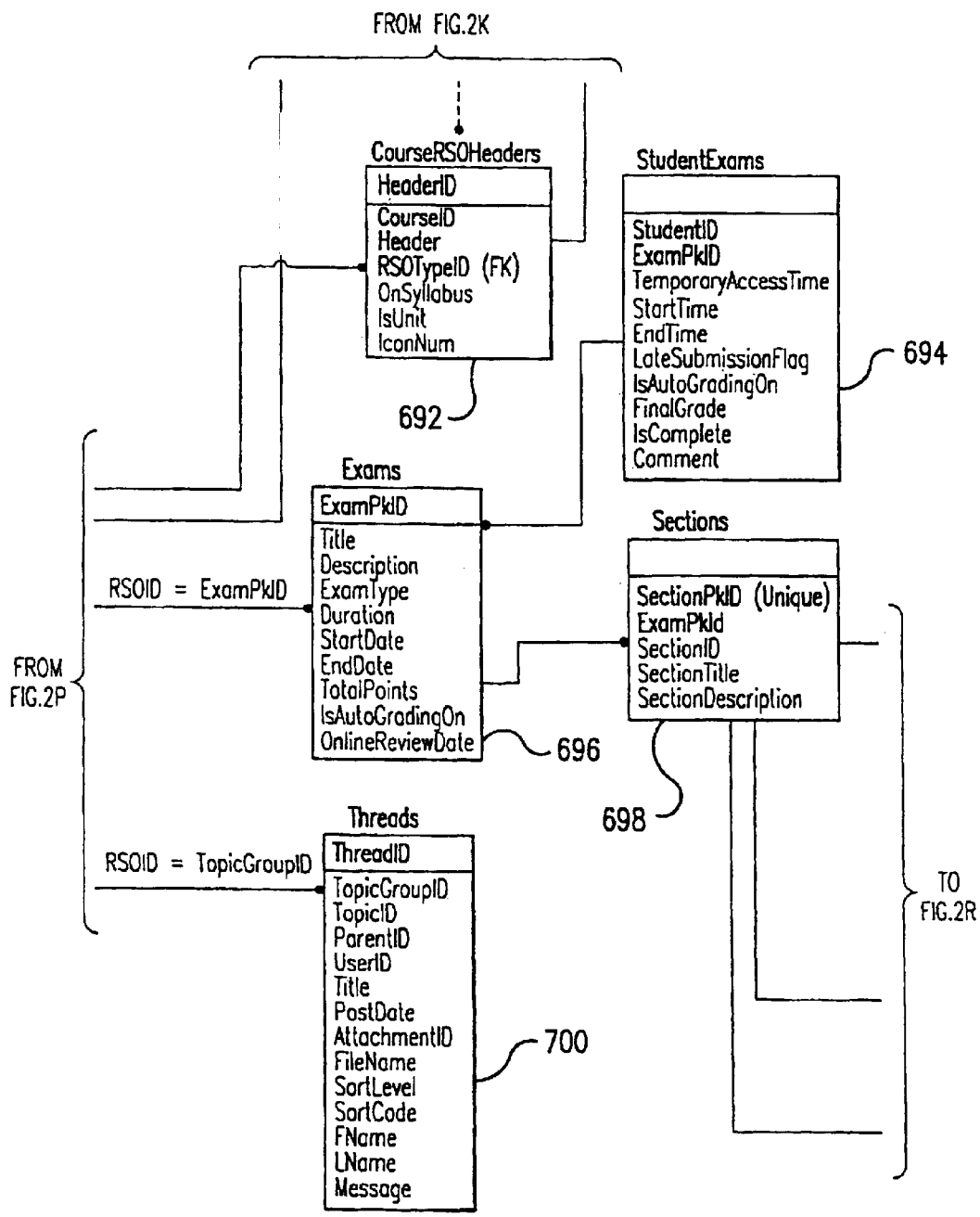
Figure 2R:
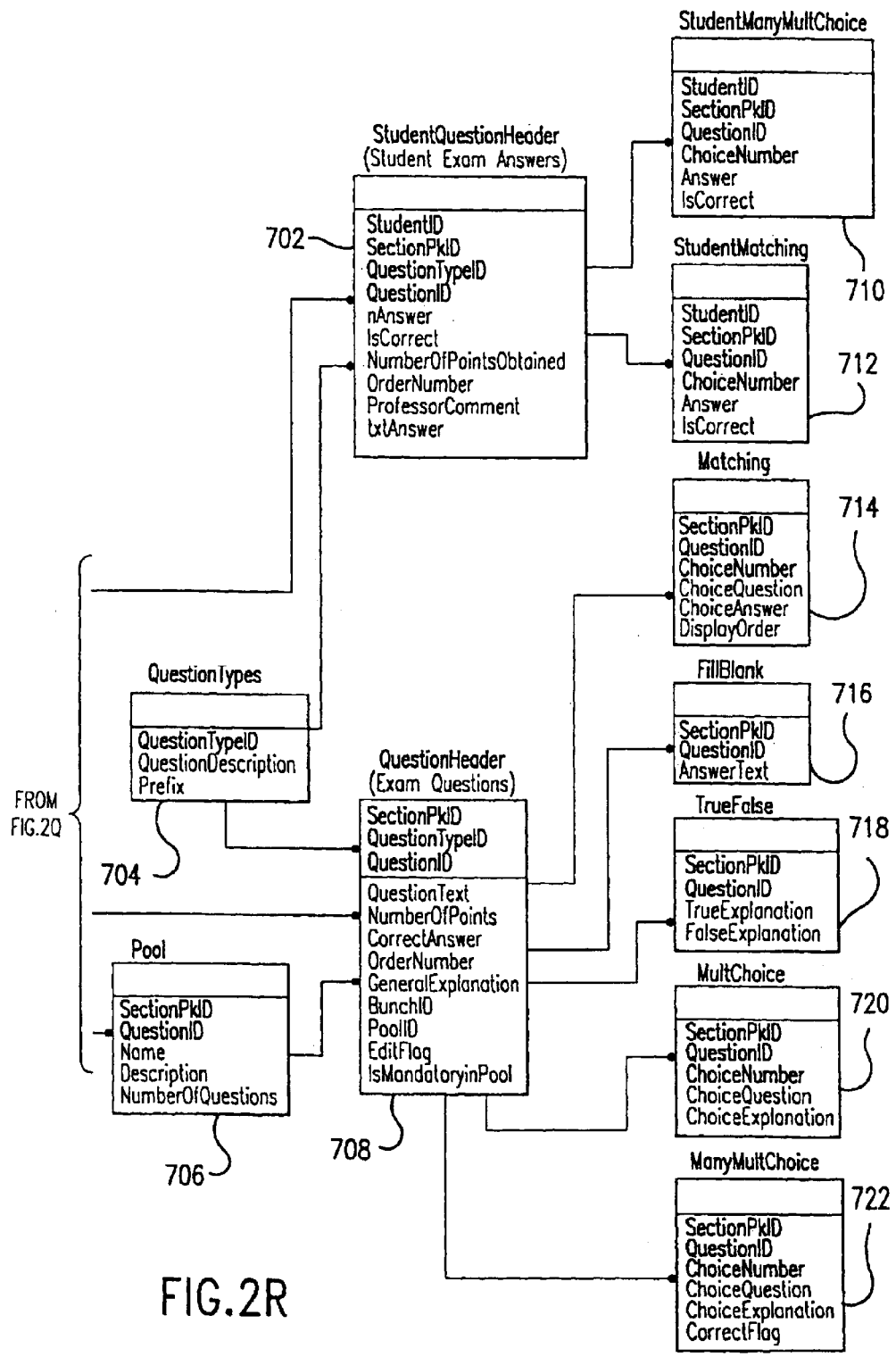

The processing to support the screens in FIGS. 3A–3X and 4A–4F is shown in the flow charts of FIGS. 1A–1P. The processing may be implemented in software, such as software modules, for execution by computers or other machines. The exemplary database structure to store information received through the screens and to display information in the screens is shown in the database map of FIGS. 2A–2R, which illustrate a relational database structure providing a particular arrangement of tables and associations between them. FIG. 2 illustrates arrangement of FIGS. 2A–2R for the database map. Appendix A contains a data element dictionary explaining the structure of the relational database shown in FIGS. 2A–2R. FIG. 1 illustrates exemplary hardware components to implement the system processing, screens, and database structure.

On-Line System

FIG. 1 illustrates an exemplary system 10 for implementing an on-line educational system. System 10 includes instructor machines 12 and 14 connected with a network 40 such as the Internet or other network such as any wide-area or local-area network. Instructors at instructor machines 12 and 14 may enter information to build and develop an on-line educational course and provide teaching for the course through interaction with their machines and a server 36. User machines 16 and 18 are also connected with network 40. Users or students at user machines 16 and 18 interact with one or more instructors at instructor machines 12 and 14, with users at other user machines, and with server 36 in order to participate in one or more on-line educational courses.

Server 36 is connected with network 40 and may be used by instructor machines 12 and 14, and user machines 16 and 18, to store information for educational courses and provide content or other information for the courses. System 10 may also include the ability to access one or more web site servers 38 in order to obtain content from the World Wide Web for use with educational courses. Only two instructor machines and user machines are shown for illustrative purposes only; system 10 may include many instructor machines and user machines and may be scalable to add or delete instructor or user machines to or from the network.

User machine 16 illustrates typical components of a user or instructor machine. User machine 16 typically includes a memory 20, a secondary storage device 30, a processor 32, an input device 34, a display device 28, and an output device 26. Memory 20 may include random access memory (RAM) or similar types of memory, and it may store one or more applications 24, and a web browser 22, for execution by processor 32. Secondary storage device 30 may include a hard disk drive, floppy disk drive, CD-ROM drive, or other types of non-volatile data storage. Processor 32 may execute applications or programs stored in memory 20 or secondary storage 30, or received from the Internet or other network 40. Input device 34 may include any device for entering information into machine 16, such as a microphone, digital camera, video recorder or camcorder, keyboard, cursor-control device, or touch-screen. Display device 28 may include any type of device for presenting visual information such as, for example, a computer monitor or flat-screen display. Output device 26 may include any type of device for presenting a hard copy of information, such as a printer, and other types of output devices include speakers or any device for providing information in audio form.

Web browser 22 is used to access information for an on-line educational course and display it in web pages, and examples of those pages are shown in the screens provided in FIGS. 3A–3X and 4A–4F. Examples of web browsers include the NETSCAPE NAVIGATOR software program and the MICROSOFT INTERNET EXPLORER software program. Any web browser or other application capable of retrieving content from a network and displaying pages or screens may be used.

Instructor machines 12 and 14, and user machine 18, may include the same components as user machine 16. Therefore, examples of user or instructor machines for interacting with an on-line educational system include personal computers, laptop computers, notebook computers, palm top computers, network computers, or any processor-controlled device capable of executing a web browser or other type of application for interacting with the system.

Server 36 typically includes a memory 42, a secondary storage device 50, a processor 52, an input device 54, a display device 48, and an output device 46. Memory 42 may include random access memory (RAM) or similar types of memory, and it may store one or more applications 44 for execution by processor 32. Secondary storage device 50 may include a hard disk drive, floppy disk drive, CD-ROM drive, or other types of non-volatile data storage. Processor 52 may execute one or more applications or programs stored in memory 42 or secondary storage 50, or received from the Internet or other network 40. Input device 54 may include any device for entering information into server 36, such as a microphone, digital camera, video recorder or camcorder, keyboard, cursor-control device, or touch-screen. Display device 48 may include any type of device for presenting visual information such as, for example, a computer monitor or flat-screen display. Output device 46 may include any type of device for presenting a hard copy of information, such as a printer, and other types of output devices include speakers or any device for providing information in audio form.

Server 36 stores a database structure in secondary storage 50, for example, for storing and maintaining information for on-line educational courses. An example of that database structure is the relational database shown in FIGS. 2A–2R. Although a relational database is shown, other types of database structures may be used, such as an object-oriented database. Processor 52 may execute one or more applications 44 in order to provide the functions shown in the flow charts of FIGS. 1A–1P and to provide the web pages shown in the screens of FIGS. 3A–3X and 4A–4F. Although only one server is shown, system 10 may use multiple servers as necessary or desired to support the users and instructors and may also use back-up or redundant servers to prevent network downtime in the event of a failure of a particular server.

Examples of servers include, but are not limited to, INTEL-BASED HEWLETT-PACKARD servers configured into clusters, or a clone utilizing Intel processors and motherboards. Examples of systems for implementing and managing the relational database of FIGS. 2A–2R include, but are not limited to, the MICROSOFT SQL server and storage products by I.I.S. INTELLIGENT INFORMATION SYSTEMS LIMITED.

Although machines 16 and server 36 are depicted with various components, one skilled in the art will appreciate that these machines and the server can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as machine 16 and server 36, to perform a particular method.

Home Page

Figure 3A:
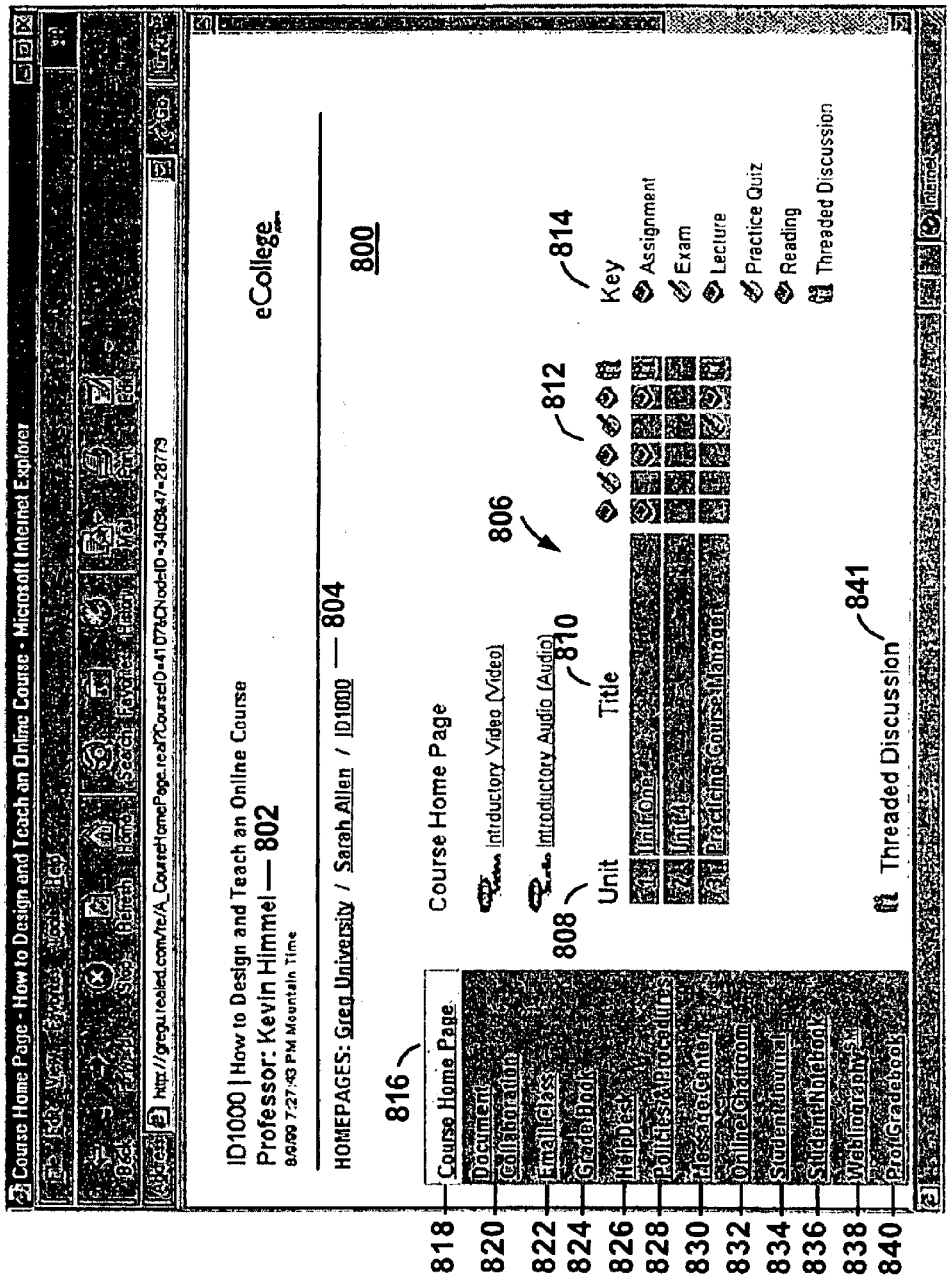
Figure 3B:
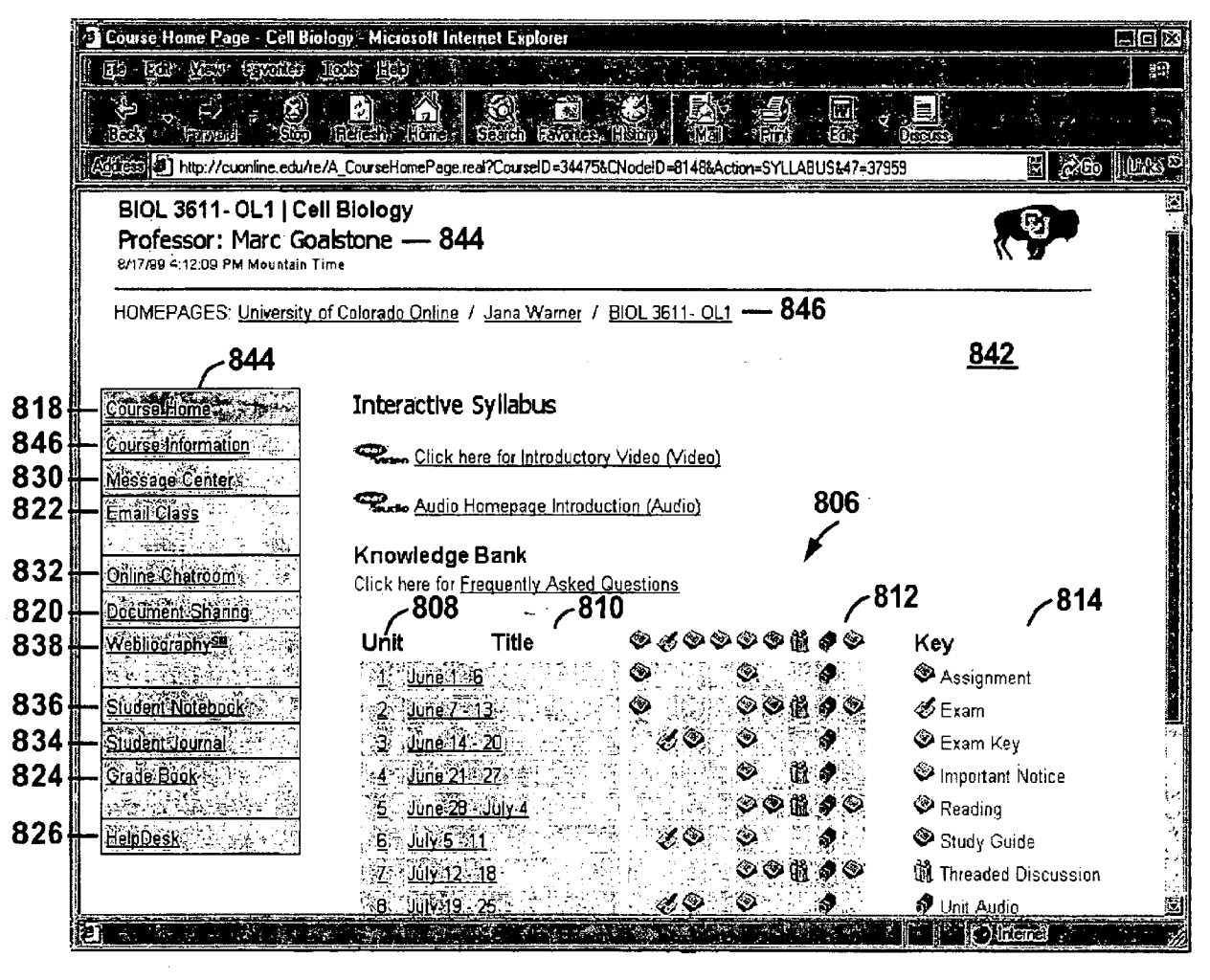

FIG. 1A is a flow chart of a home page method 60 for an on-line educational system. FIG. 3A is a diagram of a home page screen 800 for an instructor, and FIG. 3B is a diagram of a home page screen 842 for a user, both of which support home page method 60.

As shown in FIG. 3A, home page screen 800 includes an identification 802 of an instructor, and identification of users 804 enrolled in a particular course. A syllabus section 806 specifies an on-line electronic syllabus, and it identifies units in a units section 808 for a particular course, titles in a titles section 810 for the units, and assignments or content in a content section 812 for the units. A key section 814 identifies the type of content or assignments in content section 812; as shown, key section 814 may use icons or other symbols for identifying the assignments or content for particular units in units section 808. Content identified in content section 812 may provide an indication of educational materials, possibly including assignments, for a course. The indication may be provided in a number of ways such as through use of icons, as shown, or alternatively by displayed text, links, graphics, multimedia, or any type of displayed information. Also, the indication need not be in the electronic syllabus as shown; it may alternatively be provided elsewhere on a particular screen. Although an electronic syllabus is shown in syllabus section 806, an electronic syllabus may be accessed and presented in other ways such as, for example, through selection of a icon, in one or more pull-down menus, within a displayed window, or in a separate screen.

An index section 816 permits an instructor or other person to select other screens and functions by selecting the appropriate link. For example, index section 816 includes the following selections, all which are further explained below. A course home page selection 818 provides a typical starting or home page for viewing upon logging on by an instructor. A document collaboration selection 820 provides for document sharing or collaboration, which involves the ability of users and instructors to exchange documents and include messages when exchanging the documents. An e-mail class selection 822 provides for the ability to send e-mail messages to other users or instructors or both.

A gradebook selection 824 provides for access to an on-line gradebook, which is a screen accessible on-line and providing grade information. The gradebook includes a user view in which users view only grade information for their respective assignments. The term "grade information" refers to information relating to an instructor's or other person's evaluation of completion of assignments by users or other information submitted by users as part of an on-line course. Grade information may include, but is not limited to, comments, evaluations, letter grades, points, and scores. Grade information may include or incorporate any of the types of information identified above.

A message center selection 830 provides for the capability to send messages to users. In particular, the term "message center" refers to a screen available to administrative or other authorized persons permitting them to electronically send messages to users for particular courses at a course-level or to users for multiple courses at a university-level.

An on-line chat room selection 832 provides for users and instructors to interact in a chat room. The term "chat room" refers to a screen in which a group of users and/or instructors may electronically post messages for viewing in realtime by other members of the group.

A user journal selection 834 provides the ability of users to store information concerning assignments for viewing by an instructor. Thus a journal (or user journal) is an area in which a user may electronically store information concerning the assignments or related to a course, the information being electronically accessible to an instructor so that the instructor may view the information and potentially include comments about it. The journal typically includes textual information; however, a user may enter any type of information identified above for viewing by an instructor.

A notebook selection 836 provides users to access areas in which they may electronically enter information such as notes concerning a course. A notebook feature is similar to the journal except that the notebook is intended, for example, as an area where users may keep notes or other information for their own purposes and not necessarily for viewing by the instructor.

A webliography selection 838 provides a webliography feature. This feature, as explained below, permits users and instructors to save links to information concerning particular topics. It essentially involves a way for users and instructors to collectively compile research or other information.

An instructor gradebook selection 840 provides access to an instructor view of the gradebook by instructors or others granted access to it. This view provides grade information for all users in a particular course. In addition, instructors may enter grade information in the gradebook for viewing by the users who submitted completion of assignments to the instructor for a particular course.

A threaded discussion selection 841 provides access to a threaded discussion feature. This feature permits non-realtime discussion of topics. An instructor may enter a topic for discussion, and users may enter comments about the topic in non-realtime for further comment by other users or the instructor.

Index section 816 also includes a help desk selection 826 and a policies and procedures selection 828. Help desk selection 826 may provide a on-line connection with a help desk for receiving technical or other assistance in using the system. Policies and procedures selection 828 may provide information concerning policies governing use of the system or procedures for using the system.

FIG. 3B is a diagram of a home page screen 842 for a user. Home page screen 842 includes an identification 844 of an instructor for a particular course, and an identification 846 for a user and course. Home page screen 842 also includes syllabus section 806 with units in units section 808, titles in titles section 810, and assignments or content in content section 812 for a particular educational course, as shown also in home page screen 800. The content of syllabus section 806 may change depending upon each particular course. Home page screen 842 also includes an index section 844 having selections as identified above in index section 816, except that home page screen 842 may not necessarily have all selections available to instructors. For example, as shown, index section 844 does not include an instructor gradebook selection 840 so that users do not have access to grade information of other users. Home page screen 842 may also include a threaded discussion selection 841. Selections available to instructors and users may vary depending upon particular system requirements.

In method 60 (FIG. 1A), the system receives a log-on request by a user (step 62). The log-on request may include, for example, a user's or instructor's name or other identifying information along with an optional password. The system determines if the log-on is from an instructor or from a user, which may be determined by comparing information in the log-on request with information the database identifying authorized users and instructors (step 64). If an instructor logs on, the system displays an instructor view of a course home page such as home page screen 800 (step 68). Otherwise, the system displays a user view of a course home page such as home page screen 842 (step 66). The home page is typically presented in a web browser on a user or instructor machine and constitutes a main page for an on-line educational system from which a user or instructor may execute various functions.

The system determines if the instructor user is permitted access to the on-line educational system (step 70). If access if not permitted, the system may display an error message (step 72). Otherwise, if the instructor or user is permitted access, the system displays an electronic syllabus in syllabus section 806 for a selected educational course and also displays an indication of content concerning educational materials for the course (step 74). The system may optionally permit unlimited access, or permit any user to access the syllabus but restrict access to other on-line content. Also, the system may alternatively restrict access at an instructor's or user's request to log on to the system. Information stored in the database, as identified in the data element dictionary provided in Appendix A, may be used to restrict access to particular items in the system such as the electronic syllabus or portions of it.

The system then receives a requested function or feature by the user or instructor (step 76). The system executes the function (step 78). The system continually executes functions entered by the user or instructor as they interact with the system until it detects a log-off request (step 80). Upon receiving the log-off, the system may close the course home page. Since the system uses a relational database, for example, an instructor or user may interact with the system in a variety of different ways. FIGS. 1B–M illustrate various functions that the system may execute upon request by an instructor or user.

Document Sharing

A document sharing feature of the on-line educational system permits users to provide a document to an instructor. The educational system includes providing on-line content concerning educational materials for a particular educational course, and providing on-line an electronic syllabus for the educational course. The apparatus receives an education-related document from a particular one of the users and associates a message with the document based upon information entered by the particular user. The apparatus stores the document with the message for accessibility by the instructor. An education-related document is any document used as part of an on-line course.

Another document sharing feature of the on-line educational system permits an instructor to provide a document to users. The educational system includes providing on-line content concerning educational materials for a particular educational course, and providing on-line an electronic syllabus for the educational course. The apparatus receives an education-related document from the instructor along with an identification of a particular one of the users as an intended recipient of the document, and it associates a message with the document based upon information entered by the instructor. The apparatus stores the document with the message for accessibility by the particular user.

The document sharing features may include additional aspects. They may notify the instructor or the particular user of the document. They may also display an identification of the document and an indication of a source of the document, such as a name of the user or instructor who posted the document. The received document may include text, audio, video, graphics, or multimedia information. The apparatus may also receive a command related to manipulation of the document and execute the command. The commands may include, for example, sorting the received document or restricting particular access to it.

A document sharing screen electronically displays information for use by users in sharing a document in the on-line educational system. The screen includes an index section for selecting a home page screen having a content section identifying on-line content concerning educational materials for a particular educational course and having a syllabus section for providing an electronic syllabus for the educational course. A receive section in the screen receives an education-related document from a particular one of the users and associates a message with the document based upon information entered by the particular user. A store section in the screen indicates storage of the document with the message for accessibility by an intended recipient of the document. The document sharing screen may also include a notify section for use in notifying the intended recipient of the document when the screen is accessed by the intended recipient.

Figure 3C:
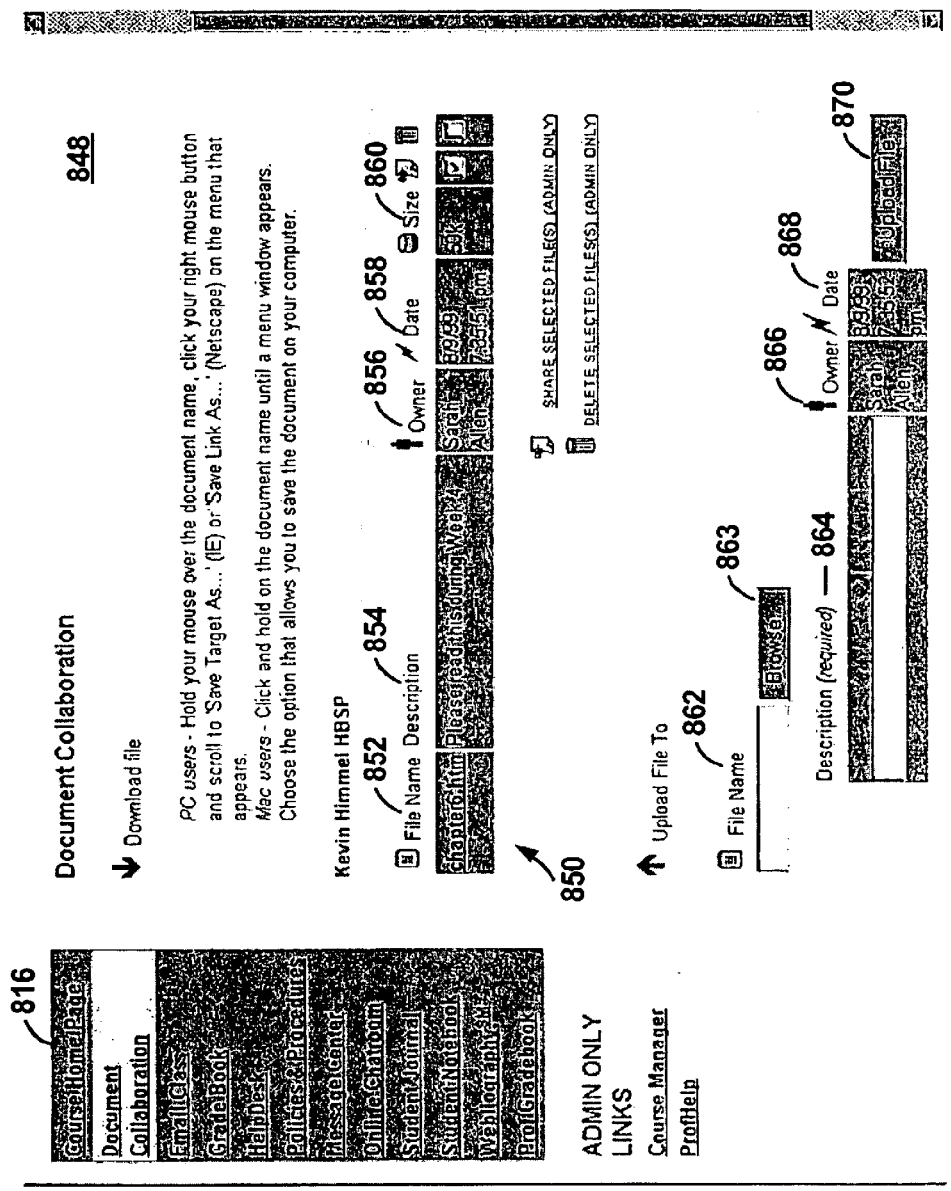
FIG. 3C is a diagram of a document sharing screen.

FIG. 3C is a diagram providing an example of a document sharing screen 848. Document sharing screen 848 has index section 816 as explained above. It also include a store or notify section 850 for providing an indication of and downloading a document to be shared. Store section 850 includes a name section 852 identifying the document or file name, a message section 854 specifying a message for the document, a section 856 identifying the sender or source of the document, a date section 858 identifying a date of posting the document, and a section 860 identifying the document size. Document sharing screen 848 also includes sections for sharing a document, including a receive section 862 for identifying a document or file to be shared, a browse section 863 for use in identifying a document or file to be shared, a message section 864 for entering a message for the document, a section 866 specifying the originator of the document, and a date section 868 specifying a date for the document. By selecting upload section 870, the user posts the document for sharing with an intended recipient. The intended recipient is the user who shared the document identified in section 850, or a user may enter identification of an intended recipient.

FIG. 1B is a flow chart of a document sharing method 82, using document sharing screen 848, for an on-line educational system. Document sharing method 82 may use at least the Table 690 in the database. Document sharing permits an instructor and user to share documents relating to an on-line educational course. An instructor or user selects document sharing selection 820 from the home page (step 84). The system determines if a document is pending for the instructor or user (step 86). If a document is pending, the system retrieves the document from the database and displays a document identifier such as is shown in store section 850 with any message information and the source of the document such as is shown in message section 854 and section 856 (step 88). The source of the document is an identification of the user or instructor who provided it for sharing or collaboration. The document identifier may be represented by an icon or other information for selection by the instructor or user. The source of the document typically constitutes the identification of the instructor or user who stored the document for sharing.

The system may then receive a command by the instructor or user to manipulate the document (step 90). The system executes the command and determines if it is a sort command (steps 92 and 94). If it is a sort command, the system sorts the document (step 96). Sorting may include organizing the document among a plurality of stored or shared documents according to particular criteria, such as alphabetizing them. Otherwise, the system executes the other command entered (step 98). Other commands may include, for example, opening the document. In addition, a user or instructor may locally store the document.

The system also determines if the instructor or user desires to share a document (step 100). The system receives the document or an identification of it in receive section 862 (step 102). A user or instructor may identify a document or file to be shared by selecting browse section 863, which may display a section or window listing files such as files saved by the user or instructor who desires to share a document. The user or instructor may then select a displayed document using a conventional open document command, for example, after which a path to the storage location of the selected document appears in receive section 862.

The system also receives any message information in message section 864 such as is shown in message section 854 and associates the message information with the document (step 104). The user or instructor may enter message information in message section 864 by entering a text message using a keyboard or by entering any other type of information using an input device; message section 864 may contain the actual message or an indication of it. The message may be associated with the document in a number of ways. It may be incorporated in the document, attached to the document, stored with the document, identified by a link or address, or identified in connection with the document.

The system also receives recipient information identifying the instructor or user with whom the document is to be shared (step 104). The recipient information may by default be the instructor and all users for the course; alternatively, a recipient information may be selected from a menu or section listing users and instructors in the course, or the recipient may be the user or instructor who shared a previous document as identified in section 856.

The system stores the document with the message information in the database along with source and recipient information (step 106). As the system knows the identification of the instructor or user who entered the document, the system may associate that information with the document or document identifier. The system receives the share request through selection of upload section 870, and it transmits the identification of the document to the recipient(s) so that the recipient(s) may detect when the document is pending (step 108).

E-Mail Class

Figure 3D:
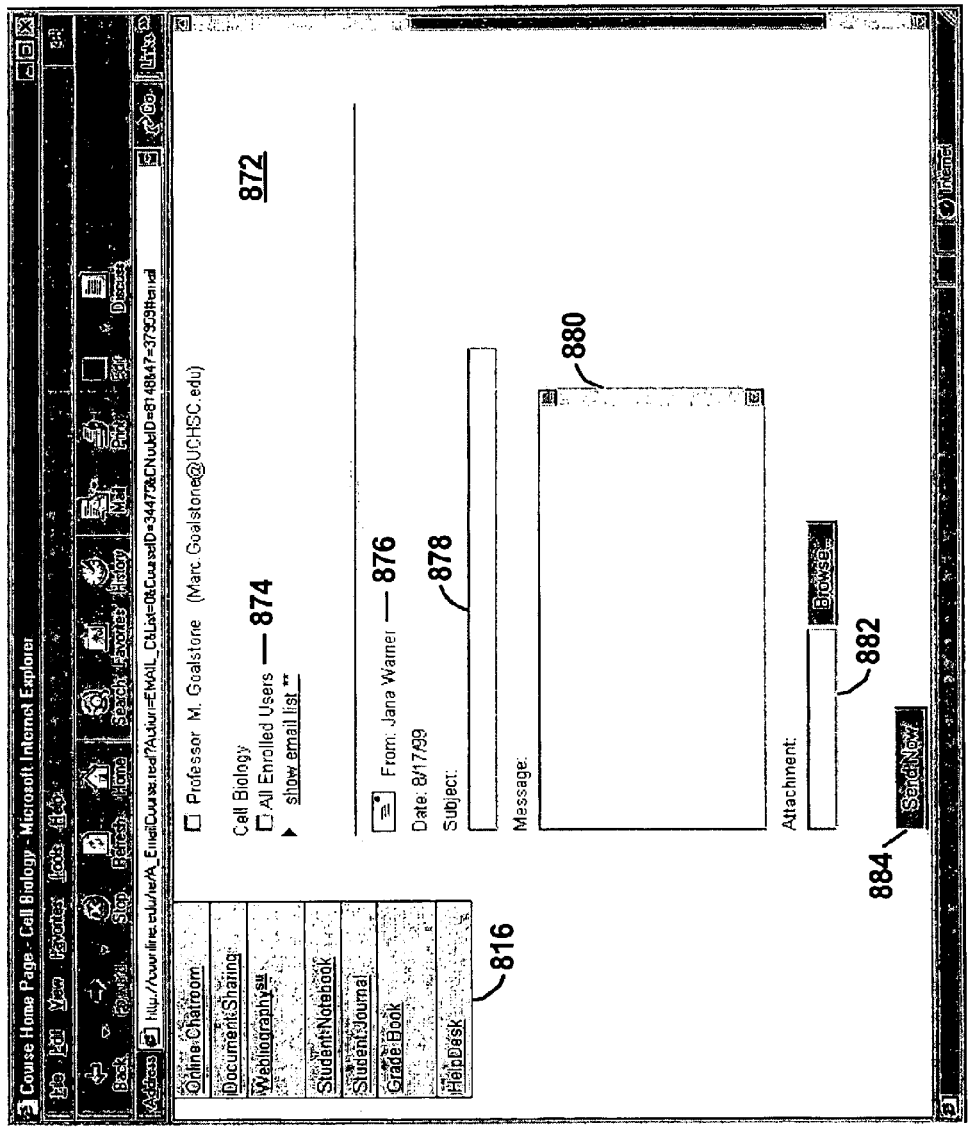
FIG. 3D is a diagram of an e-mail class screen.

FIG. 3D is a diagram of an e-mail class screen 872. E-mail class screen 872 includes index section 816 as described above and also includes sections for typical e-mail functions. In particular, e-mail class screen 872 includes a section 874 for identifying intended recipients of an e-mail message such as all users for a particular course or selected users identified by retrieving a menu listing the users. E-mail class screen 872 also includes a section 876 identifying the sender of the e-mail message. The sender may use a subject section 878 to enter a subject for the e-mail message, a message section 880 to enter the message, and an attachment section 882 to identify an attached file. By selecting a send section 884, the system sends the e-mail message, if required information was entered.

FIG. 1C is a flow chart of an e-mail class method 110, using e-mail class screen 872, for an on-line educational system. E-mail class method 110 may use at least Tables 542 and 598 in the database. In method 110, the system detects that the instructor or user selects e-mail class selection 822 in the course home page (step 112). The system displays an e-mail section such as screen 872, permitting the user or instructor to enter an e-mail message in subject section 878 and message section 880, along with the intended recipient(s) in section 874 (step 114). The system receives message information and identification of a recipient, possibly with an attachment identified in attachment section 882 (step 116). It also receives a send request by selection of send section 884 (step 118).

The system determines if the required information is entered such as identification of at least one recipient (step 120); if not, it may display an error message (step 122) and allow the user or instructor to enter the required information. Otherwise, the system stores the message in the database and transmits the identification of the message to the recipients (step 124). The recipients may thus upon logging onto the system detect that a message is pending for them.

On-Line Gradebook

An on-line gradebook feature of the on-line educational system permits instructor posting of and users' access to on-line grade information. The educational system includes providing on-line content concerning educational materials for a particular educational course, and providing on-line an electronic syllabus for the educational course. The apparatus receives from the instructor grade information relating to users' assignments for the educational course and posts the grade information in an on-line gradebook.

The on-line gradebook feature may include other aspects as well. For example, it may permit each user to access the on-line gradebook and restrict each user's access of information in the on-line gradebook to information corresponding to each particular user's completion of the assignments. The on-line gradebook also may selectively restrict each user's access to the grade information concerning each particular user's completion of the assignments. The gradebook may also be presented in varying types of views on a display device. An instructor view of the on-line gradebook provides the instructor with access to the grade information for all of the users. A user view provides each user the access to their particular grade information.

A gradebook screen electronically displays information for use by an instructor in providing an on-line gradebook in the on-line educational system. The screen includes an index section for selecting a home page screen having a content section identifying on-line content concerning educational materials for a particular educational course and having a syllabus section for providing an electronic syllabus for the educational course. A receive section in the screen receives from the instructor grade information relating to users' assignments for the educational course, and a gradebook section in the screen posts the grade information in an on-line gradebook.

The gradebook screen may also include a grade information section for permitting each user to access the on-line gradebook and for use in restricting each user's access of information in the on-line gradebook to information corresponding to their completion of the assignments.

Figure 3E:
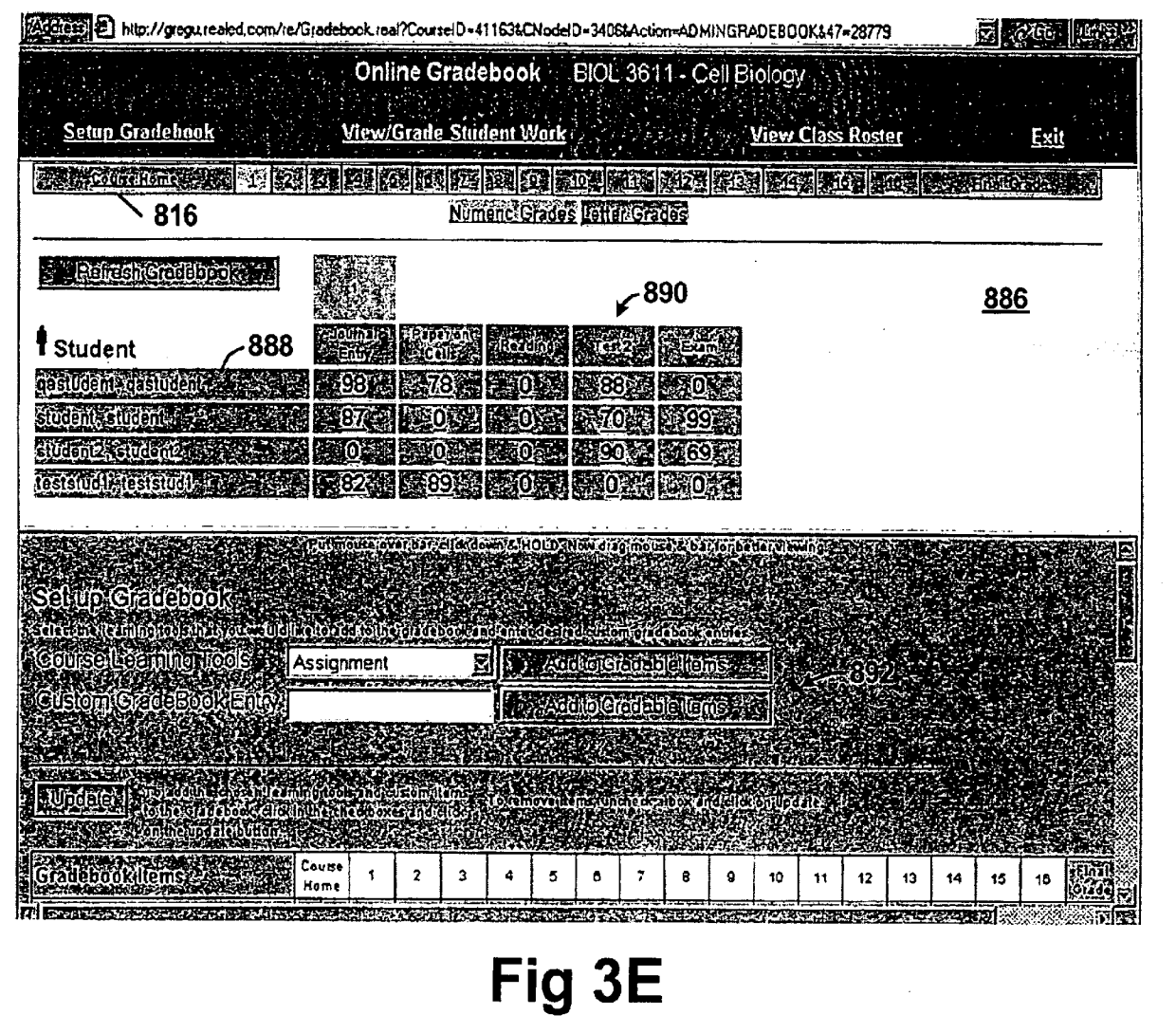

FIG. 3E is a diagram providing an example of a gradebook screen 886 for an instructor. Gradebook screen 886 includes index section 816, in this example only including a selection to return to home page screen 800. Gradebook screen 886 also includes a user section 888 identifying users for a particular course. A gradebook section 890 permits an instructor to enter and post grade information for the users' assignments. In particular, each column in gradebook section 890 represents an assignment, as identified, and each row includes grade information for the assignments for a particular user. Gradebook screen 886 also includes a set up section 892 permitting the instructor to set up the gradebook by adding assignments and entries.

Figure 3F:
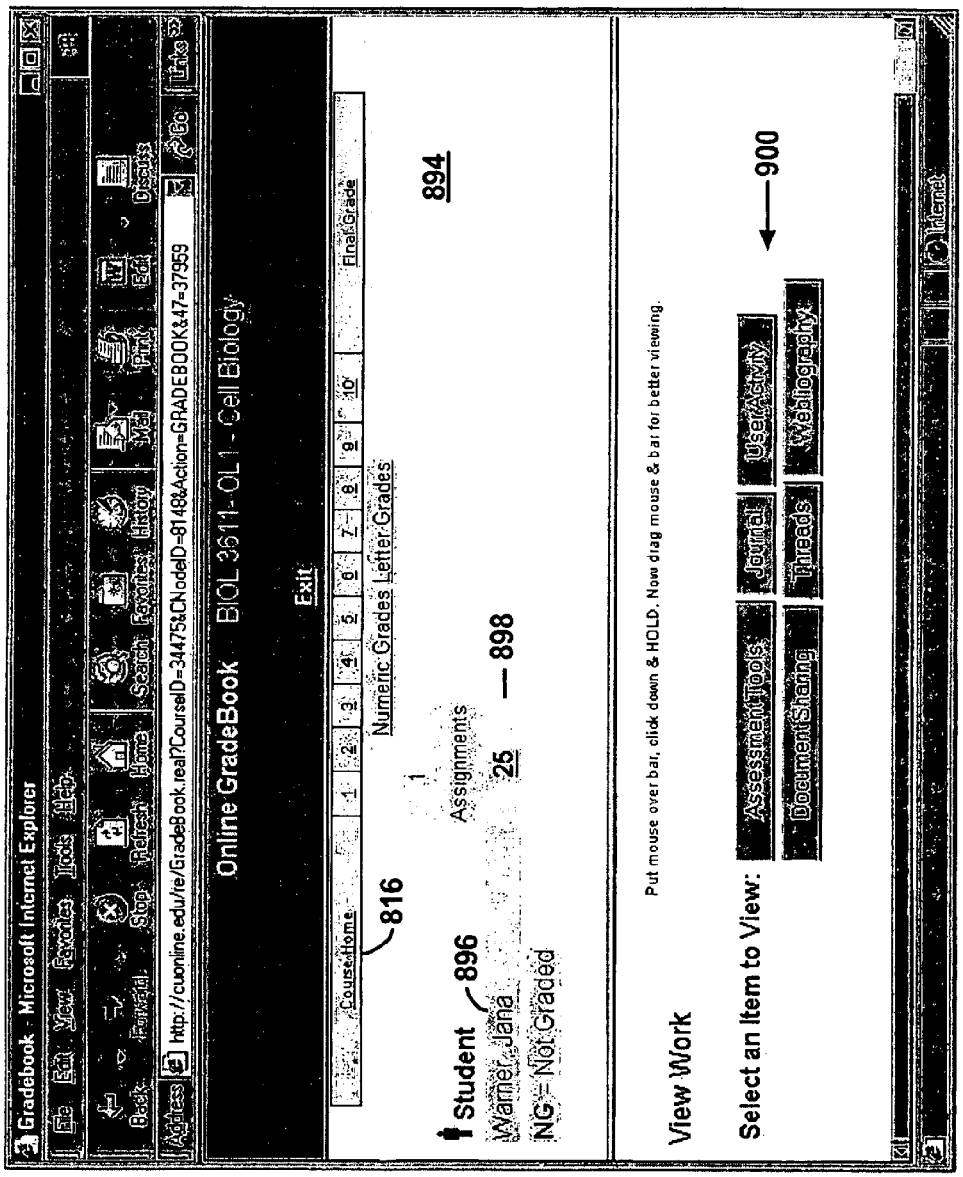
FIG. 3F is a diagram of a gradebook screen for a user.

FIG. 3F is a diagram of a user gradebook screen 894 for a particular user. Unlike gradebook screen 886 for an instructor, users typically only have access to grade information concerning their own completion of assignments. Therefore, user gradebook screen 894 includes a user section 896 identifying the particular user, and a grade information section 898 identifying grade information for the user's assignments. Although only one assignment is shown, grade information section 898 may identify multiple assignments and corresponding grade information. Sections 900 permits the user to select their work in other areas. Also, user gradebook screen 894 includes index section 816 for selection by the user to return to home page screen 842.

FIG. 1D is a flow chart of a gradebook method 126, using gradebook screen 886 and user gradebook screen 894, for an on-line educational system. Gradebook method 126 may use at least the following tables in the database: Tables 580, 612, 622, 642, 644, 646, 648, 650, 674, 678, and 684. In method 126, the instructor or user selects gradebook selection 824 or 840 in the course home pages (step 128). The system determines if an instructor selected the gradebook selection (step 130). If so, the system displays gradebook screen 886 for all users for a particular course (step 132).

The system detects whether the instructor enters grade information into the gradebook such as in gradebook section 890 (step 134). The grade information typically relates to user's completion of assignments for a particular educational course. Upon receiving grade information, the system receives and stores in the database grade information and associates it with the relevant users as shown in gradebook section 890 (step 136). By storing the grade information, the system posts the grade information in an on-line gradebook for access by users as shown in grade information section 898 for one particular user. The system also detects whether the instructor enters information restricting access to the grade information (step 138). If the instructor enters access information, the system receives and stores the access information for the relevant grade information and restricts access accordingly (step 142). Otherwise, the system may store default access information (step 142).

With access restrictions, an instructor may identify particular grade information for which access is restricted, and an instructor may want to restrict access during particular time periods of the course. The system may restrict the access by storing in the database an indication of the limitation on access associated with the restricted information. Default access may include, for example, providing users with access to the grade information for the completion of their assignments when it is posted by the instructor.

If a user had selected gradebook selection 824 (step 130), the system displays user gradebook screen 894 for the user (step 144). The system determines if the user is permitted access to the grade information (step 146). If permitted access, the system displays grade information for the particular user as shown in grade information section 898 (step 148). Grade information section 898 is typically configured to only retrieve and display grade information corresponding to the user accessing gradebook screen 894, and the system thus may restrict each user's access in gradebook screen 894 to only grade information concerning their own completion of assignments. If not permitted access, the system may selectively withhold from grade information section 898 the restricted information.

Message Center/Administrative Message Center

A course-level message center feature of the on-line educational system permits the posting of on-line messages to users for particular courses. The educational system includes providing on-line content concerning educational materials for a particular educational course, and providing on-line an electronic syllabus for the educational course. The apparatus receives a message concerning the educational course and posts an indication of the message for on-line accessibility of the message by the users.

An administrative message center feature of the on-line educational system permits the posting of messages to users for multiple courses. The educational system includes providing on-line content concerning educational materials for a plurality of educational courses, and providing on-line a plurality of electronic syllabuses for the educational courses. The apparatus receives a message concerning the plurality of educational courses and posts an indication of the message for on-line accessibility of the message by all of the users.

A message center screen electronically displays information for use in providing messages to users for the on-line educational system. The screen includes an index section for selecting a home page screen having a content section identifying on-line content concerning educational materials for a particular educational course and having a syllabus section for providing an electronic syllabus for the educational course. An input section in the screen receives a message concerning the educational course, and a message section in the screen posts an indication of the message for on-line accessibility of the message by the users.

Figure 3G:
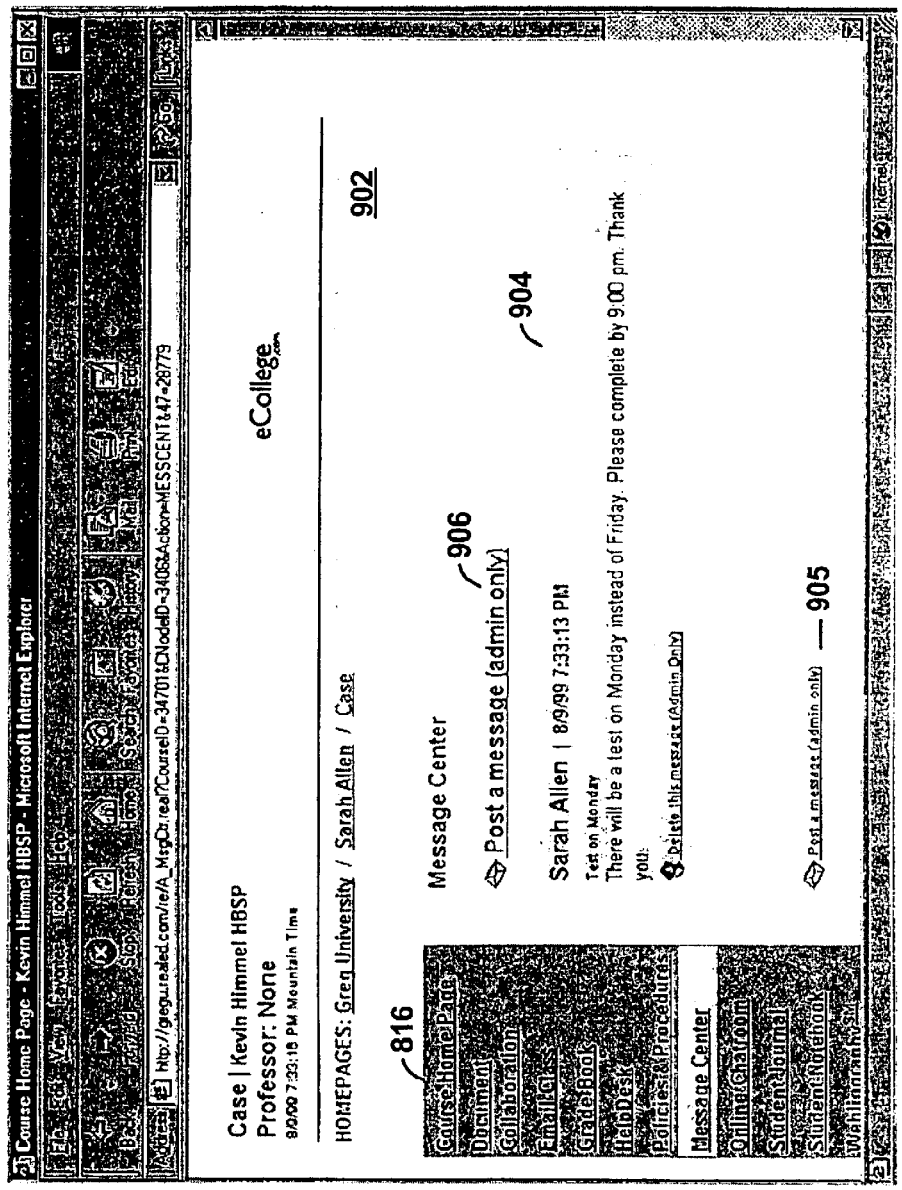
FIG. 3G is a diagram of a message center screen.

FIG. 3G is a diagram providing an example of a message center screen 902. Message center screen 902 includes index section 816 as explained above. Message center screen 902 also includes a message section 904 for a user to receive a message, and message section 904 may include an indication of a message for retrieval by the user or the actual message. A post section 906 permits posting of a message in the message center by those authorized to do so. The message center is typically used only by an instructor or an authorized administrative person post messages at a course-level for all or selected users in a course or at a university-level for all users in all courses or for selected users among selected courses.

FIG. 1E is a flow chart of a message center method 150, using message center screen 902, for an on-line educational system. The message center permits posting of messages for users in a particular course or users among multiple courses. Message center method 150 may use at least Tables 542 and 598 in the database. In method 150, an instructor or user selects message center selection 830 in the course home page (step 152). The system determines if a message is pending (step 154) and, if so, if retrieves the message from the database and displays the message or an indication of it in message section 904 (step 156). The system determines if it receives a post message request through selection of post section 906 (step 158) and whether an instructor or other authorized person requested to post a message (step 160). The system may store in the database a list of authorized persons and compare an identification of the person requesting to post a message with the list in order to determine whether to allow the person to post a message.

In this exemplary embodiment, only instructors or other authorized persons are permitted to use the message center to post a message. However, users may optionally be provided access to that function as well. If an instructor or other authorized person requested to post a message, the system displays an input section, permitting the instructor to enter information for posting of a message (step 162). The input section may be similar to sections 874, 876, 878, and 880 in e-mail screen 872, or it may be a section such as message section 904.

The system receives message content and the post message command (steps 164 and 166). It may receive the content for the message and identification of the recipients in the same manner as described with respect to sections 874, 876, 878, and 880 for sending an e-mail message. A command to post a message may be entered through selection of a post section 905. The system stores the message in the database and posts an indication of the message on-line for access by the users in the particular course or among multiple courses (step 168). The indication may include an icon or other identify, or it may include the message itself.

On-Line Chat Room

Figure 3H:
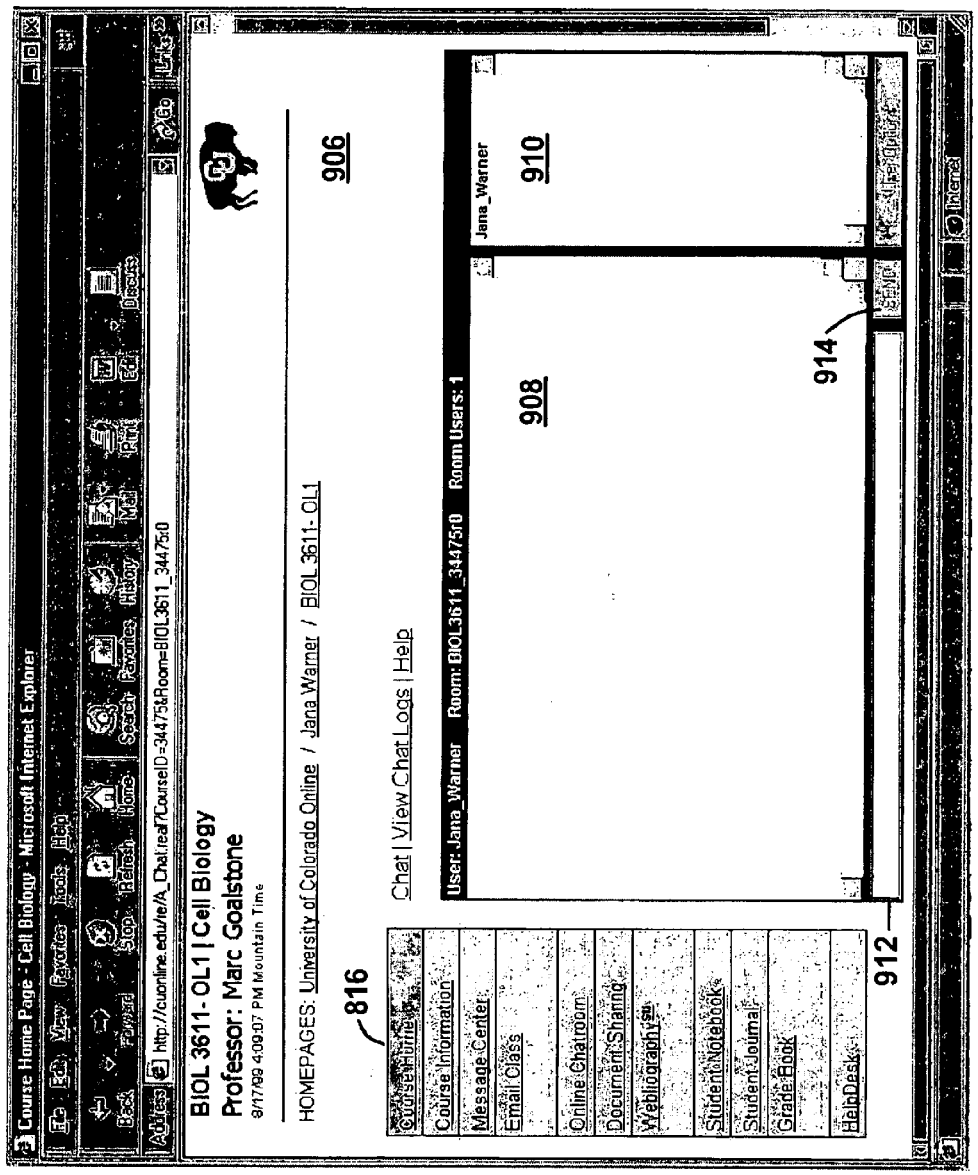
FIG. 3H is a diagram of a chat room screen.
Figure 3I:
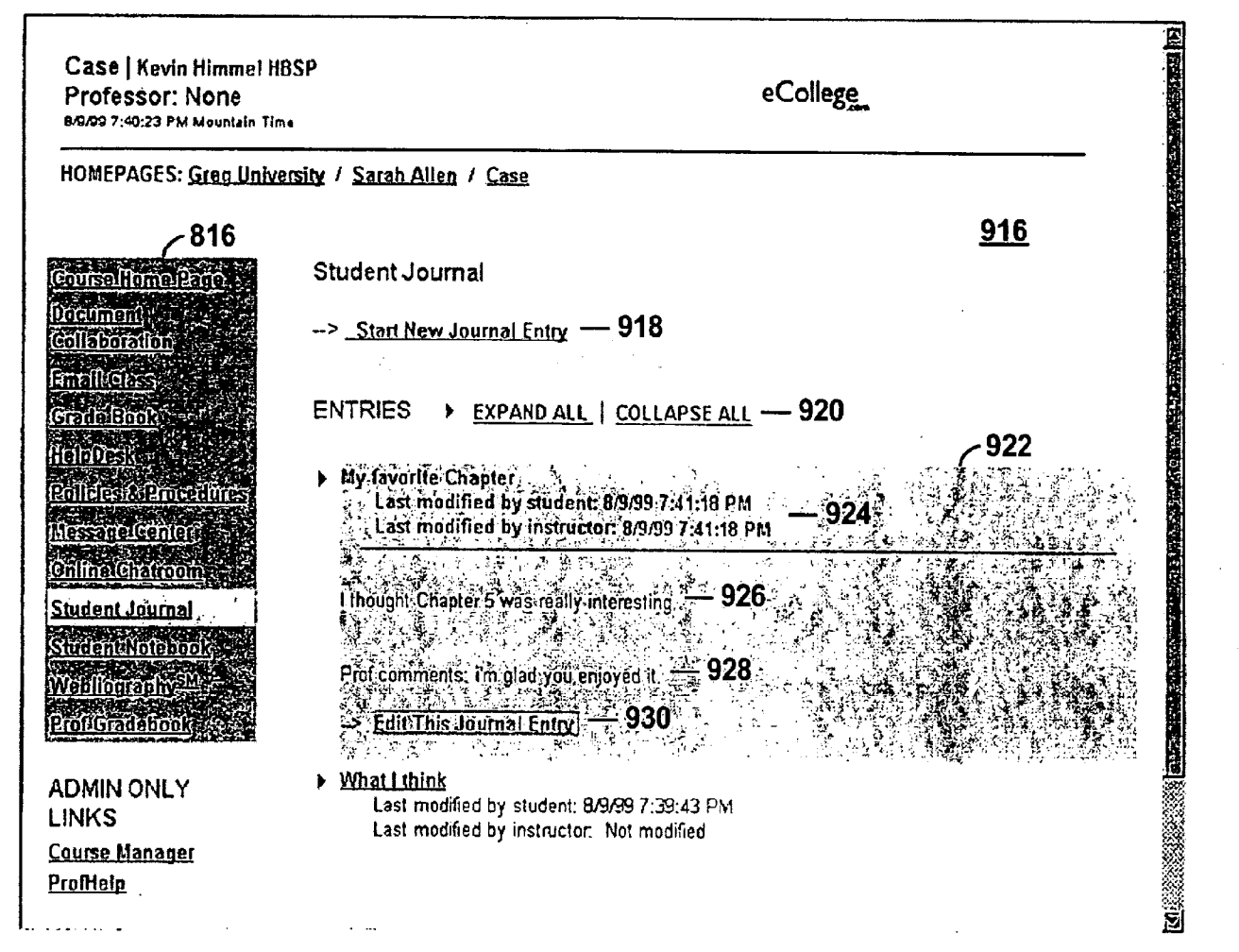

FIG. 3H is a diagram of a chat room screen 906. Chat room screen 906 has index section 816 as explained above. Chat room screen 906 also has a message section 908 for a user to view messages entered into a chat room, essentially in realtime. A member section 910 identifies members of the chat room permitted to view and enter messages appearing in message section 908. A user may enter a message in an input section 912 and post the message in message section 908 by selecting a send section 914.

FIG. 1F is a flow chart of an on-line chat room method 174, using chat room screen 906, for an on-line educational system. In method 170, the chat room provides functions for users to interact in realtime by transmitting messages into common message section 908 for presentation in chat room screen 906 displayed to each member of the chat room as identified in member section 910. An instructor or user selects chat room selection 832 in the course home page (step 172). In response, the system displays chat room screen 906 and adds the instructor or user as a member of the chat room in member section 910 (step 174).

The system then receives messages and transmits and displays the messages to members of the chat room as the chat room is displayed to them in chat room screen 906 (steps 176 and 178). The system continually receives and posts the messages until a particular instructor or user closes chat room screen 906 or message section 908 (step 180). In response to the instructor or user closing the chat room section, the system removes the instructor or user as a member of the chat room in member section 910 displayed to the remaining members of the chat room (step 182).

User Journal

An electronic journal feature of the on-line educational system permits a user to enter information relating to a particular course for optional review by an instructor. The educational system includes providing on-line content concerning educational materials for a particular educational course, and providing on-line an electronic syllabus for the educational course. The apparatus provides an electronic journal for a particular one of the users permitting the particular user to enter information into the electronic journal. The apparatus also permits the instructor to enter information into the electronic journal for viewing by the particular user.

The electronic journal feature may include additional aspects. For example, it may permit the user to selectively identify permitted access to the electronic journal by the instructor. If the user identifies permitted access, it selectively provides access to the electronic journal by the instructor based upon the particular user's identification of permitted access. The user may group the information entered into the electronic journal into particular entries, identify permitted access by the instructor for each of the entries, and display an indication of at least one of the entries. The user may enter various types of information into the journal, or edit previously-entered information, and such information may include text, audio, video, graphics, or multimedia information. The journal may also provide for displaying an indication of the instructor-entered information in order to distinguish it from the user-entered information. For example, it may be displayed in a different color, font, or background color, or with other distinguishing characteristics such as displaying it in a box.

A journal screen electronically displays information for use in providing an electronic journal to users in the on-line educational system. The screen includes an index section for selecting a home page screen having a content section identifying on-line content concerning educational materials for a particular educational course and having a syllabus section for providing an electronic syllabus for the educational course. A journal section in the screen provides an electronic journal for a particular one of the users permitting the particular user to enter information concerning the educational course. A comment section in the screen permits the instructor to enter information into the electronic journal for viewing by the particular user.

The journal screen may also include an access section, associated with the journal section, permits the user to selectively identify permitted access to the electronic journal by the instructor and selectively provides access to the electronic journal by the instructor based upon the particular user's identification of permitted access.

FIG. 31 is a diagram providing an example of a journal screen 916. Journal screen 916 has index section 816 as explained above. Journal screen 916 has sections for providing an electronic journal. Selection of a section 918 permits a user to start a new entry for the journal. An entry is a definable portion of the journal. For example, each time a user enters new information in the journal, a new entry may be created identifying the entered information by a date and time the user entered it. Alternatively, a user may modify previous entries, or create entries based upon other criteria, such as creating a new entry every week, for different topics, or for different assignments.

Selection of sections 920 permits the user to view an expanded or collapsed view of the journal entries. Entry section 922 displays a particular one of the journal entries. Section 924 indicates when the entry displayed in entry section 922 was last modified. A section 926 permits a user to enter information into the entry, and a comment section 928 permits the instructor to enter information into the entry. Selection of an edit or access section 930 permits editing of the entry content or access to it. As shown, section 926 and comment section 928 may be combined together with the instructor's comments identified, or separate displayed sections may be used for the user's and instructor's entered information.

FIG. 1G is a flow chart of a journal method 184, using journal screen 916, for an on-line educational system. Journal method 184 may use at least the following tables in the database: Tables 634, 636, 638, and 640. The journal permits the user to enter information, possibly as required or requested by an instructor or an on-line course, and in additional permits the instructor to access the information in order to provide the user with coaching or feedback, or otherwise monitor and evaluate the user's progress.

In method 184, an instructor or user selects journal selection 834 in the course home page (step 186). In response, the system displays a journal section such as is shown in journal screen 916 (step 188). The system determines if an instructor requested the journal function (step 190). If so, the instructor identifies a particular user and relevant journal entry and enters that information (step 208). A section, such as section 804 in the home page, may be displayed in order to permit an instructor to select identification of a user.

The system determines if the instructor is permitted access to the requested journal entry (step 210). If permitted access, the system displays the entry such as is shown in entry section 922 (step 212). The system also detects whether the instructor enters information into the user's journal (step 214) and, if so, the system receives and stores the entered information in the database for the user's journal such as is shown in comment section 928, optionally with a different appearance than the user-entered information (step 216). The instructor then closes the entry (step 218).

The instructor-entered information may be identified in a number of ways. It may be preceded by an indication of instructor-entered information. It may have a different appearance in comparison to the user-entered information such as by using reverse video, a different color, font, underlining, bold, italics, or highlighting. Also, it may be enclosed within a box or have other distinguishing environmental features. If the instructor entered multimedia information, the information may be distinguishable from the user information based upon audio or video features, for example.

If a user had requested journal selection 834 (step 190), the system displays journal screen 906 and determines if the user retrieves an existing entry by manipulating section 920 to view and select an entry (step 192). If not, the system creates a new journal entry through the user's selection of section 918 (step 196); otherwise, the system retrieves the requested entry from the database (step 194). The user may then enter information into the journal entry in entry section 922 or edit previously-entered information and close the entry (step 198).

The system also detects whether the user enters particular access information through edit section 930, for example (step 200). The system receives the access information and restricts access to the journal entry according to the user-entered information (step 202). Otherwise, if the user does not enter access information, the system may assign default access to the journal entry in entry section 922 (step 204). The system stores the journal entry with the access information in the database for the user's journal (step 206). With access restrictions, a user may identify particular entries for which access is restricted, and the user may want to restrict access during particular time periods of the course. The system may restrict the access by storing in the database an indication of the limitation on access associated with the restricted information. Default access may include, for example, providing an instructor with access to the content of a journal entry when it is created and saved by the user.

Notebook

The notebook is similar to the electronic journal except that an instructor typically cannot enter information into the notebook and it is provided primarily as an area where the users may enter notes or other information for their own use. The notebook feature is used with the on-line educational system providing on-line content concerning educational materials for a particular educational course and providing on-line an electronic syllabus for the educational course. The electronic notebook permits users to enter information into the electronic notebook and to selectively identify permitted access to it by the instructor. The notebook feature selectively provides access to the electronic notebook by the instructor based upon the user's identification of permitted access. The notebook feature also permits the user to enter, for example, text, audio, video, graphics, or multimedia information into the electronic notebook.

Figure 3J:
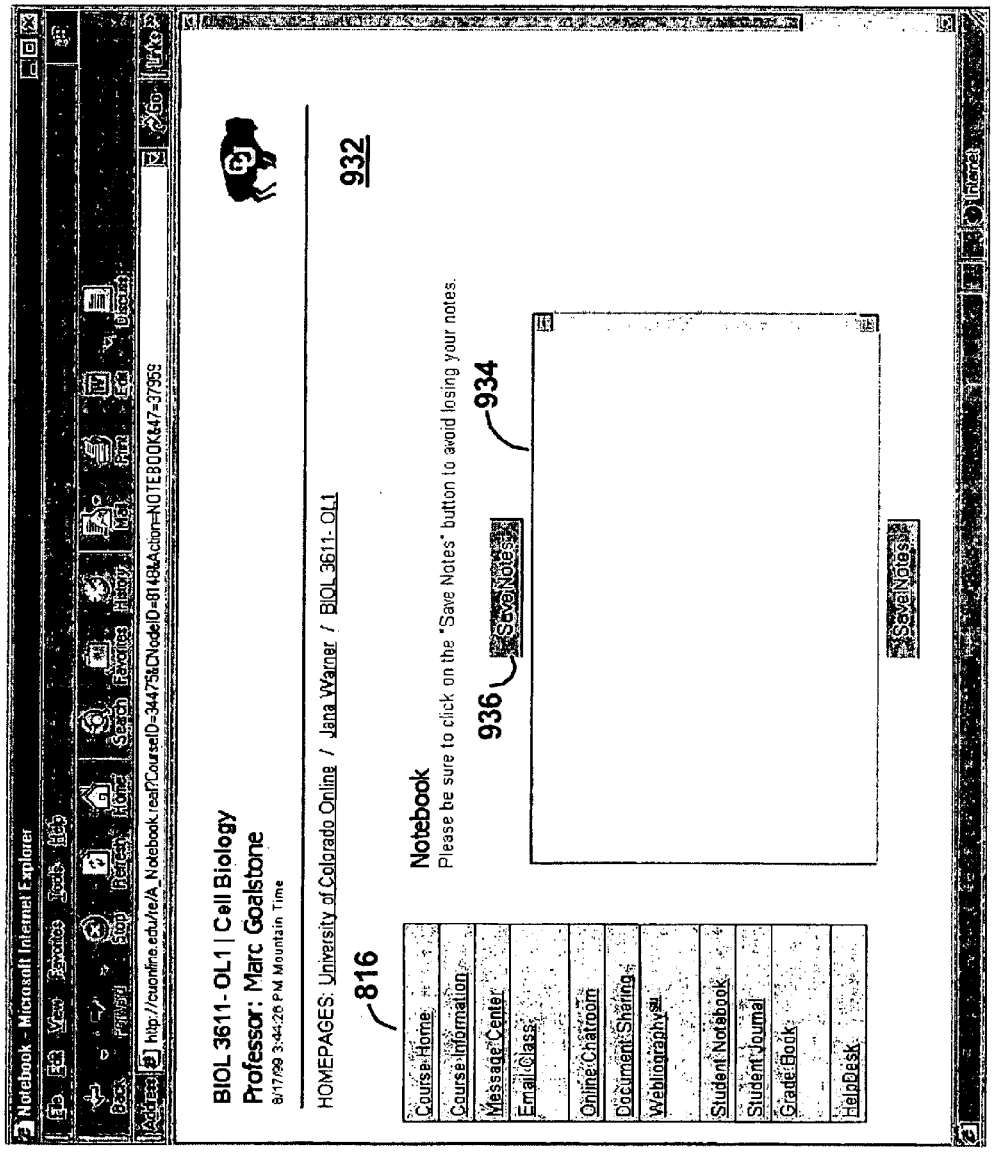
FIG. 3J is a diagram of a notebook screen.

FIG. 3J is a diagram of a notebook screen 932. Notebook screen 932 has index section 816 as explained above. A entry section 934 permits a user to enter notes or other information, and the notes or information are saved in the user's notebook upon selection of section 936. The notes or other information can also be divided into multiple entries, and the user can specify permitted access for each entry. An entry is a definable portion of the notebook. For example, each time a user enters new information in the notebook, a new entry may be created identifying the entered information by a date and time the user entered it. Alternatively, a user may modify previous entries, or create entries based upon other criteria, such as creating a new entry every week, for different topics, or for different assignments.

FIG. 1H is flow chart of a notebook method 220, using notebook screen 932, for an on-line educational system. Notebook method 220 may use at least Table 620 in the database. In method 220, the user selects notebook selection 836 in the course home page (step 221). In response, the system displays a notebook section such as notebook screen 932 (step 222). The system determines if an instructor requested the notebook function (step 223). If so, the instructor identifies a particular user and relevant notebook entry and enters that information (step 232). A section, such as section 804 in the home page, may be displayed in order to permit an instructor to select identification of a user. The system determines if the instructor is permitted access to the requested notebook entry (step 233). If permitted access, the system displays the entry such as is shown in entry section 934 (step 234).

If a user had requested notebook selection 836 (step 223), the system displays notebook screen 932 and determines if the user retrieves an existing entry (step 224). If not, the system can create a new notebook entry (step 225); otherwise, the system retrieves the requested entry from the database (step 226). The user may then enter information into the notebook in entry section 934 or edit previously-entered information and close the entry (step 227).

The system also detects whether the user enters particular access information (step 228). The system receives the access information and restricts access to the notebook entry according to the user-entered information (step 229). Otherwise, if the user does not enter access information, the system may assign default access to the notebook entry in entry section 934 (step 230). The system stores the notebook entry with the access information in the database for the user's notebook (step 231). With access restrictions, a user may identify particular entries for which access is restricted, and the user may want to restrict access during particular time periods of the course. The system may restrict the access by storing in the database an indication of the limitation on access associated with the restricted information. Default access may include, for example, providing an instructor with access to the content of a notebook entry when it is created and saved by the user.

Webliography[SM] Feature

The webliography feature permits the display and exchange of research information from the Internet or other sources. For example, users may exchange various hypertext links illustrating sources of information relevant to an on-line educational course. The term "webliography" is a service mark of eCollege.com.

Figure 3K:
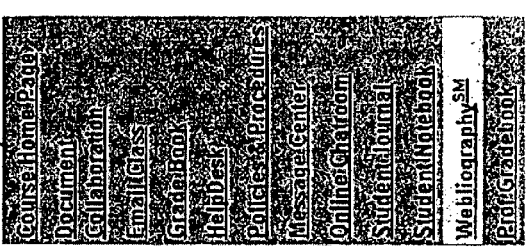
FIG. 3K is a diagram of a webliography screen.

FIG. 3K is a diagram of a webliography screen 938. Webliography screen 938 includes index section 816 as explained above. Webliography screen 938 also has a number of sections for viewing entries for the webliography feature, adding entries, and searching for entries. Selection of an add section 940 permits a user to add an entry, selection of an entry section 942 permits the user to view all entries, and selection of a search section 944 permits the user to search for entries. Upon searching or requesting to view entries, the system displays entries as follows, for example: a section 946 identifies a first entry and a section 948 provides a description for the first entry; and a section 950 identifies a second entry and a section 948 provides a description for the second entry.

FIG. 1I is a flow chart of a method 236, using webliography screen 938, for implementing a webliography feature for an on-line educational system. Webliography method 236 may use at least Tables 686 and 688 in the database. In method 236, the instructor or user selects webliography selection 838 in the course home page (step 238). In response, the system displays a webliography section such as webliography screen 938 (step 240). The system then receives a requested function from the user or instructor (step 242).

For example, the following functions may be provided for the webliography feature. If the system receives an add link function through selection of add section 940 (step 244), it receives and stores the entered link (step 246). A link may be a hypertext link providing a network address of particular content. If the system receives an edit thread function through selection of entry section 942 (step 248), it receives and stores the information to edit the thread. If the system receives a search function through selection of search section 944 (step 252), it performs the requested search (step 254). If the system receives an add comment function through selection of an entry (step 256), it receives and stores a particular comment (step 258). The system may also receive other functions (step 260) and execute those functions (step 262).

After receiving and executing the requested function, the system displays the results of the executed function (step 264). The system may repeatedly execute functions for instructor or user until it detects that the instructor or user has closed the webliography section or screen 938 (step 266).

Threaded Discussion

A threaded discussion permits instructors and users to maintain an on-line discussion in non-realtime by posting messages responding to particular topics and viewing the posted messages. For example, an instructor may enter a particular topic for discussion, and users when they log on to the system may enter information for that topic and continue the discussion.

Figure 3L:
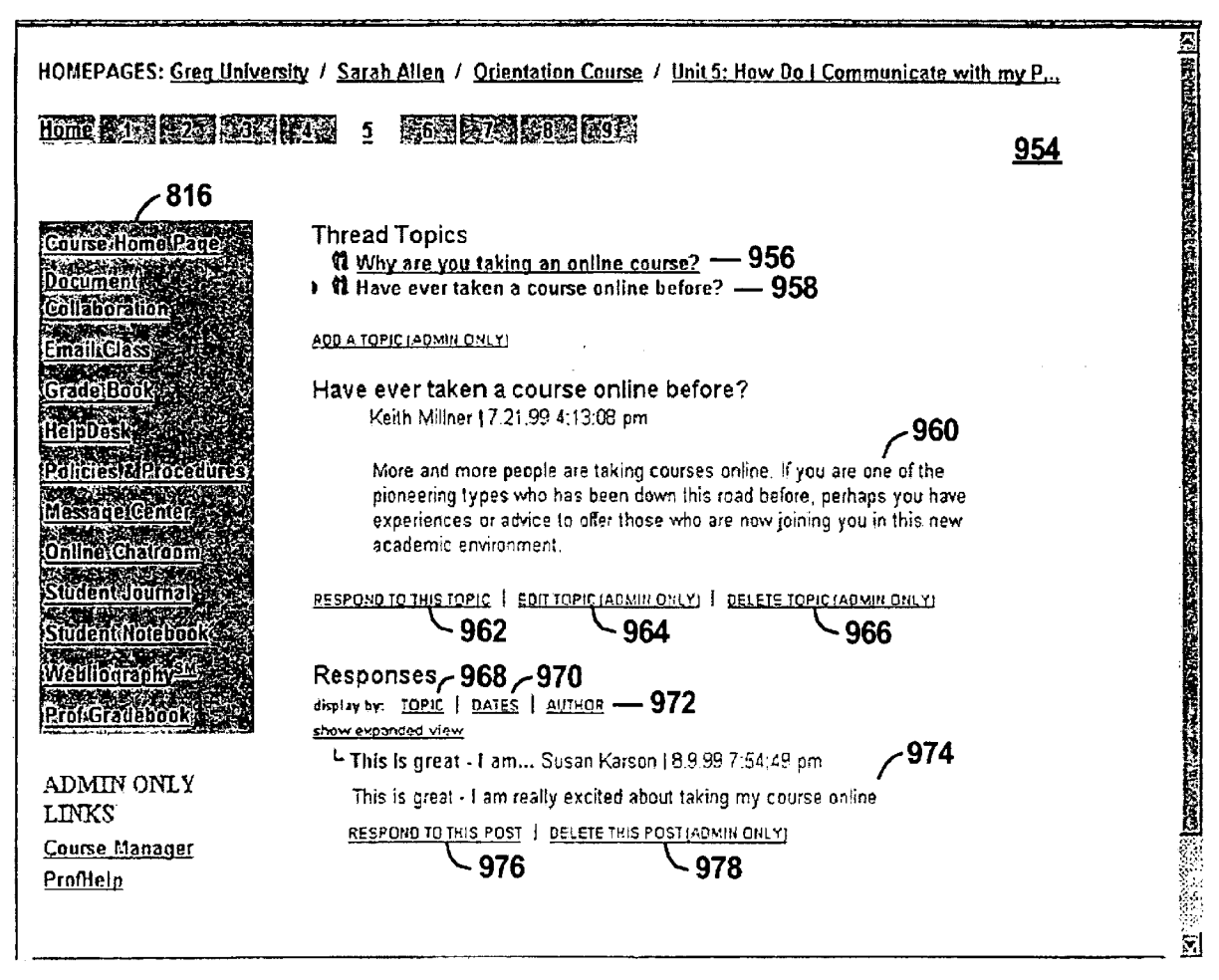

FIG. 3L is a diagram of a threaded discussion screen 954. Threaded discussion screen 954 has index section 816 as explained above. Sections 956 and 958 identify topics for discussion, typically entered by an instructor. A message section 960 provides a message for topic 958. Users may respond to the topic by selecting a response section 962. Users may display responses to topics according to a particular topic by selecting a topic section 968. Responses to topics may be displayed according to date by selecting a date section 970. Responses to topics may be displayed according to author by selecting an author section 972. A section 974 provides an example of a response to a topic, and a user may respond to the topic by selecting section 976 and entering a response in a corresponding section. Authorized personnel may edit a topic by selecting a section 964, delete the topic by selecting a section 966, and delete a posted response by selecting section 978.

FIG. 1J is a flow chart of a threaded discussion method 268, using threaded discussion screen 954, for an on-line educational system. Threaded discussion method 268 may use at least Table 700 in the database. In method 268, an instructor or user selects threaded discussion selection 841 in the course home page (step 270). In response, the system displays a threaded discussion section such as threaded discussion screen 954 with existing comments such as is shown in message section 960 (step 272). The instructor or user may then enter a comment and the system receives the comment (step 274). The system associates the comment with the threaded discussion, displays the comment and stores it in the database for access by other users in the course (step 276).

Grading

An exam question feature of the on-line educational system provides for on-line testing of users. The educational system includes providing on-line content concerning educational materials for a particular educational course, and providing on-line an electronic syllabus for the educational course. The apparatus provides on-line to the users exam questions with multimedia content, and receives on-line answers to the exam questions. An on-line exam includes any type of on-line way to evaluate a user taking an on-line course. The exam may include both objective and subjective questions, as explained below.

The exam question feature may include various other aspects. For example, it may automatically grade the answers to generate corresponding grade information, and it may store the grade information in an on-line gradebook. The users may be selectively provided with access to the grade information in the on-line gradebook. If the answers require manual grading by an instructor, the apparatus transmits the answers to the instructor or at least the answers requiring manual grading, and it receives from the instructor grade information for the answers. The instructor may also include comments concerning the grade information. The instructor's grade information and comments generated through manual grading may also be included in the on-line gradebook with access selectively provided to the corresponding users.

A grading screen electronically displays information for use in providing exam questions to users for the on-line educational system. The screen includes an index section for selecting a home page screen having a content section identifying on-line content concerning educational materials for a particular educational course and having a syllabus section for providing an electronic syllabus for the educational course. An exam question section in the screen provides on-line to the users exam questions with multimedia content and receives on-line answers to the exam questions.

Figure 3M:
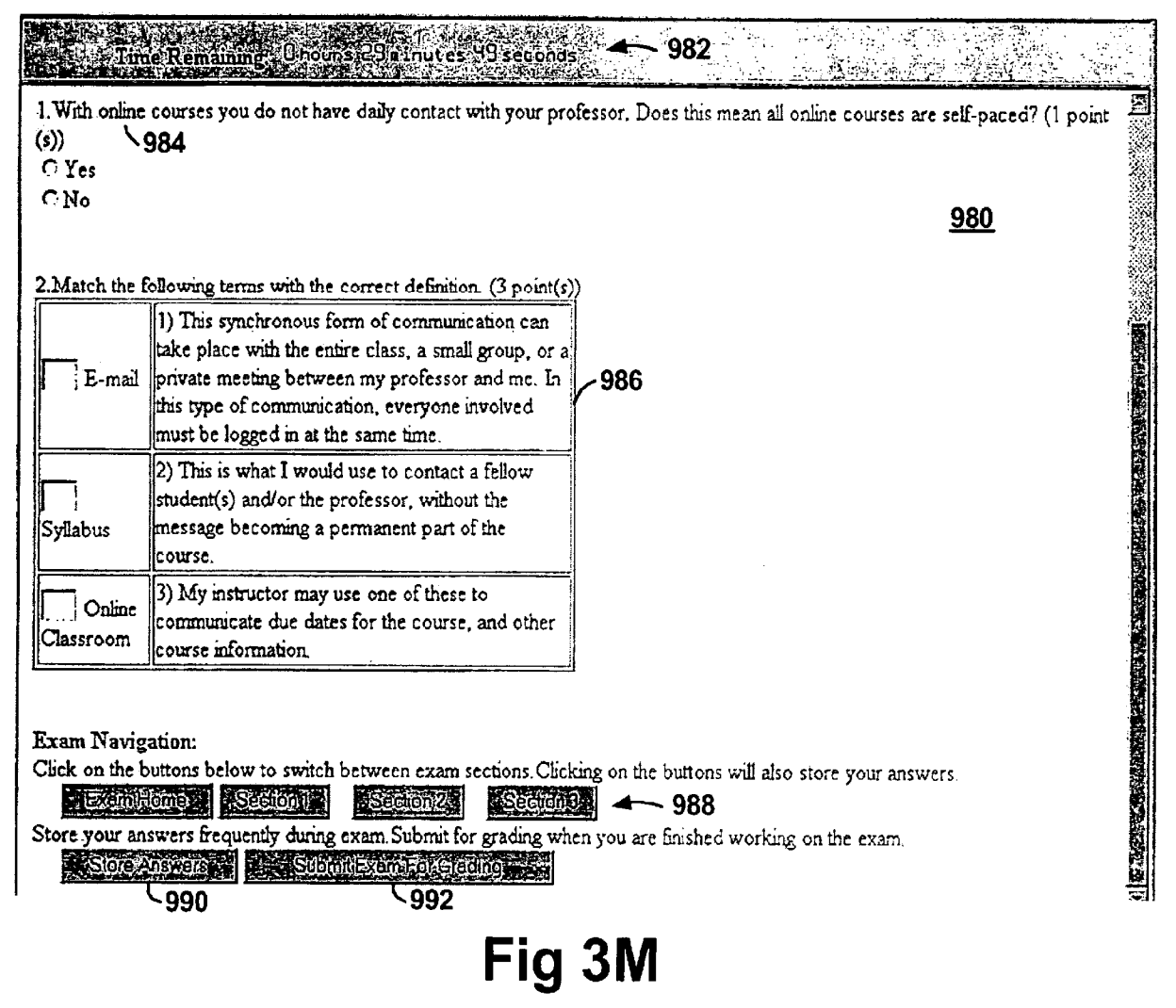

FIG. 3M is a diagram providing an example of a grading or exam screen 980. Exam screen 980 provides an example of how a user may take an on-line exam. Exam screen 980 includes a timer section 982 displaying a time remaining for the exam. Two exemplary questions are shown for the exam. An exam question section 984 displays a true/false type question, and an exam question section 986 displays a section requiring the matching of words with the correct definitions. A user may select sections 988 to view and complete additional portions of the exam. The user stores the enter answers by selecting a store section 990, and submits the answers for grading by selecting a submit section 992.

The on-line exam in screen 980 may include both objective and subjective questions. For example, objective questions may include the following: true/false questions such as the type shown in exam question section 984; matching questions such as the type shown in exam question section 986; and multiple choice questions. Subjective questions may include essay questions; fill in the blank questions; and short answer questions. Answers to the objective questions may be automatically graded by the system by comparing the answers to stored correct answers, and answers to the subjective questions may be transmitted to an instructor for manual grading. On-line exams may be created using a course manager feature as described below.

FIG. 1K is a flow chart of a grading method 278, using exam screen 980, for an on-line educational system. Grading method 278 may use at least the following tables in the database: Tables 684, 694, 696, 698, 702, 706, 708, 710, 712, and 716. On-line grading for an on-line educational system permits users to take exams on-line and those exams may be graded automatically or sent to instructors for grading. The system receives a user's request for an exam (step 280). A user may request an exam by selecting one in the electronic syllabus in syllabus section 806 after having been posted by an instructor. The system retrieves the corresponding exam and displays it to the user such as is shown in exam screen 980 (step 282). Also, the system may start an optional timer to limit the amount of time the user is permitted to take the exam and display the time remaining in timer section 982 (step 284).

The system receives the user's answers to the exam, such as through exam question sections 984 and 986 (step 286). It permits the user to continue entering answers until the timer has expired (step 288) or the user closes the exam (step 290). Upon detecting one of the events ending the exam such as a time-out or selection of submit section 992, the system closes the exam and stores the user's answers in the database (step 292).

The system determines if automatic grading has been invoked (step 294). For example, for multiple choice exams, the system may automatically grade the exam. If automatic grading has been invoked, the system grades the user's answers and scores the grade information in the database (step 300). It also determines if any instructor grading is required for the user's answers (step 302). If not, the system posts the grade information in the on-line gradebook (step 304).

If automatic grading is not invoked or if any portion of the exam requires instructor grading, the system transmits the user's answers to the instructor for grading (step 296). The system receives grade information from the instructor along with optional comments and stores that information in the database (step 298) and then posts the grade information in the on-line gradebook (step 304).

Administrative Pages/Functions

An administrative pages feature of the on-line educational system provides on-line administrative functions for users. The educational system includes providing on-line content concerning educational materials for a particular educational course, and providing on-line an electronic syllabus for the educational course. The apparatus provides information, accessible on-line by the users, concerning administrative functions related to the educational course. Administrative pages are screens providing for administrative functions on-line courses. Administrative functions are procedural or other matters relating an on-line course but not necessarily relating to the substantive content of the course. Examples of administrative functions are provided below.

The administrative pages feature may include various other aspects. For example, the information available via the administrative pages may include an enrollment for a particular user, a registration history for a particular user, payment by a particular user, a report having information identifying a particular user, and a report having information identifying a particular course. The administrative pages may also provide for searching for information related to a particular user based upon user-entered information.

An administrative screen electronically displays information for use in providing administrative pages for the on-line educational system. The screen includes an index section for selecting a home page screen having a content section identifying on-line content concerning educational materials for a particular educational course and having a syllabus section for providing an electronic syllabus for the educational course. An administrative section in the screen provides information, accessible on-line by users of the system, concerning administrative functions related to the educational course.

Figure 3N:
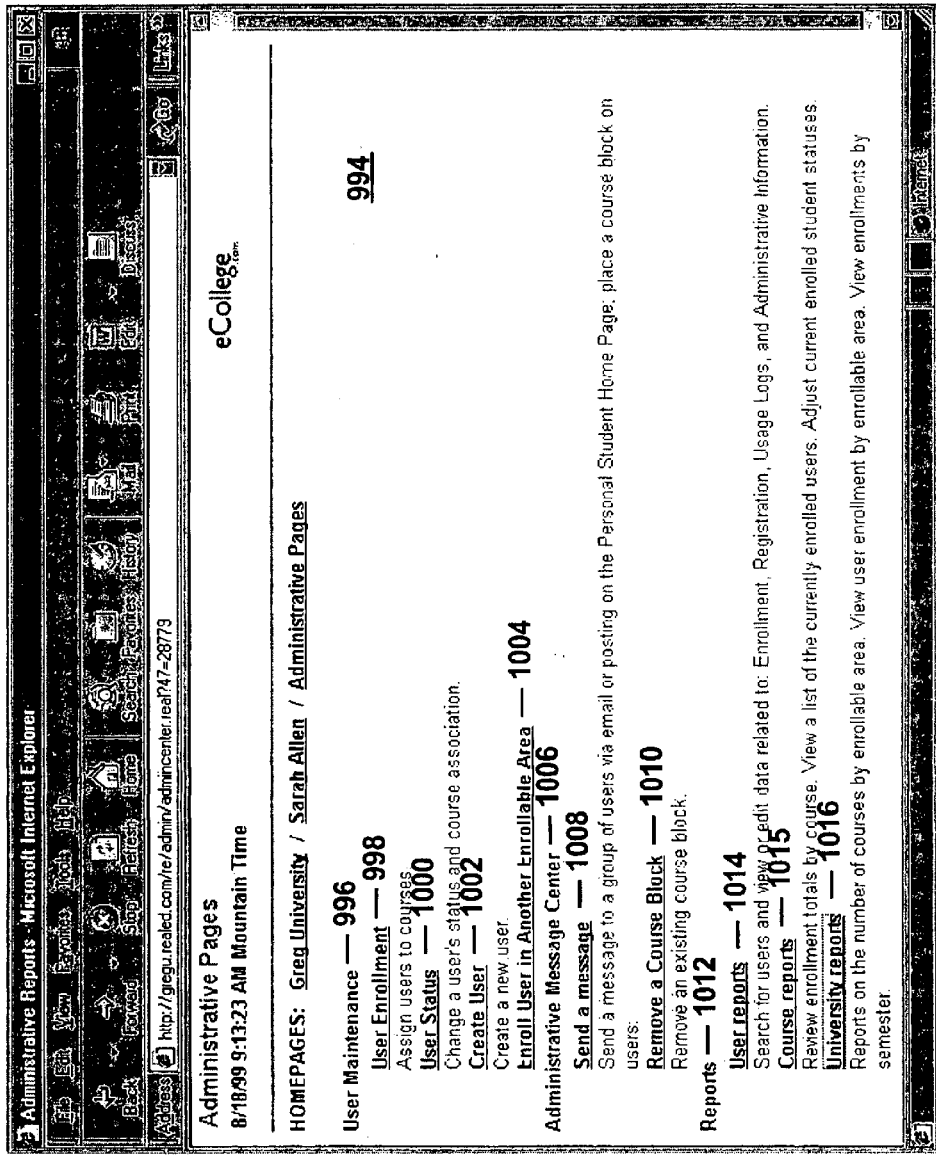
FIG. 3N is a diagram of an administrative pages screen.
Figure 30:
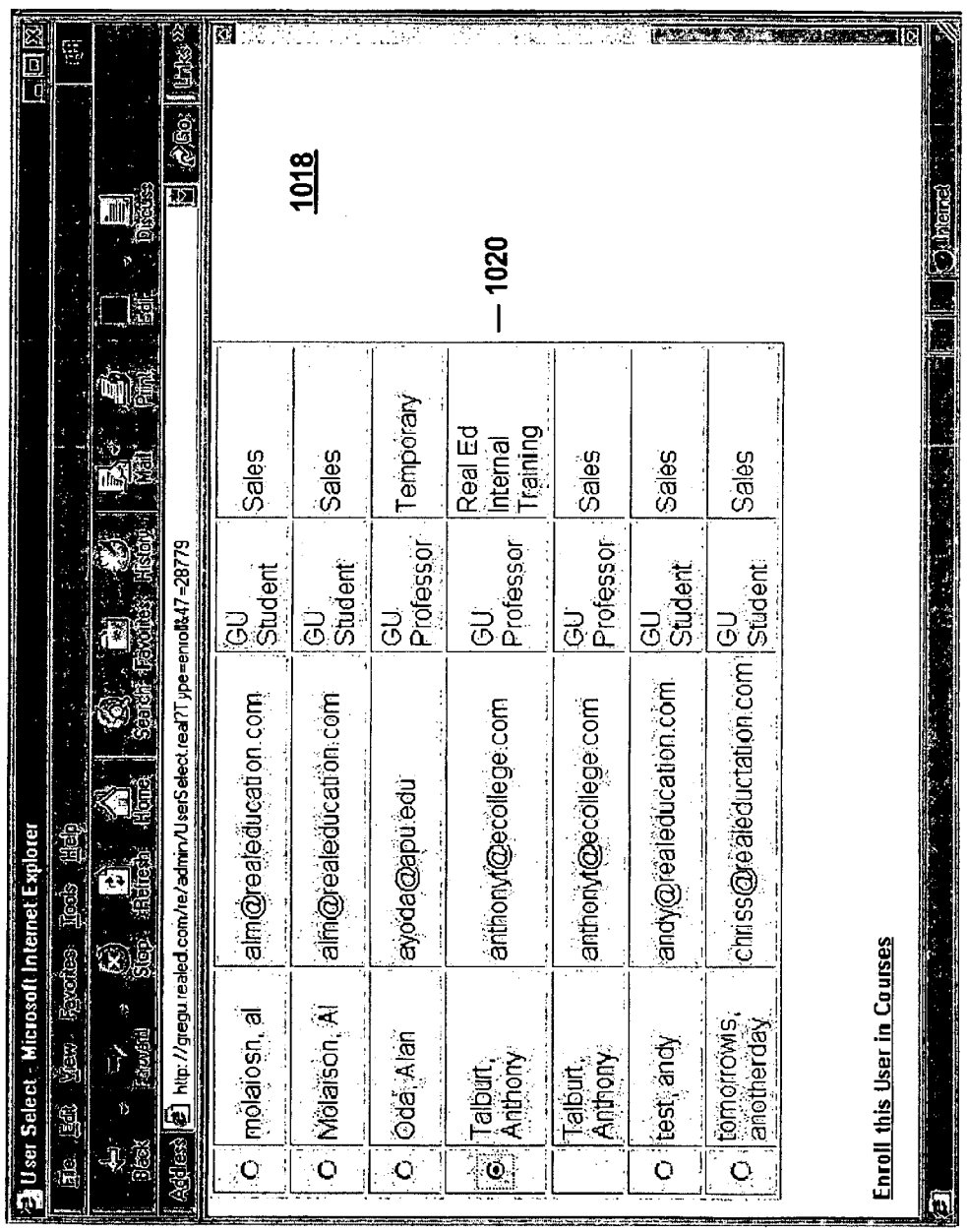

FIG. 3N is a diagram providing an example of an administrative pages screen 994. Administrative pages screen 994 lists various administrative functions in administrative sections 996, 1006, and 1012 for selection by a user or other person in order to access additional screens. For example, administrative section 996 lists user maintenance selections, including a user enrollment selection 998, a user status selection 1000, a create user selection 1002, and an enrollment selection 1004. Administrative section 1006 lists administrative message center selections, including a send message selection 1008 and a remove course block selection 1010. Administrative section 1012 lists reports selections, including a user reports selection 1014, a course reports selection 1015, and a university reports selection 1016.

A user may select selections 998, 1000, 1002, and 1004 to access additional screens relating to user maintenance. User enrollment selection 998 produces a screen 1018, shown in FIG. 3O, providing a section 1020 listing user enrollment. Status selection 1000 produces a screen 1022, shown in FIG. 3P, including a section 1024 listing status of a particular user selected from a section 1026 listing enrollment of users. Screen 1022 also includes a section 1028 for a user to select in order to update entered information. Enrollment selection 1004 produces a screen 1030, shown in FIG. 3Q, including sections for enrolling a user in another area. In particular, screen 1030 includes a section 1032 identifying a user's enrollment; a section 1034 to select a new enrollable area for the user; a section 1036 to select the user's roll in the new area; a section 1038 to move the user into the selected area only; and a section 1040 to remove the user from the currently enrolled areas.

Figure 3P:
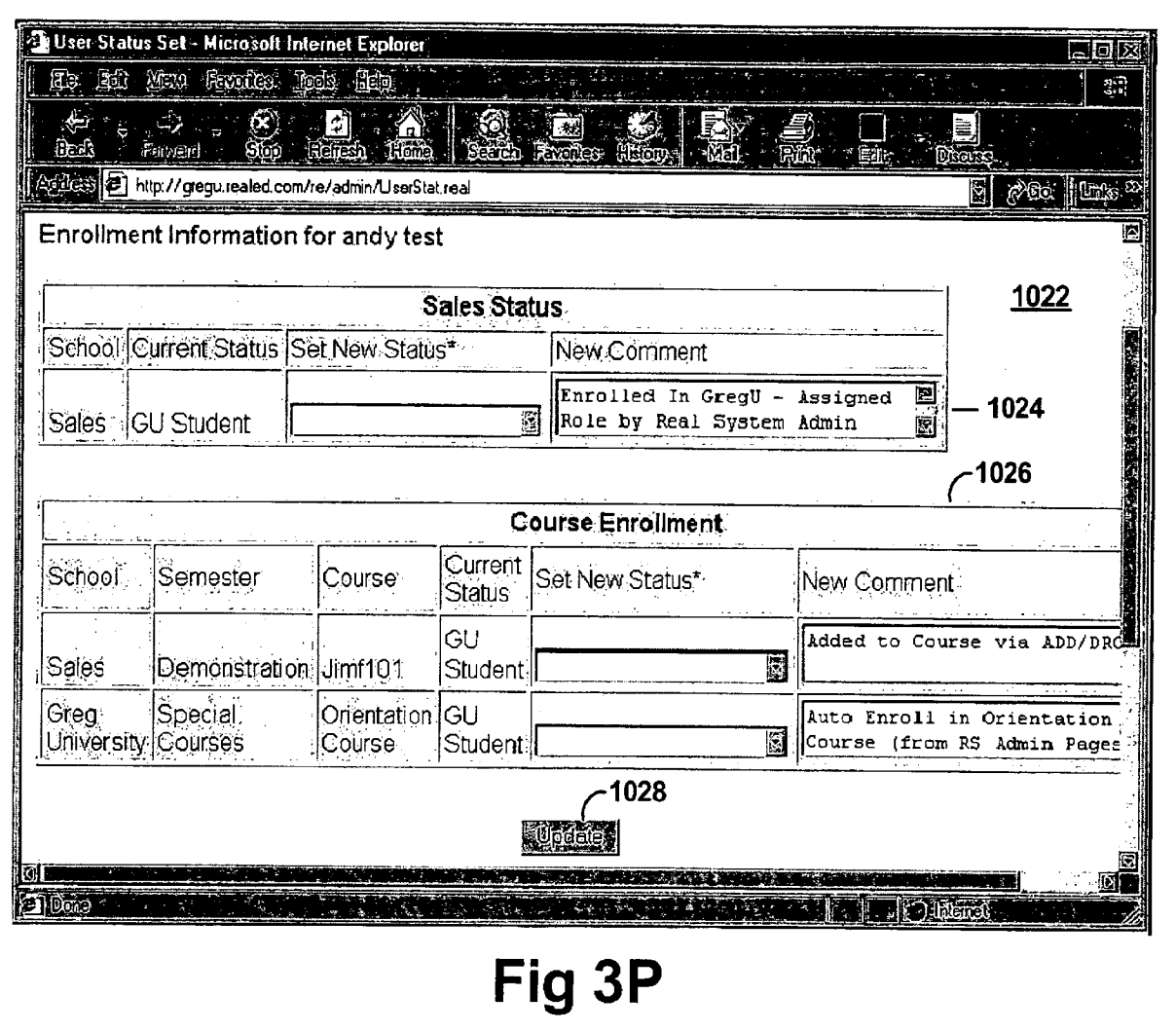
Figure 3R:
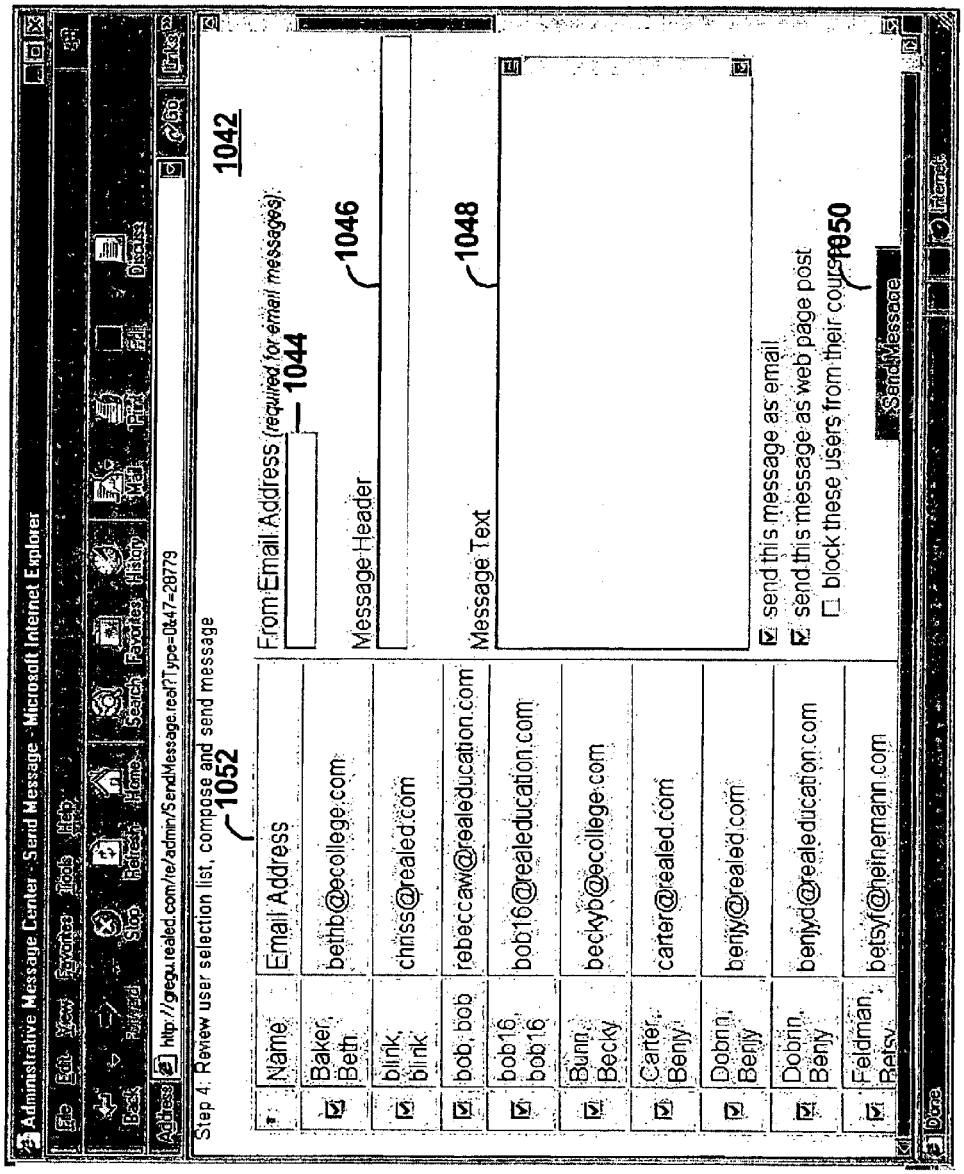
FIG. 3R is a diagram of a message screen.

A user may select section 1008 to access a screen 1042, shown in FIG. 3R, for an administrative message center. An authorized person may use screen 1042 in order to send a message to various users among multiple courses. Section 1044 is used to enter an e-mail address of the sender. Section 1046 is used to enter a message subject. Section 1048 is used to enter an e-mail message. The sender may select recipients of the e-mail message by selecting users listed in section 1052, and the message is transmitted to the selected users by selecting section 1050. Section 1052 typically lists all users in all courses.

A user may select selections 1014, 1015, and 1016 to access additional screens relating to reports. Selection 1014 produces a screen 1054, shown in FIG. 3S, including a section 1056 providing a report for a particular user. Selection 1015 produces a screen 1058, shown in FIG. 3T, including a section 1060 providing status of a particular course and a section 1062 providing a course report. Selection 1016 produces a screen 1064, shown in FIG. 3U, including a section 1066 providing a university report.

The home page may include a link to the administrative pages for selection by an instructor, user, or other person. In addition, sending messages to users among multiple courses may be accomplished with the message center described with respect to FIGS. 1E and 3G, or with the administrative message center shown in screen 1042 (FIG. 3R).

Use of administrative pages is further explained in the Administrative Pages Guide included in Appendix B.

FIG. 1L is a flow chart of an administrative pages method 306, using the screens shown in FIGS. 3N–3U, for an on-line educational system. Administrative pages method 306 may use at least the following tables in the database: Tables 508, 512, 528, and 574. In method 306, the system detects whether user maintenance is required (step 308). If user maintenance is required, the system provides the requested maintenance (step 310), which may include the following: status information (step 312); enrollment information (step 314); registration history information (step 316); payment information (step 318); or other type of maintenance information (step 320). FIGS. 3O–3Q are screens for providing maintenance information as follows: FIG. 3O is a diagram of an enrollment status screen 1018; FIG. 3P is a diagram of a user status screen 1022; and FIG. 3Q is a diagram of an enrollment screen 1030.

The system also detects whether a report is requested (step 322). If the report is requested, the system provides the requested report (step 324), which may include the following: a user report (step 326); a course report (step 328); a university report (step 330); or other type of report (step 332). FIGS. 3S–3U are screens for report information as follows: FIG. 3S is a diagram of a user report screen 1054; FIG. 3T is a diagram of a course report screen 1058; and FIG. 3U is a diagram of a university report screen 1064.

The system also detects whether other types of administrative functions are requested (step 334). If so, it provides the other requested functions (step 336), which may include the following: send message function (step 338); remove course block function (step 340); a search function (step 342); or other function (step 334). FIG. 3R is a diagram of an administrative message screen 1042 for sending a message in step 338 as described above. The system also determines whether more functions have been requested (step 346) and, if so, may repeat method 306.

Course Manager

A course manager feature permits an instructor to develop an on-line course for the on-line educational system. The apparatus receives from the instructor an identification of units each representing portions of an educational course, an identification of assignments for the units, and an identification of educational materials for the units. The apparatus compiles the units, the assignments, and the educational materials into an on-line electronic syllabus for the educational course. The course manager can also include default units for the instructor to select for building a particular course. In addition, the course manager can be integrated with the on-line gradebook such that the units generated or selected by the instructor are automatically entered into the gradebook.

The course manager feature may include various other aspects. For example, an instructor may enter the following for assignments: a threaded discussion assignment; a reading assignment; a lecture assignment; an indication of a file to be downloaded; an address identifying a network location of additional content for the educational course; a journal assignment; and a webliography assignment. The educational materials entered by the instructor may include audio, video, multimedia information, or any of the types of information identified above. The instructor may also enter on-line exams to be taken by users enrolled in the course. In addition, the instructor edit the identification of the units, the identification of the assignments, or the identification of the educational materials in preparing the electronic syllabus. The course manager may also permit selectively providing on-line access to the electronic syllabus by the users.

A course manager screen electronically displays information for use in permitting an instructor to develop an on-line course for the on-line educational system. The screen includes a unit section for receiving an identification of units each representing portions of an educational course, an assignment section for receiving an identification of assignments for the units, and a content section for receiving an identification of educational materials for the units. A syllabus section in the screen illustrates a compilation of the units, the assignments, and the educational materials into an on-line electronic syllabus for the educational course. The syllabus section may include icons identifying the assignments. The course manager screen may also include an access section for selectively providing on-line access to the electronic syllabus by the users.

Figure 3V:
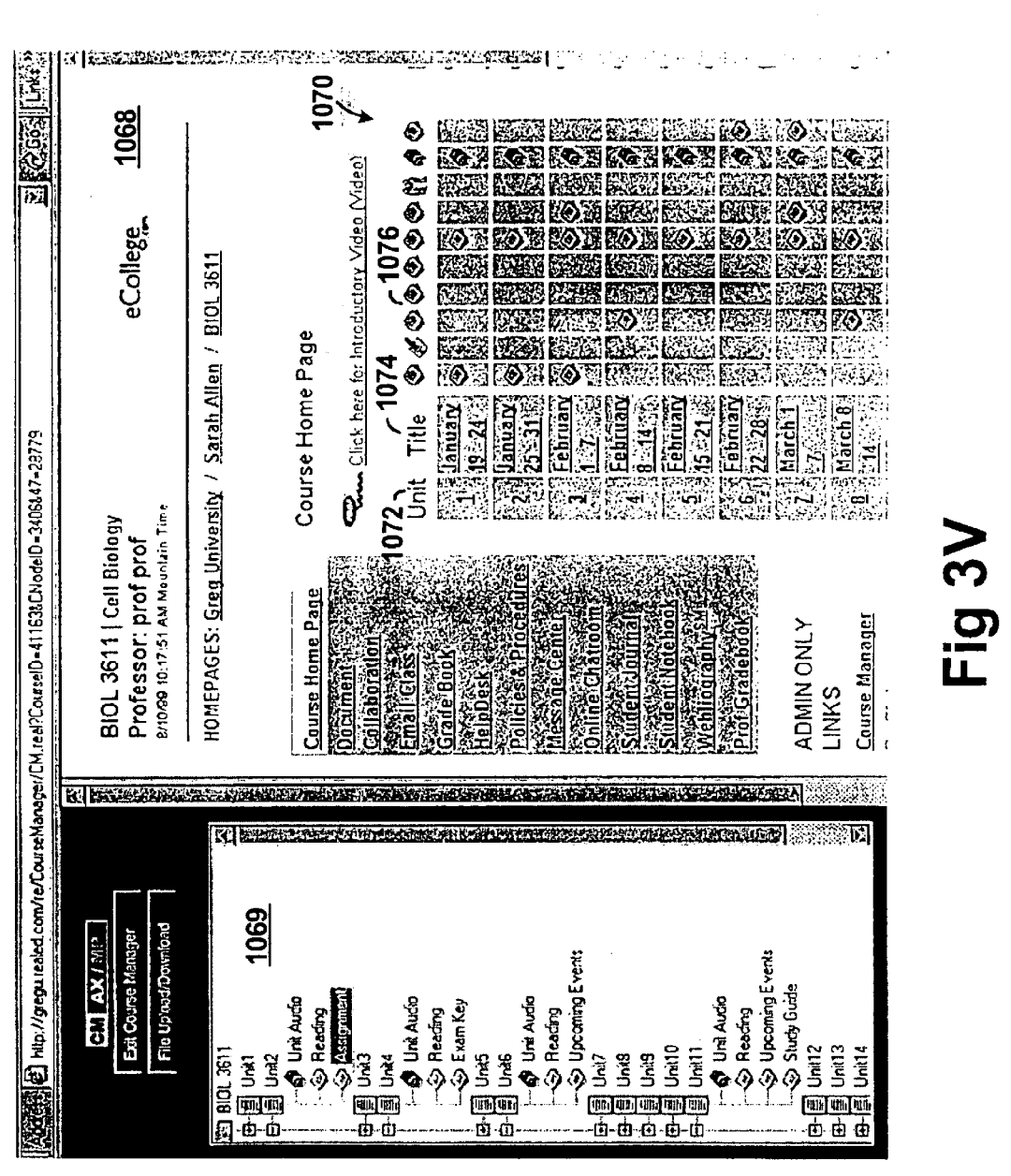
Figure 3W:
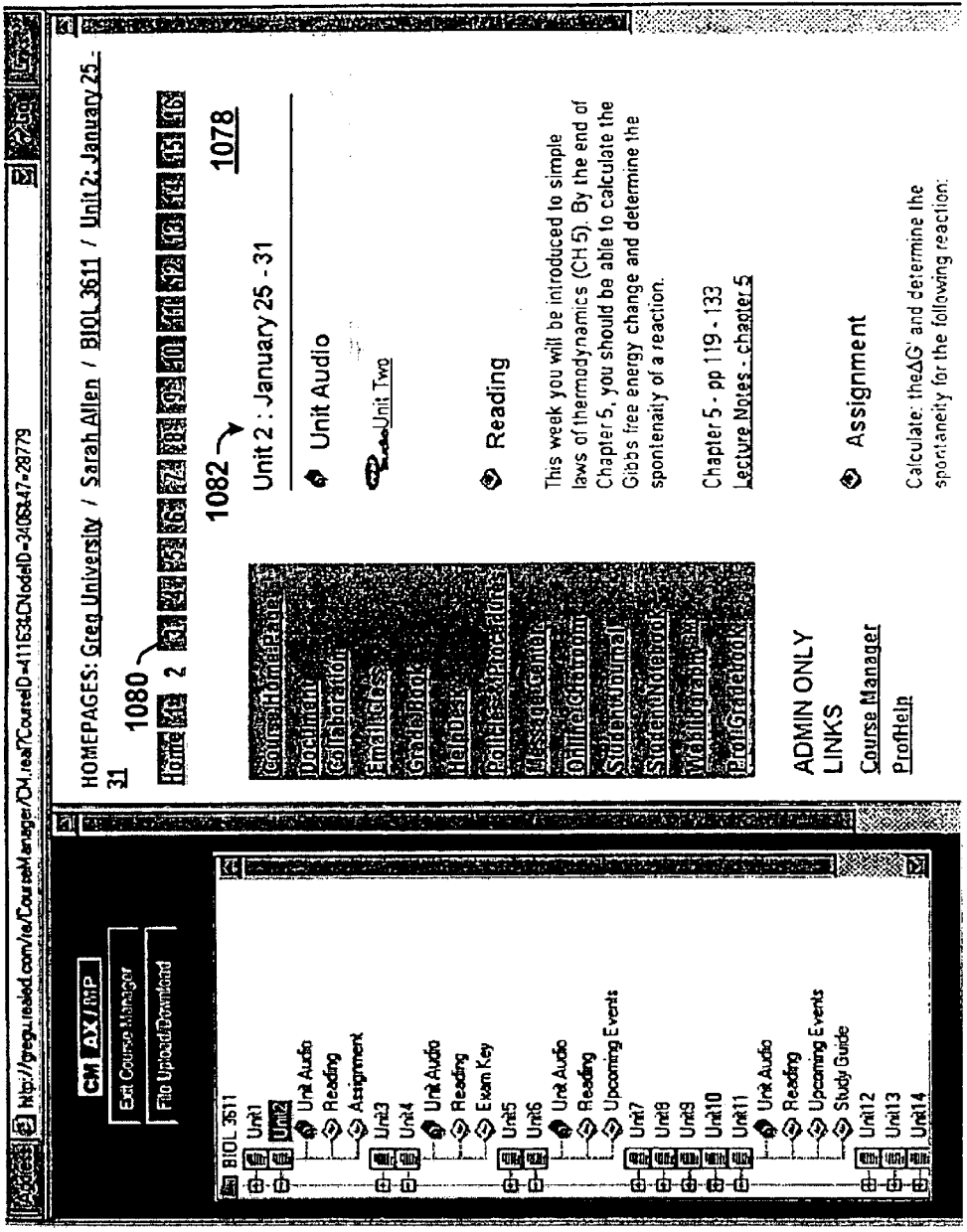
FIG. 3W is a diagram of a course manager unit screen.
Figure 3X:
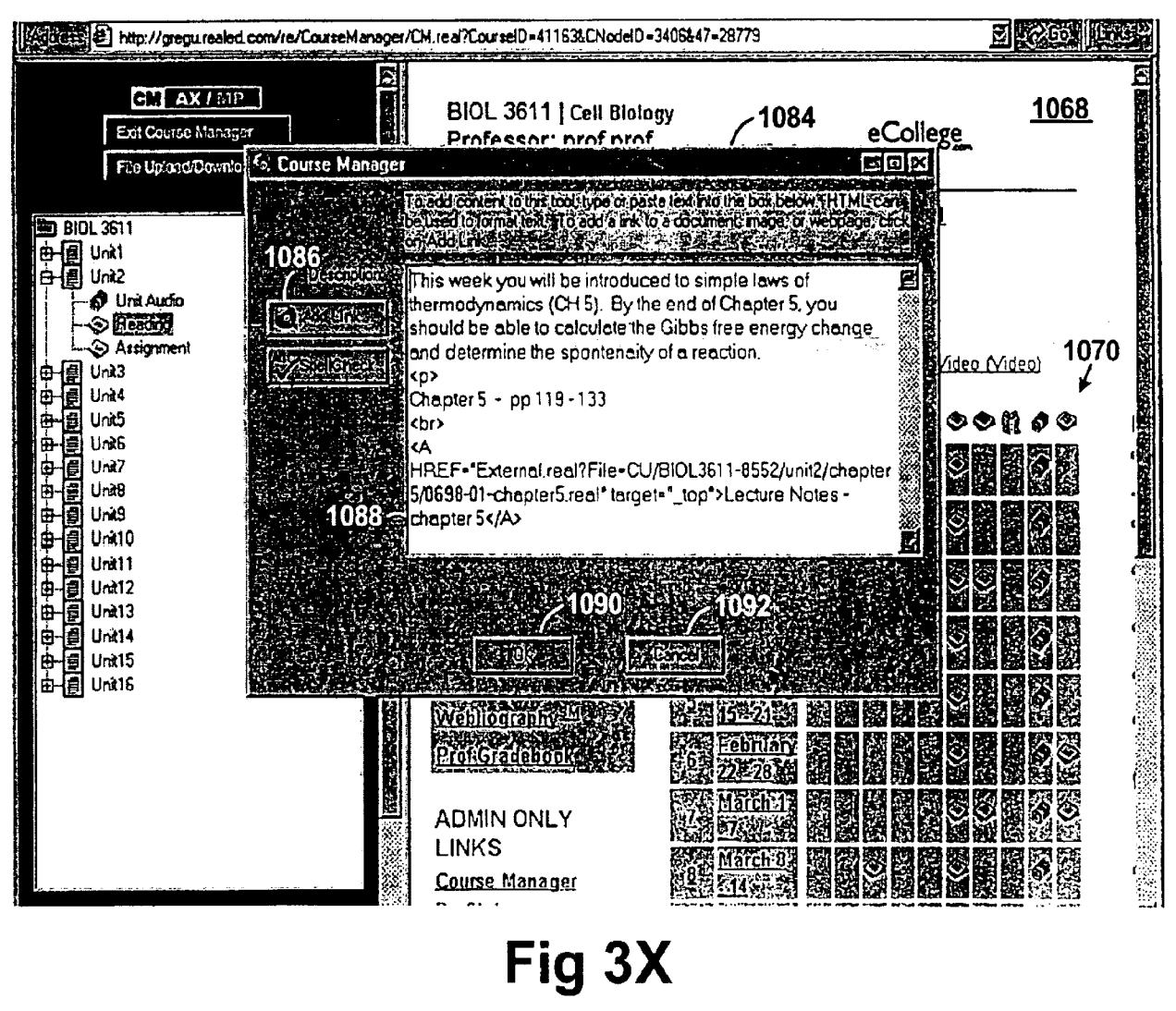

FIGS. 3V–3X are diagrams providing examples of screens for supporting a course manager. In particular, FIG. 3V is a diagram of a course manager screen 1068. An instructor may use course manager screen 1068 in order to build an electronic syllabus for an on-line educational course. Course manager screen 1068 includes an electronic syllabus 1070 identifying units and assignments for a particular course. A unit section 1072 identifies units for the course; in this example the course is divided into weekly units. A date section 1074 identifies the dates for each unit in unit section 1072. A content or assignment section 1076 identifies educational content and the assignments to be completed for each of the units in unit section 1072. In this example the content and assignments are identified by icons, and course manager screen 1068 may include a key explaining the meanings of the icons such as key section 814 shown in home page screen 800 (FIG. 3A).

Course manager screen 1068 also includes a tree section 1069 illustrating content for the course in a tree-type structure; in particular, the structure identifies the units for the course and shows, linked to the units, the corresponding assignments for each unit identified by icons and textual descriptions. Tree section 1069 thus provides an instructor with an outline for the course.

FIG. 3W is a diagram of a course manager unit screen 1078, providing more detail for the particular units in unit section 1072 in course manager screen 1068. Course manager unit screen 1078 includes a section 1080 for an instructor to select particular units of a course. Upon selecting a unit, a section 1082 displays detail for that unit, in this example unit 2. The detail may include identification of the unit, dates of the unit, and information describing assignments for the unit.

FIG. 3X is a diagram of an add content screen 1084 for a course manager. An instructor uses add unit screen 1084 to add or modify content for particular units of a course and thus build the syllabus for the course. Selection of a unit in syllabus 1070 may produce add content screen 1084 and permit the instructor to modify or create that unit. An add link section 1086 permits the instructor to add a link to a document, image, or web page for the unit. An add section 1088 permits the instructor to add or modify content for the unit such as identification and description of assignments for the unit. Selecting save section 1090 saves the entered information and closes add content screen 1084, and selecting cancel section 1092 closes add content screen 1084 without saving the entered information or modifying the unit.

Building of courses is further explained in the Course Manager Guide included in Appendix C.

FIG. 1M is a flow chart of a course manager method 348, using the screens shown in FIGS. 3V–3X, for an on-line educational system. Course manager method 348 may use at least the following tables in the database: Tables 582, 594, 596, 602, 626, 662, 682, 684, and 692. In method 348, the instructor or user selects the course manager (step 350). Home page 800 may include a section for selecting the course manager. The system determines if the instructor has selected the function, since the system limits access to the course manager to instructors for building courses (step 352). If an instructor has requested the function, or another person permitted access to it, the system can display a default syllabus with default items (step 353); it also receives identification of units for a particular course, as shown in section 1070, and selection of any of the default items to be included within the course syllabus (step 354).

The use of default units can provide the instructor with a starting point for building a syllabus for a particular on-line course and reduce the amount of time required for the instructor to build the syllabus. Default units can be based, for example, upon empirical evidence concerning the typical subtopics, readings, and other types of assignments for a course on a particular topic. They can also be generated, for example, by instructors experienced in teaching particular topics. Default units can include any of the types of content (educational materials) or assignments described below.

In additional to units, the system receives identification of assignments and educational materials for the course, such as through add content section 1084 (step 356). The assignments and educational content may include one or more of the following: a threaded discussion (step 358); a reading (step 360); a lecture (step 362); a file (step 364); a hyper-text link (step 266); or other assignment information (step 368). The instructor may enter the assignments and educational materials through screen 1084, for example, using add section 1088; the same section may be used for adding both assignments and content. Threaded discussions are explained above. A reading assignment involves textual material, possibly with other information, for reading or viewing by a user. A lecture involves audio or audiovisual information for access by a user; for example, an instructor may record an audio lecture or audiovisual lecture and make the lecture available to users on-line. A file involves a document to be shared with a user. A hyper-text link involves a network address of information to be accessed by the user; for example, it may be a Uniform Resource Locator (URL) for accessing information on the World Wide Web.

The Course Manager Guide in Appendix C further explains adding units, content, and assignments, along with exemplary screens for receiving that information.

The system determines if the instructor enters more assignments (step 370) and, if so, it repeats step 356 to receive identification of additional assignments and educational materials. Otherwise, the system determines if the instructor has requested an exam (step 372). If so, the system receives and compiles exam information (step 374). Exam information may include on-line exams, an example of which is provided above. An instructor or other person may enter information to create an on-line exam as described in the Course Manager Guide in Appendix C.

The system also determines if the instructor wants to edit any of the previously-entered information (step 376). The instructor may repeat various steps in method 348 to edit the information.

When the instructor has finished entering the information for the course, the system compiles any default units and the additional units, assignments and educational materials into an electronic syllabus for the course (step 378). Compiling the information involves placing it in form for storage within an electronic syllabus and for on-line access by users; an examples of such an electronic syllabus is provided above. The system then stores the compiled information on the database for access by users enrolled in the on-line course. The system can also automatically enter the units into the on-line gradebook, described above (step 379).

Course/Author Views

The system can permit an instructor to toggle between a course view and an author (instructor) view. This feature can be particularly useful when instructors design on-line courses using the course manager features. The instructor can interact with the class through the course view and easily toggle to the author view to design or update the on-line course syllabus or other materials.

With this feature the system selectively displays a course view in response to selection of a course section and displays an author view in response to selection of an author section. The course view contains content for the on-line course and the author view permits the instructor to develop the on-line course. While in the author view, the system permits the instructor to execute the course manager functions to build a course. In that view, the system can receive an identification of units each representing portions of an educational course, receive an identification of assignments for the units, and receive an identification of educational materials for the units. The system uses the course manager functions to compile the units, the assignments, and the educational materials into an on-line electronic syllabus for the educational course.

This feature also provides for displaying course tools and a navigation tree in both the course view and the author view. The navigation tree permits the instructor to access the units, and the course tools permit the instructor to access teaching tools for the units.

Figure 4A:
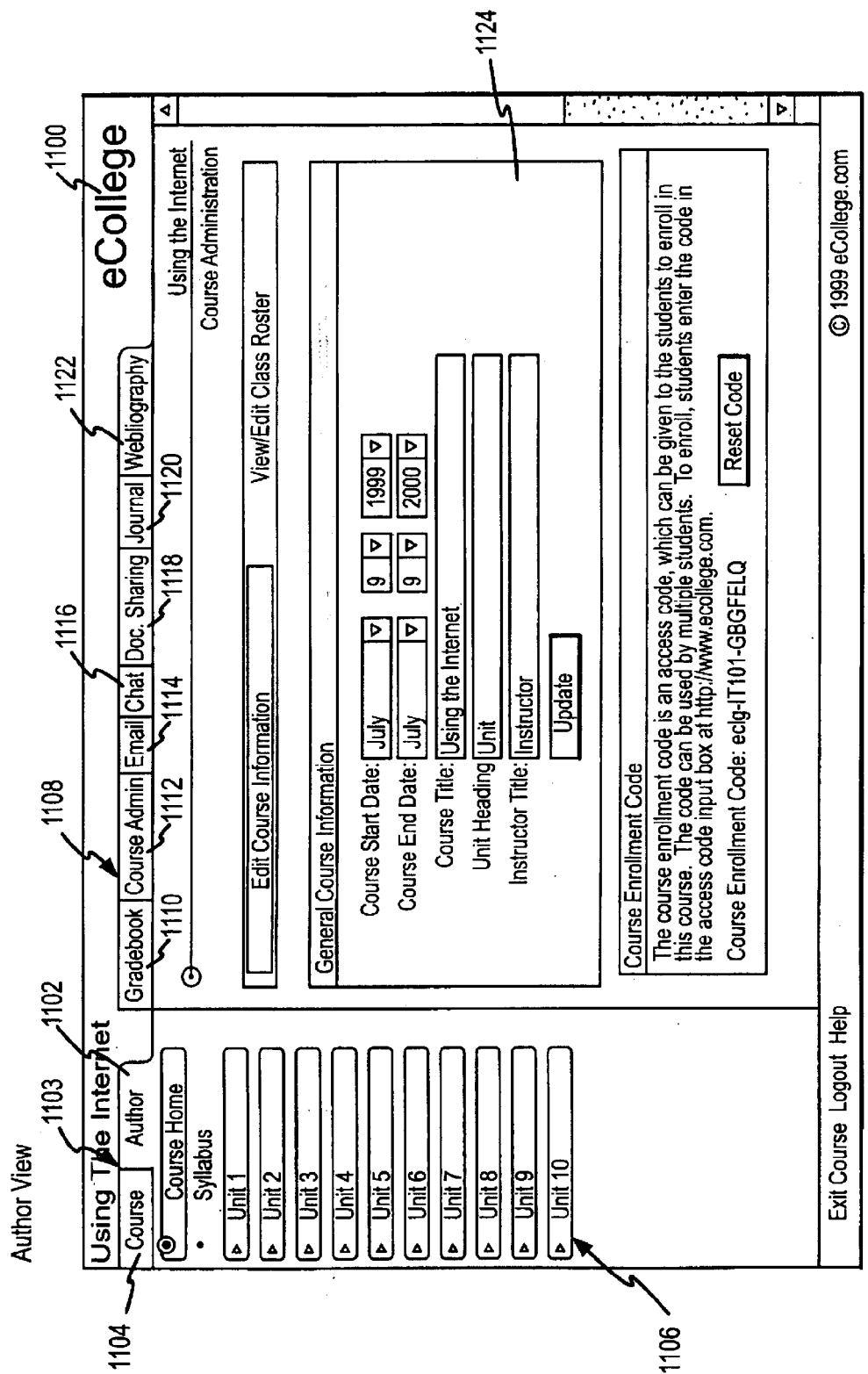
Figure 4B:
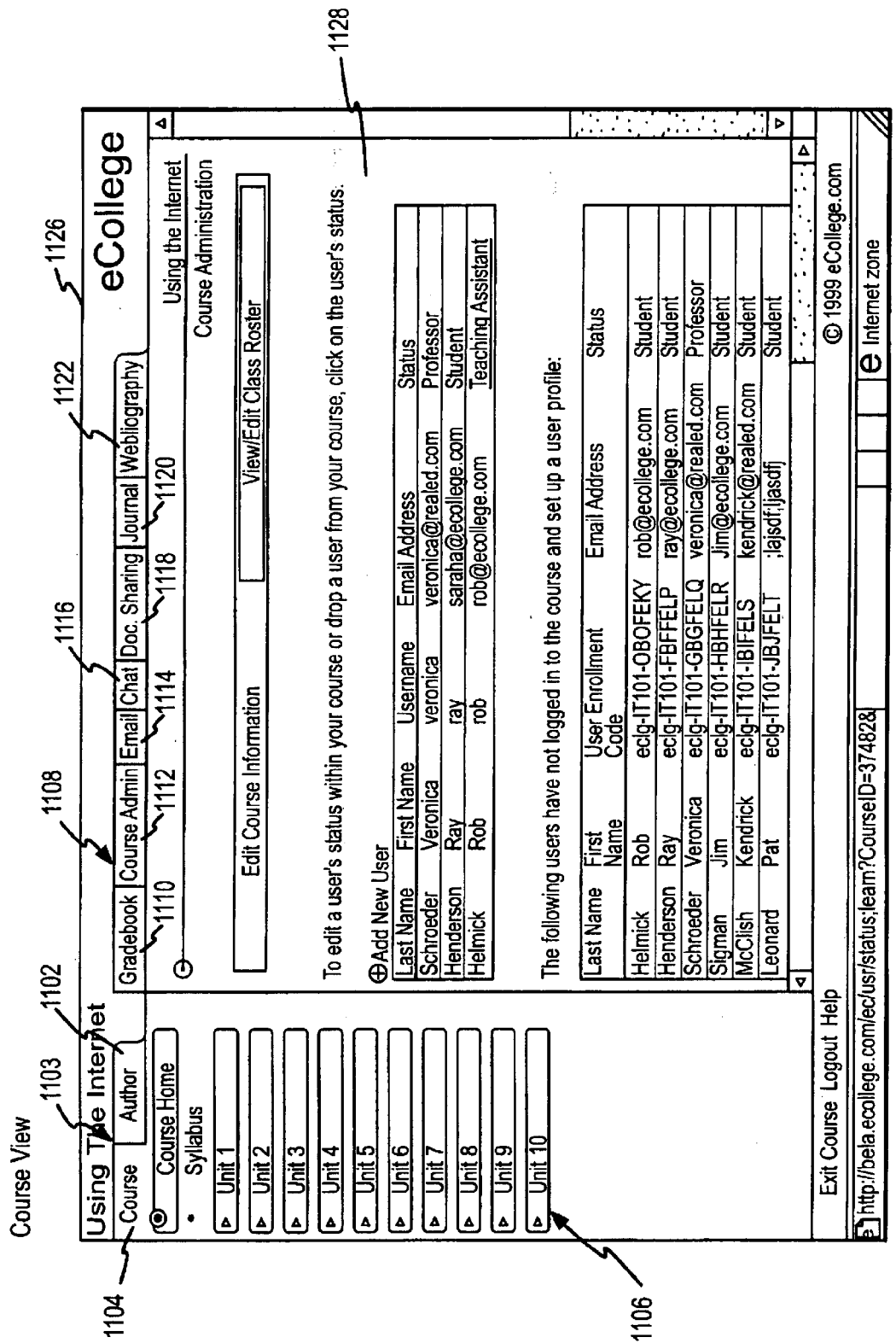

FIG. 4A is a diagram of an author view screen 1100, and FIG. 4B is a diagram of a course view screen 1126. Screens 1100 and 1126 each include a toggle section 1103 having an author section 1102 and a course section 1104. Toggle section 1103 permits an instructor to switch between author view screen 1100 and course view screen 1126. In particular, selection of author section 1102 generates display of author view screen 1100 and selection of course section 1103 generates display of course view screen 1126.

Screens 1100 and 1126 also can include a navigation section 1106 listing the units for a particular course. An instructor can select the identified units to view information about them. The screens can also include a course tools section 1108 for displaying sections identifying course tools for selection by an instructor in order to access the corresponding tool, such as the following: a gradebook section 1110 for accessing the on-line gradebook; a course administration section 1112 for accessing the administrative pages; an e-mail section 1114 for accessing the e-mail feature; a chat section 1116 for accessing the chat feature; a document sharing section 1118 for accessing the document sharing feature; a journal section 1120 for accessing the electronic journal; and a webliography or links section 1122 for accessing the webliography feature.

The screens also include content sections. Author view screen 1100 includes a content section 1124 for displaying course-related information. Course view screen 1126 includes a content section 1128 for displaying instructor-related information and permitting the instructor to enter and edit course information.

FIG. 1N is a flow chart of a course/author views method 380 for displaying screens 1100 and 1126. In method 380, the system displays an instructor page with navigation tree section 1106 and course tools section 1108. The system can default to one of the two views, instructor or course, or it can first display a different screen. Based upon the default setting or view selected by the instructor, the system displays the selected view in content section 1124 or 1128. If the instructor selected course section 1104 (step 386), the system displays in content section 1128 course content (step 388) and units as selected by the instructor (step 390). It also displays and executes course tools as selected by the instructor in course tools section 1108 (step 392).

If the instructor selected author section 1102 (step 394), the system displays in content section 1124 instructor content (step 396), and it can execute course manager functions as described above (step 398). The system can toggle between screens 1100 and 1126 through the instructor's selection of author section 1102 or course section 1104 (step 384).

Calendar

Figure 4C:
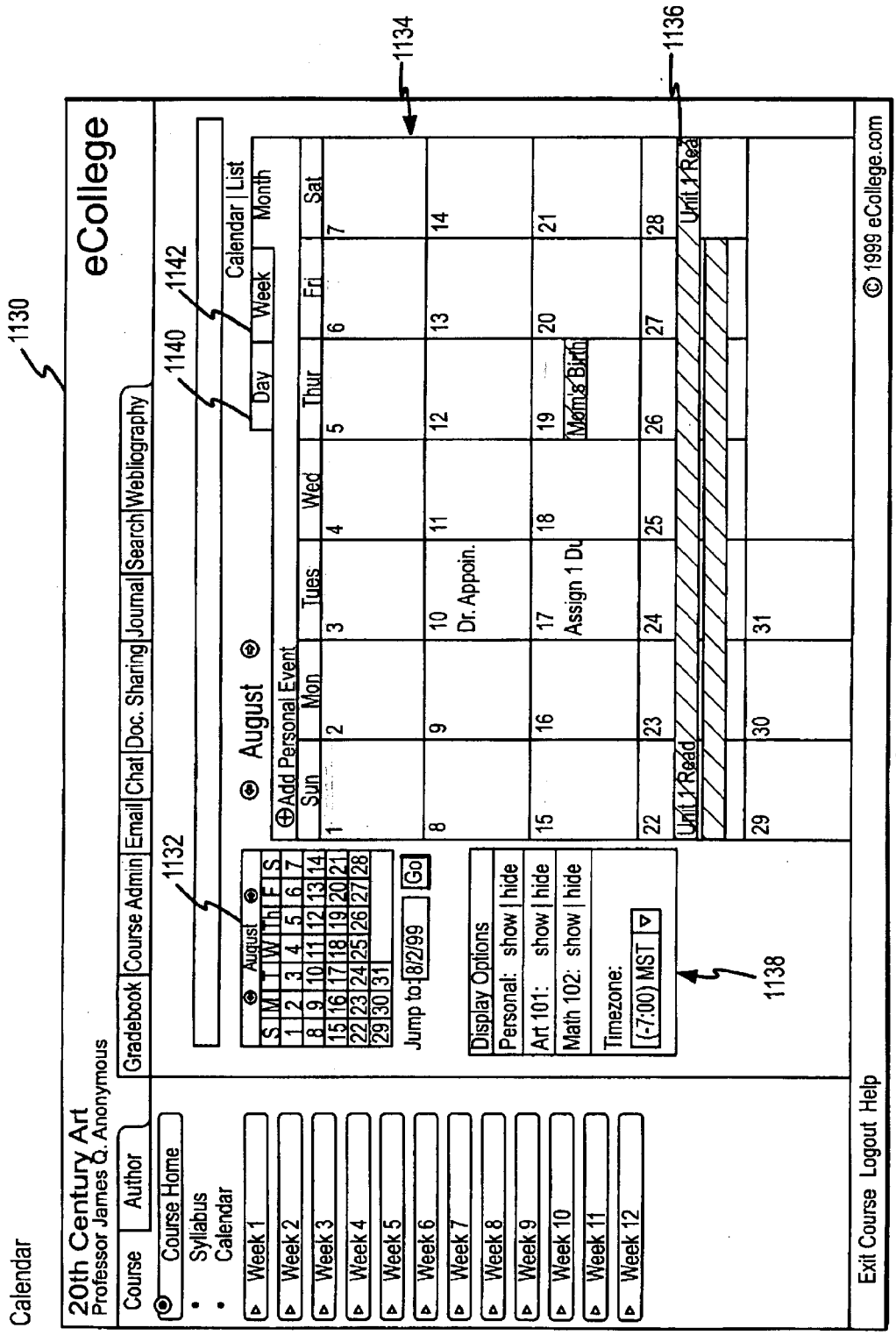

FIG. 1O is a flow chart of a calendar method 400, and FIG. 4C is an example of a calendar screen 1130, for providing calendar functions for an on-line course. The calendar functions provide for integration of an electronic calendar with dates for an on-line course, as well as other dates such as a user's personal appointments. The calendar feature is therefore used with the on-line educational system providing on-line content concerning educational materials for a particular educational course and providing on-line an electronic syllabus specifying units related to the content for the educational course. This feature provides the on-line calendar electronically integrated with the syllabus for automatically specifying dates for the educational course based upon the syllabus.

The calendar can include other features as well. It can automatically update the specified dates based upon changes in the syllabus. Using a calendar screen it can display the specified dates and corresponding units of the syllabus. It can also specify the dates based upon user-entered date information.

Calendar screen 1130 can include a month section 1132 to display a particular month and permit a user to select a day of the month. A date section 1134 displays date information for days within the month; for example, a section 1136 provides an indication of a reading assignment for a particular unit and the corresponding dates for it. An options section 1138 displays various options for displaying the date information. The calendar functions can include various types of displays, such as a day display through selection of a day section 1140 and a week display through selection of week section 1142.

In method 400, an instructor or user selects the calendar function (step 402). In response, the system retrieves unit and date information from the electronic syllabus (step 404). The system enters and, if necessary, updates the date information in the calendar and displays it such as is shown in screen 1130 (step 406). If the system receives user-entered date information (step 408), it enters and displays the user-entered date information in the calendar (step 410). Therefore, each time a user or instructor accesses the calendar, the system can retrieve the date information from the syllabus to automatically update the displayed calendar.

Search

Figure 4D:
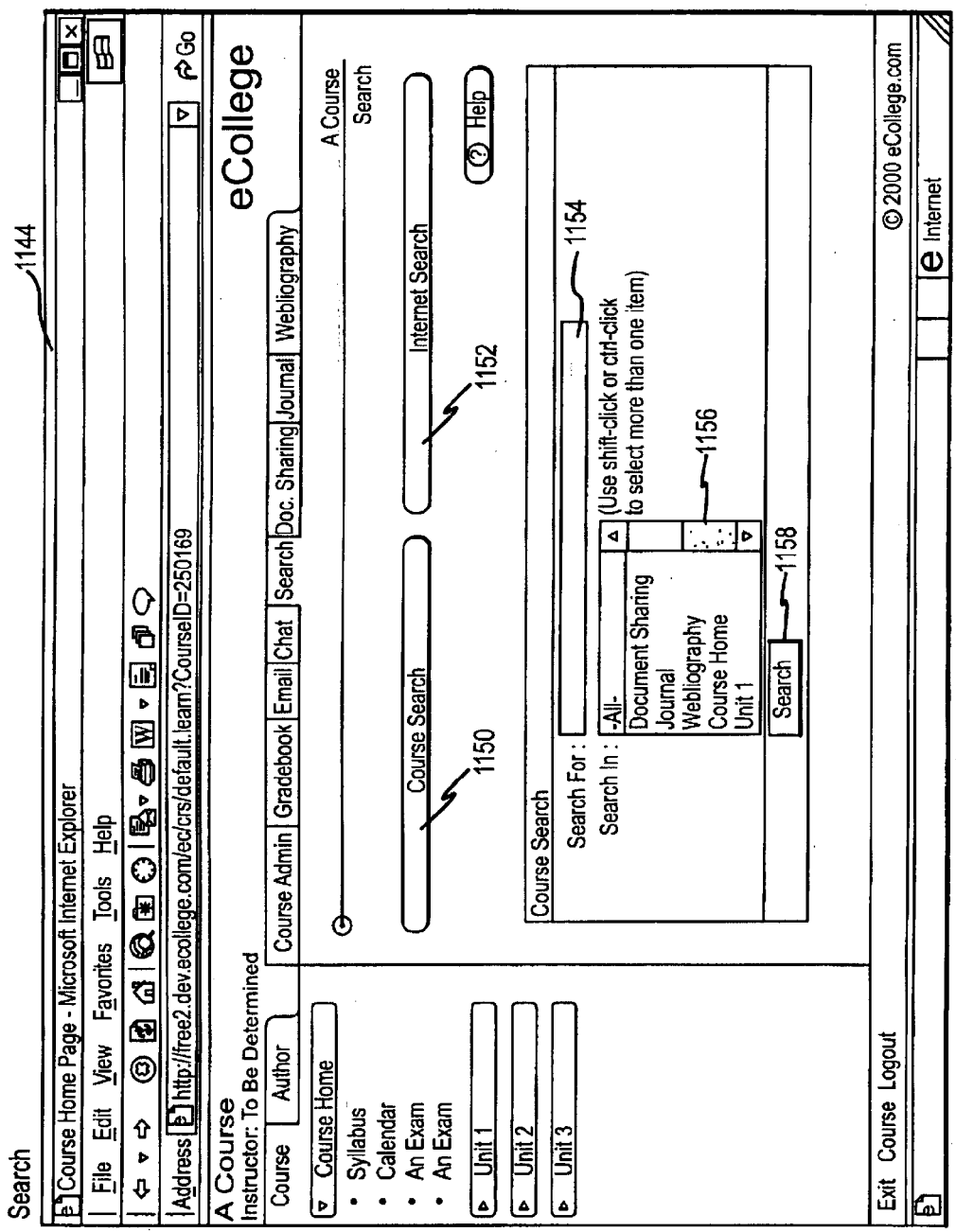
Figure 4E:
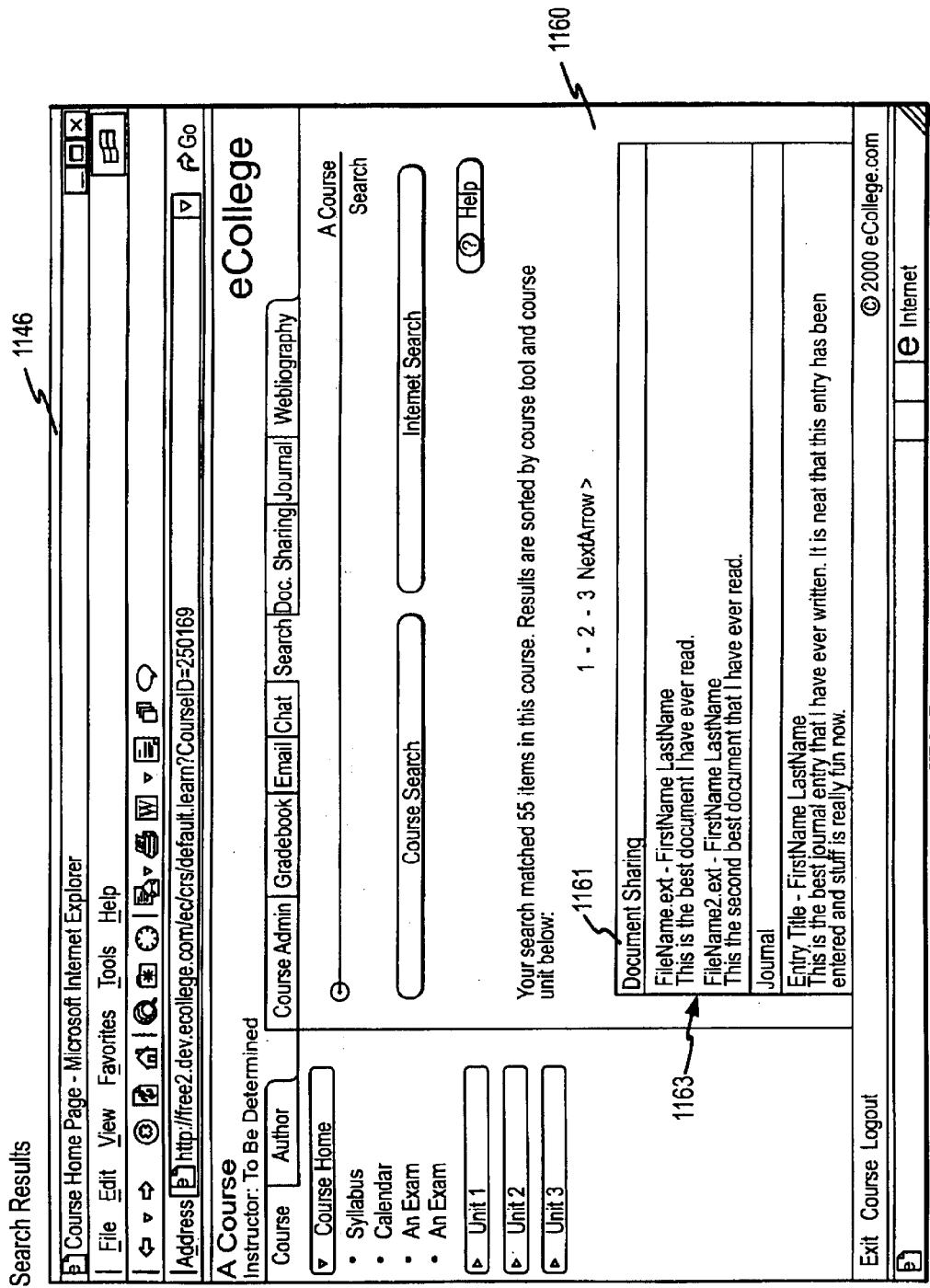

FIG. 1P is a flow chart of a search method 412, which can use a search screen 1144 shown in FIG. 4D to receive a search and use exemplary search results screens 1146 and 1148 shown in FIGS. 4E and 4F to display results of the search. The search feature permits a user or instructor to search for particular content within the on-line educational system providing content concerning educational materials for a particular on-line educational course and providing on-line an electronic syllabus for the educational course. The search feature receives a search query, searches the content for the query, and specifies results of the searching.

Search screen 1144 includes a search section 1150 permitting the user to request a search for content within the on-line educational system. For that type of search, a query section 1154 permits the user to enter a search query, which is any identification of content to search. A search content section 1156 permits the user to identify the areas, including all areas, of the on-line educational system in which to search for the query. Those areas may include, for example, selected course tools or units. Upon the user selecting a search request section 1158, the system performs the requested search. Search screen 1144 can also include an Internet search section 1152 permitting the user to search for content over the Internet. Search engines, including those for searching the Internet, are known in the art.

Screens 1146 and 1148 (FIGS. 4E and 4F) illustrate examples of screens in which to display the search results. Screen 1146 includes a results section 1160 in which the results are displayed. In this example, results section 1160 identifies the areas in which the query was located, such as in the document sharing tool as shown in section 1161, and the content matching the query, such as is shown in section 1163. Screen 1148 illustrates the entire results for this example. If the results cannot be shown in one full screen, a user may be required to scroll the screen in order view all of the search results. Therefore, in this example screen 1148 represents all search results as viewed when scrolling down results section 1160. The search results can also be displayed in other formats or generated in hard copy form.

In method 412, a user or instructor selects the search function (step 414). In response, the system displays search screen 1144 (step 416). Upon selection of search request section 1158, the system receives a search query as entered by the user or instructor in query section 1154 (step 418) and receives content in which to search as identified in content section 1156 (step 420). The system can be configured to default to a particular content to search such as, for example, all content. The system searches the identified content for the query (step 422). Any type of search engine or tool can be used for the searching. Upon completion of the searching, the system displays results of the search such as is shown in screens 1146 and 1148 (step 424).

Appendix D provides more information concerning at least the following features of the on-line educational system: course administration; announcements; syllabus builder and viewer; course properties; add/create/edit content items; add new unit; calendar; unit properties and page; text content items; multimedia content items; threaded discussions; exam course item; add link wizard; file manager; e-mail class; search; document sharing; journal; gradebook; and the webliography bibliography.

While the present invention has been described in connection with an exemplary embodiment, it will be understood that many modifications will be readily apparent to those skilled in the art, and this application is intended to cover any adaptations or variations thereof. For example, different labels for the various features, screen sections, and methods, and different types of servers, instructor machines, and user machines may be used without departing from the scope of the invention. This invention should be limited only by the claims and equivalents thereof.

What is claimed is:

1. A method for providing an electronic notebook for users to selectively provide information to an instructor for use with an on-line educational system, comprising:

providing on-line content concerning educational materials for a particular educational course;

providing on-line an electronic syllabus for the educational course;

providing an electronic notebook for a particular one of the users permitting the particular user to enter information into the electronic notebook;

permitting the user to selectively identify permitted access to the electronic notebook by the instructor; and selectively providing access to the electronic notebook by the instructor based upon the user's identification of permitted access.

2. The method of claim 1 wherein the providing the electronic notebook step includes permitting the user to enter text, audio, video, graphics, or multimedia information into the electronic notebook.

3. The method of claim 2 wherein the providing the electronic notebook step includes permitting the user to group the information entered into the electronic notebook into particular entries.

4. The method of claim 3, further including permitting the user to identify permitted access by the instructor for each of the entries.

5. The method of claim 1 wherein the providing the electronic notebook step includes permitting the user to modify previously-entered information in the electronic notebook.

6. A machine-readable medium having stored thereon a plurality of instructions, said plurality of instructions when executed by a processor, cause said processor to perform a method for providing an electronic notebook for users to selectively provide information to an instructor for use with an on-line educational system, the method including:

providing on-line content concerning educational materials for a particular educational course;

providing on-line an electronic syllabus for the educational course;

providing an electronic notebook for a particular one of the users permitting the particular user to enter information into the electronic notebook;

permitting the user to selectively identify permitted access to the electronic notebook by the instructor; and selectively providing access to the electronic notebook by the instructor based upon the user's identification of permitted access.

7. The medium of claim 6 wherein the providing the electronic notebook step includes permitting the user to enter text, audio, video, graphics, or multimedia information into the electronic notebook.

8. The medium of claim 7 wherein the providing the electronic notebook step includes permitting the user to group the information entered into the electronic notebook into particular entries.

9. The medium of claim 8, further including permitting the user to identify permitted access by the instructor for each of the entries.

10. The medium of claim 6 wherein the providing the electronic notebook step includes permitting the user to modify previously-entered information in the electronic notebook.

* * * * *